(12) United States Patent
Zhou et al.

(10) Patent No.: US 12,292,637 B2
(45) Date of Patent: May 6, 2025

(54) DISPLAY DEVICE, EXCITER, AND AUDIO SIGNAL PLAYBACK METHOD

(71) Applicant: HISENSE VISUAL TECHNOLOGY CO., LTD., Shandong (CN)

(72) Inventors: Hui Zhou, Shandong (CN); Haiying Wang, Shandong (CN)

(73) Assignee: HISENSE VISUAL TECHNOLOGY CO., LTD., Shandong (CN)

( * ) Notice: Subject to any disclaimer, the term of this patent is extended or adjusted under 35 U.S.C. 154(b) by 0 days.

(21) Appl. No.: 18/469,052

(22) Filed: Sep. 18, 2023

(65) Prior Publication Data

US 2024/0004228 A1 Jan. 4, 2024

Related U.S. Application Data

(63) Continuation of application No. PCT/CN2022/078417, filed on Feb. 28, 2022.

(30) Foreign Application Priority Data

| Mar. 18, 2021 | (CN) | 202110289943.0 |
| Jun. 11, 2021 | (CN) | 202110654878.7 |
| Jun. 11, 2021 | (CN) | 202110657399.0 |
| Jun. 11, 2021 | (CN) | 202121310664.X |
| Jun. 11, 2021 | (CN) | 202121318330.7 |

(51) Int. Cl.
*G02F 1/1333* (2006.01)
(52) U.S. Cl.
CPC ...... *G02F 1/133368* (2021.01); *G02F 1/1333* (2013.01)

(58) Field of Classification Search
None
See application file for complete search history.

(56) References Cited

U.S. PATENT DOCUMENTS

| 2004/0246109 A1 | 12/2004 | Suzuki et al. |
| 2018/0242077 A1 | 8/2018 | Smithers et al. |
| 2020/0196046 A1 | 6/2020 | Park et al. |

FOREIGN PATENT DOCUMENTS

| CN | 201069881 Y | 6/2008 |
| CN | 101252792 A | 8/2008 |
| CN | 201134928 Y | 10/2008 |
| CN | 102857857 A | 1/2013 |
| CN | 103533480 A | 1/2014 |
| CN | 105282668 A | 1/2016 |
| CN | 108924712 A | 11/2018 |
| CN | 209030416 U | 6/2019 |
| CN | 110602614 A | 12/2019 |
| CN | 210041904 U | 2/2020 |

(Continued)

OTHER PUBLICATIONS

Translation of JP2020065126 (Year: 2020).*

(Continued)

*Primary Examiner* — Phu Vu
(74) *Attorney, Agent, or Firm* — Workman Nydegger

(57) ABSTRACT

A display apparatus is provided in the present disclosure. The display apparatus includes: a screen, including a display area and a non-display area; a backplane, in connection with the screen; and an exciter, in connection with the backplane and is configured to drive the screen to vibrate and output sound via the backplane.

17 Claims, 32 Drawing Sheets

(56) References Cited

FOREIGN PATENT DOCUMENTS

| | | |
|---|---|---|
| CN | 110874203 A | 3/2020 |
| CN | 209982723 U | 3/2020 |
| CN | 110972043 A | 4/2020 |
| CN | 210579216 U | 5/2020 |
| CN | 210641071 U | 5/2020 |
| CN | 111757171 A | 10/2020 |
| CN | 111970613 A | 11/2020 |
| CN | 112218153 A | 1/2021 |
| CN | 112261405 A | 1/2021 |
| CN | 112637732 A | 4/2021 |
| CN | 213339098 U | 6/2021 |
| CN | 214756907 U | 11/2021 |
| CN | 215268711 U | 12/2021 |
| CN | 215298806 U | 12/2021 |
| JP | 2004007039 A | 1/2004 |
| JP | 2013198082 A | 9/2013 |
| JP | 2020065126 A * | 4/2020 |

OTHER PUBLICATIONS

Chinese First Office Action, mailed Sep. 7, 2023, from Chinese Serial No. 202110137533.4, 23 pages.
Chinese Second Office Action, mailed Jan. 6, 2024, from Chinese Serial No. 202110137533.4, 22 pages.
Chinese Decision of Rejection, mailed May 2, 2024, rom Chinese Serial No. 202110137533.4, 21 pages.
International Search Report, mailed Mar. 1, 2022, from PCT/CN2021/134456, 6 pages.
International Search Report, mailed May 19, 2022, from PCT/CN2022/078417, 8 pages.

* cited by examiner

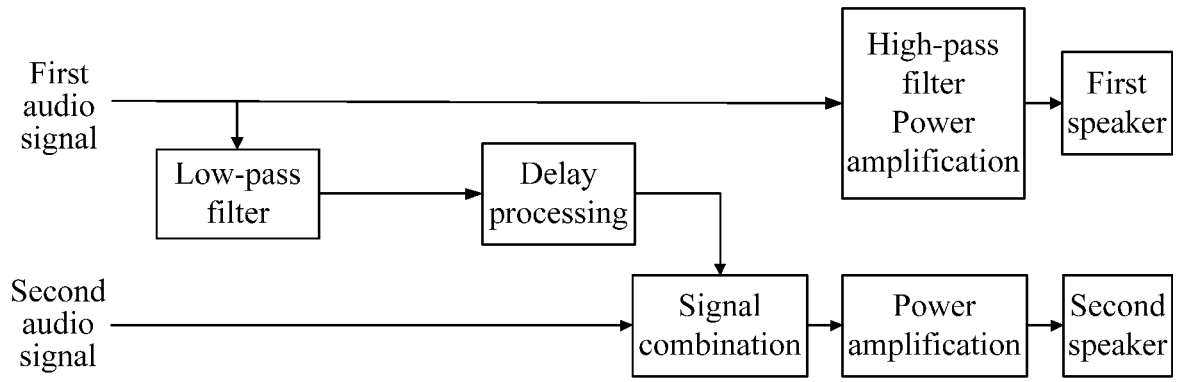

FIG. 53

| Obtaining audio signals of different channels, where the audio signals of different channels include a first audio signal for a first sound output interface and a second audio signal for the second sound output interface, and channels of audio signals output from the first sound output interface and the second sound output interface are different | S100 |

↓

| Dividing the first audio signal into a first sub-signal and a second sub-signal, where a frequency of the first sub-signal is greater than a preset frequency, and a frequency of the second sub-signal is less than or equal to the preset frequency | S200 |

↓

| Sending the first sub-signal to the first sound output interface for output | S300 |

↓

| Performing delay processing on the second sub-signal, obtaining a first combination signal by combining the delayed second sub-signal with the second audio signal, and sending the first combination signal to the second sound output interface for output | S400 |

FIG. 54

DISPLAY DEVICE, EXCITER, AND AUDIO SIGNAL PLAYBACK METHOD

CROSS REFERENCE TO RELATED APPLICATIONS

This application is a continuation application of International Application No. PCT/CN2022/078417, filed on Feb. 28, 2022, which claims the priorities from Chinese Patent Application No. 202110289943.0 filed on Mar. 18, 2021, Chinese Patent Application No. 202121318330.7 filed on Jun. 11, 2021, Chinese Patent Application No. 202110654878.7 filed on Jun. 11, 2021, Chinese Patent Application No. 202110657399.0 filed on Jun. 11, 2021, and Chinese Patent Application No. 202121310664.X filed on Jun. 11, 2021, which are hereby incorporated by references in their entireties.

TECHNICAL FIELD

The present disclosure relates to the field of display technologies, in particular to a display apparatus.

BACKGROUND

As science and technology development and people's living standards improve, liquid crystal displays (LCDs) and other display devices are increasingly used in people's work and life. In the pursuit of the sound effect of display apparatuses, various sound on display apparatuses and multi-channel technologies have been developed, however, the sound on display technology for displays still faces a number of issues.

SUMMARY

Embodiments of the disclosure provide a display apparatus. The display apparatus includes: a screen, including a display area and a non-display area; a backplane, in connection with the screen; and an exciter, in connection with the backplane and is configured to drive the screen to vibrate and output sound via the backplane.

In some embodiments, the backplane includes a backplane body and a vibration portion, where the backplane body is in fixed connection with the non-display area, and the vibration portion is disposed in an area of the backplane corresponding to the non-display area.

In some embodiments, the display area is configured for image display, and the non-display area surrounds the display area. The exciter includes a vibration element in connection with the backplane, where vibration of the vibration element is configured to be transmitted to the backplane and drive the non-display area to vibrate and output sound via the backplane.

In some embodiments, the exciter includes a vibration element in connection with the vibration portion of the backplane, where the vibration portion is configured to deform along with vibration of the vibration element and undergo a reciprocating movement with respect to the backplane body.

In some embodiments, the display apparatus further includes a damper disposed between the backplane and the exciter to increase damping of the vibration portion.

In some embodiments, the damper is made of one or more materials selected from a honeycomb sandwich panel, foam sandwich panel, wood sandwich panel or acrylic panel.

In some embodiments, the backplane is provided with one or more strength reduction parts. The one or more strength reduction parts run through the backplane along a direction vertical to the backplane, and a part of the backplane at two sides of an extension direction of the one or more strength reduction parts serves as the vibration portion.

In some embodiments, a width of an area where the vibration portion locates is 2 to 3 times a width of a strength reduction part among the one or more strength reduction parts.

In some embodiments, the one or more strength reduction parts include a plurality of strength reduction parts arranged in parallel, and a direction of the arrangement of the plurality of strength reduction parts is perpendicular to the extension direction of the plurality of strength reduction parts.

In some embodiments, a part of the backplane between two strength reduction parts among the plurality of strength reduction parts serves as the vibration portion.

In some embodiments, a distance between the vibration portion and an end of a first strength reduction part among the two strength reduction parts is 0.2 to 0.8 times a length of the first strength reduction part.

In some embodiments, the vibration portion is a plate-shaped element of uniform width.

In some embodiments, the display apparatus further includes a buffer element, where the buffer element is disposed between the vibration portion and the non-display area and is capable of deforming under the drive of the vibration portion.

In some embodiments, the backplane includes a plurality of connection parts. The plurality of connection parts are arranged at interval along circumference of the vibration portion, a first end of a first connection part among the plurality of connection parts is connected with the vibration portion, and a second end of the first connection part is connected with the backplane body.

In some embodiments, the first connection part is configured to rotate with the second end as a supporting point under the drive of the vibration portion.

In some embodiments, the exciter includes an exciter body. The vibration element is in connection with the exciter body and is capable of undergoing a reciprocating movement with respect to the exciter body. The exciter body is connected with the backplane body.

In some embodiments, a plurality of exciters are provided, and the plurality of exciters are arranged at interval along the circumference of the screen.

In some embodiments, the exciter includes a magnetostriction exciter, and is disposed at an area of a screen corresponding to the non-display area. The magnetostriction exciter includes a stretchable member, a first movement part, and a second movement part; in a static state, the first movement part is perpendicular to the stretchable member, and the second movement part is inclined to the stretchable member.

In some embodiments, the exciter includes a coil, a stretchable member, and a second vibration element that is elastic, wherein the stretchable member is configured to undergo a telescopic deformation along an axial direction of the coil. The second vibration element includes a first movement part and a second movement part in connection, where the first movement part is in connection with an exciter body and is disposed at an end of the coil along the axial direction of the coil, and the second movement part is in connection the exciter body and is disposed at a side of the coil in a radial direction of the coil.

BRIEF DESCRIPTION OF FIGURES

FIGS. 50-53 each show a schematic diagram for illustrating a signal processing via a processor according to some embodiments of the disclosure.

FIG. 54 shows a schematic flow chart of a method for outputting audio signal according to some embodiments of the disclosure.

REFERENCE NUMERALS

10; screen; 11: display area; 12: non-display area; 20: backplane; 21: backplane body; 22: vibration portion; 23: strength reduction part; 24: connection part; 25: gap 30: exciter; 31: vibration element; 32: exciter body; 301: coil; 302: magnetic element; 303: stretchable member; 304: second vibration element; 3041: first movement part; 30411: limiting hole; 3042: second movement part; 3043: first strength reduction part; 3044: bending part; 3045: second strength reduction part; 3046: fixing part; 3047: connection part; 305: weight element; 306: output element; 307: abutting bolt; 308: limiting element; 309: housing; 3091: plane; 40: buffer element; 50: first adhesive element; 60: rear housing; speaker; 80: circuit board; 90: display module; X: arrangement direction; Y: extension direction; Z: vertical; 300: display panel device; 331: body of rear housing; 332: frame; 3321: third strength reduction part; 334: reinforcement plate.

DETAILED DESCRIPTION

In the related art, display apparatuses include liquid crystal display (LCD) devices, organic light-emitting diode (OLED) display devices and other types of display devices. The LCD device includes a panel and a backlight module stacked behind the panel. The backlight module includes a backlight source, an optical film, a diffusion film, a light guide plate and a reflector, etc., so that the light emitted from the backlight source is evenly emitted towards a side of the screen. For the LCD display devices, in order to reduce manufacture costs, the screen, diffusion film, light guide plate and reflector in the display device are assembled by direct contact, so that there is an air layer between any adjacent two of the screen, diffusion film, light guide plate and reflector. Since vibration between the adjacent two cannot be transmitted via the air layer, and an object blocking the light between the screen and the backlight module cannot exist, the LCD display device only realize speaker sounding, rather than sound on display via vibration. However, comparing with the sound on display via vibration, a position of the speaker sounding is far from corresponding image position.

Figure 1:
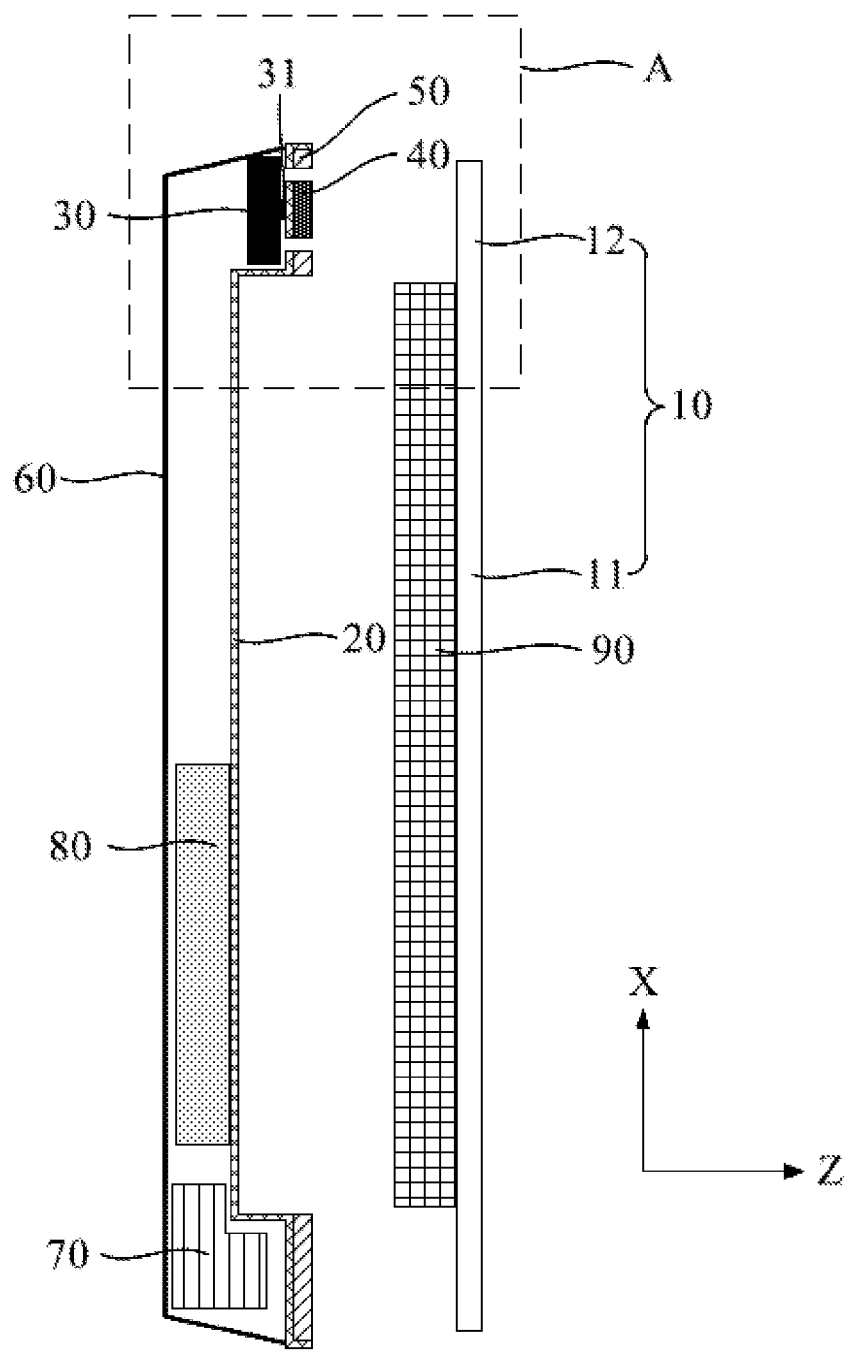
FIG. 1 shows a schematic structural diagram of a display apparatus according to some embodiments of the disclosure.
Figure 2:
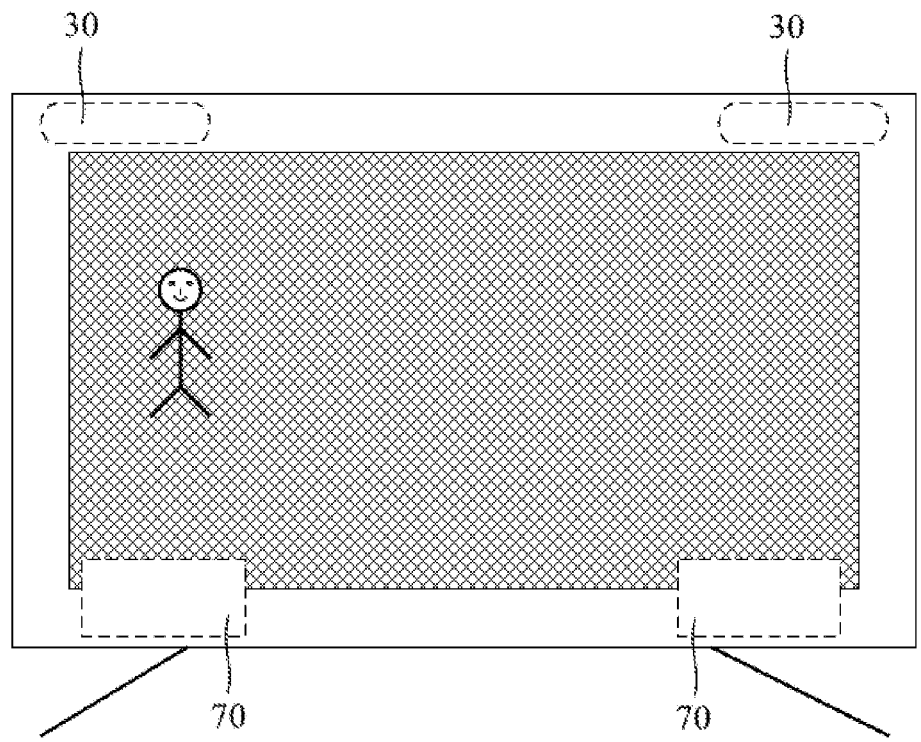
FIG. 2 shows a schematic structural diagram of a display apparatus provided with a plurality of exciters according to some embodiments of the disclosure.
Figure 3:
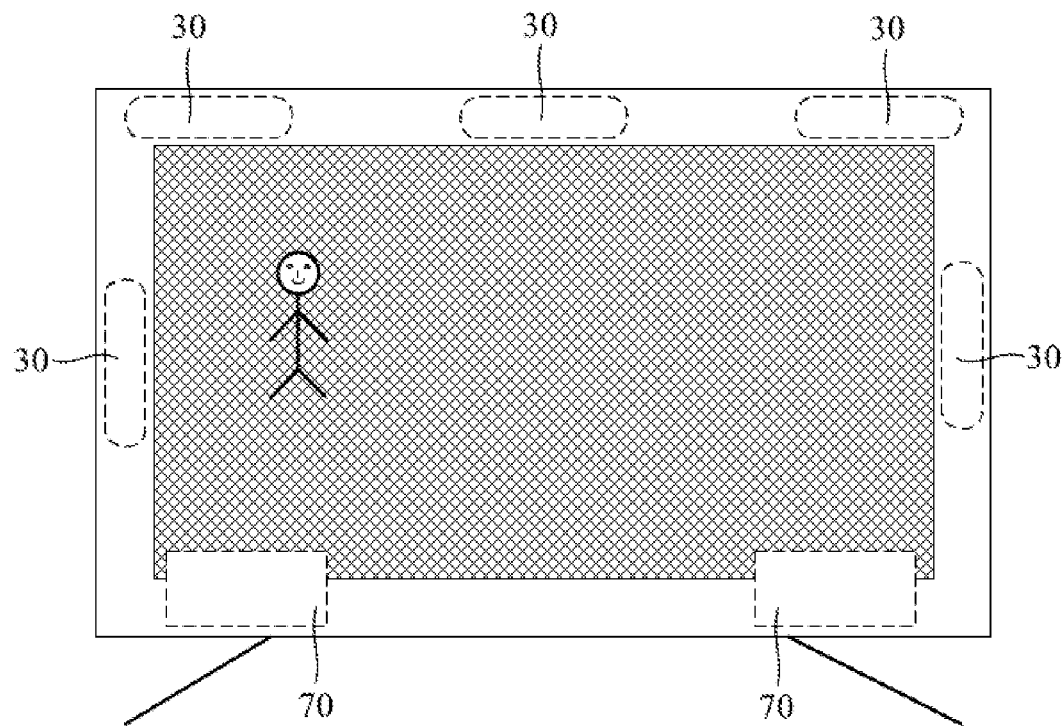
FIG. 3 shows a schematic structural diagram of a display apparatus provided with both exciters and a speaker according to some embodiments of the disclosure.
Figure 4:
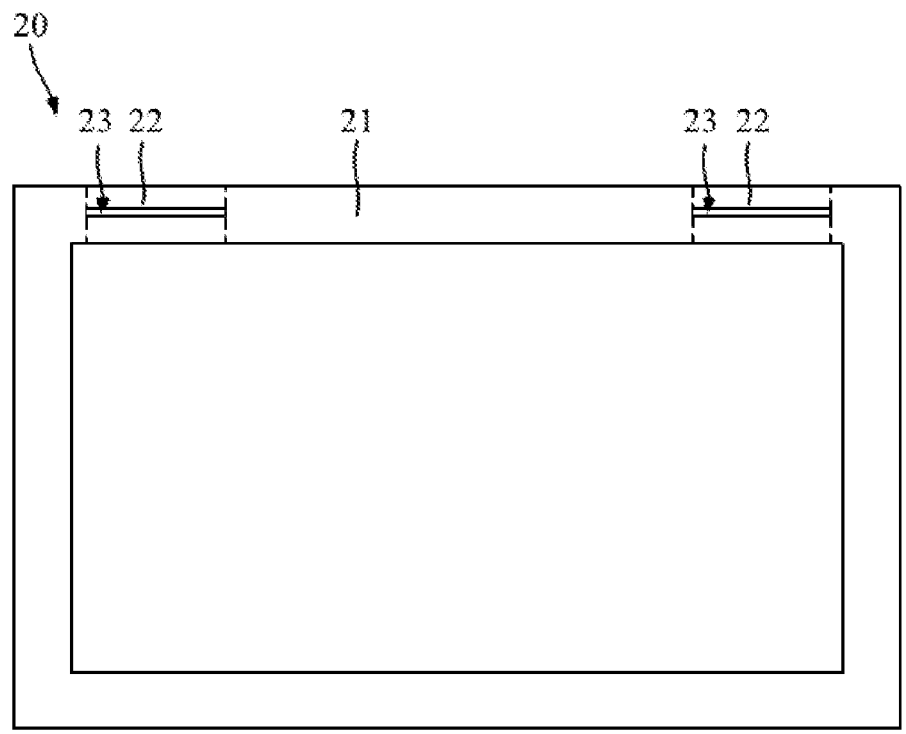
FIGS. 4-6 each show a schematic structural diagram of a backplane shown in FIG. 1.
Figure 5:
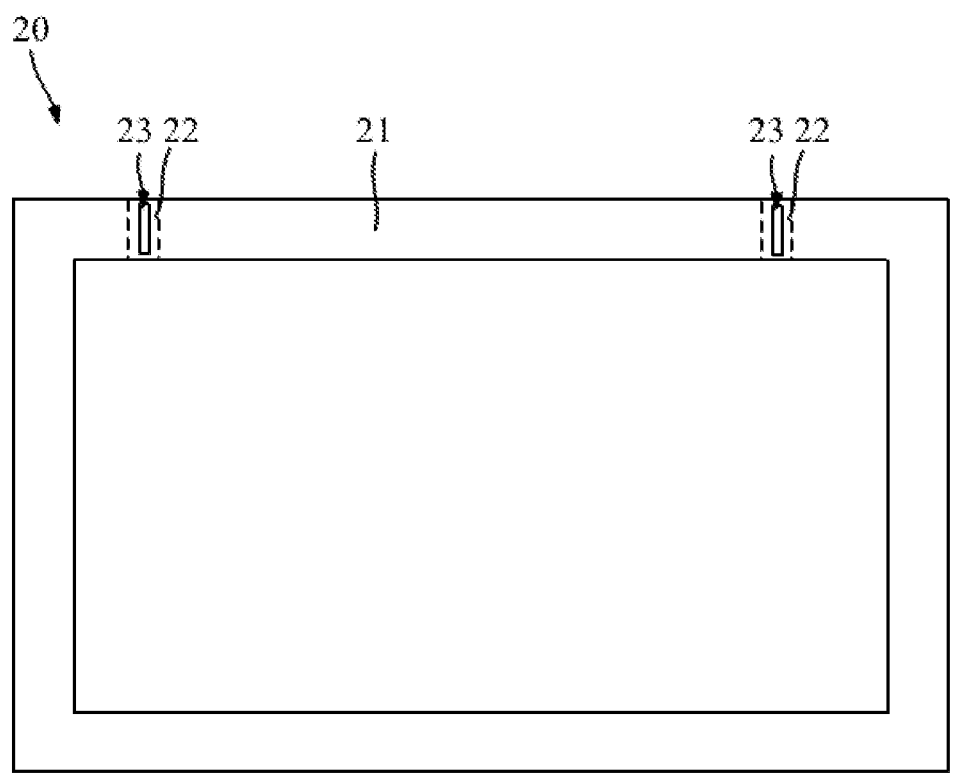
Figure 6:
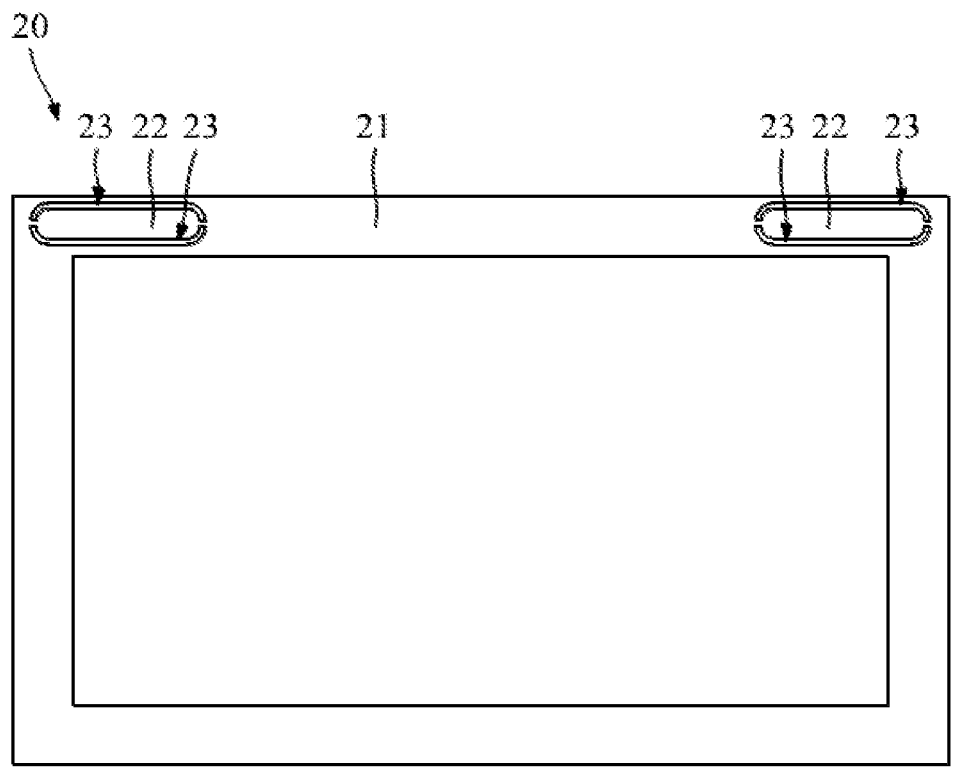
Figure 7:
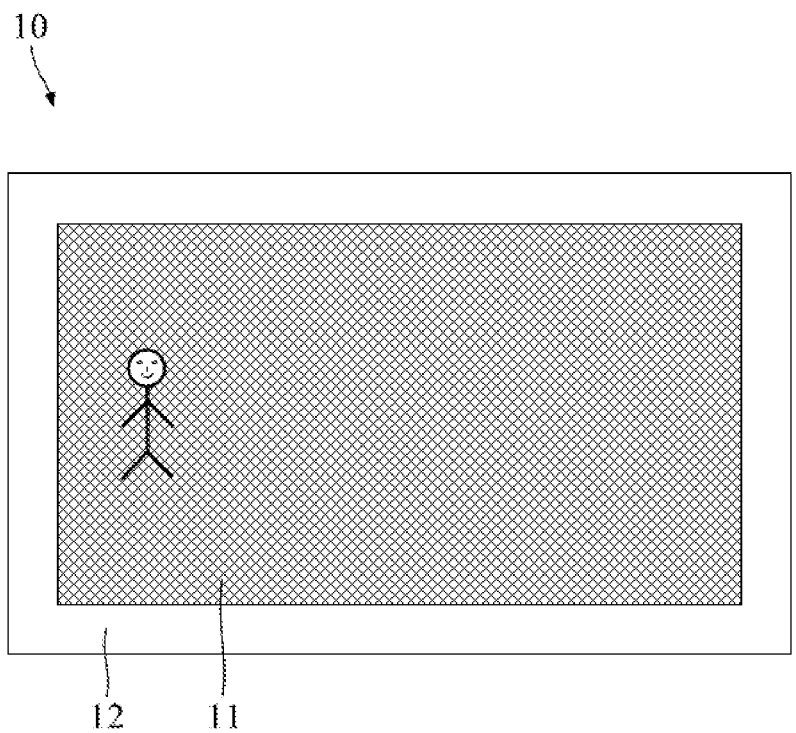
FIG. 7 shows a schematic structural diagram of a screen shown in FIG. 1.
Figure 8:
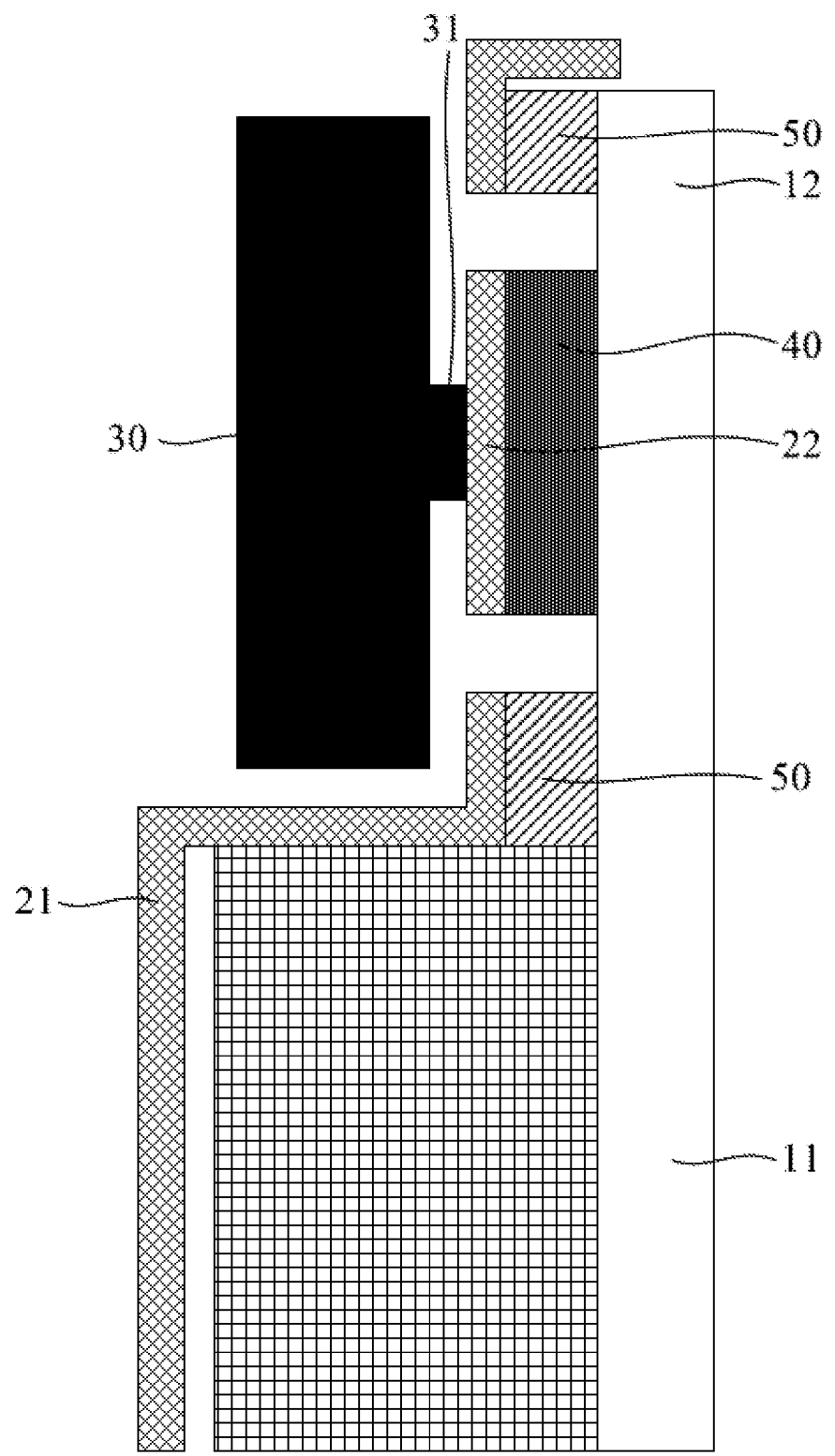
FIG. 8 shows a schematic structural diagram of a structure shown in box A as indicated in FIG. 1.
Figure 9:
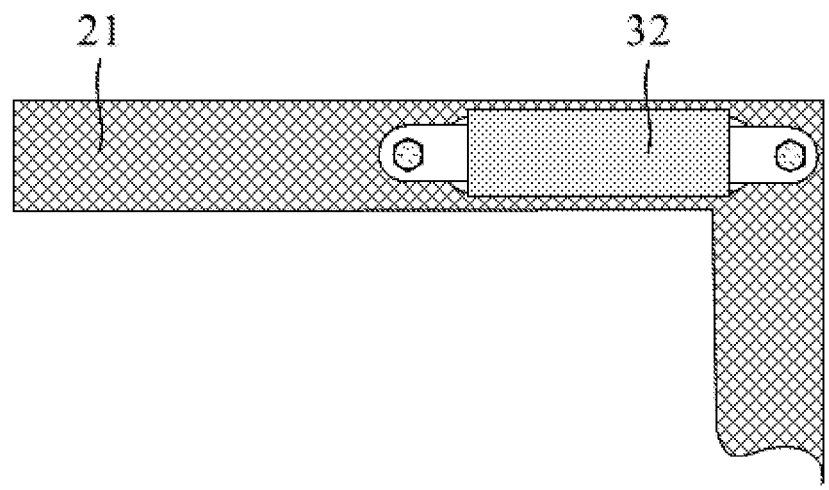
FIGS. 9-10 each show a schematic structural diagram for illustrating a connection between the backplane and the exciter in FIG. 6.
Figure 10:
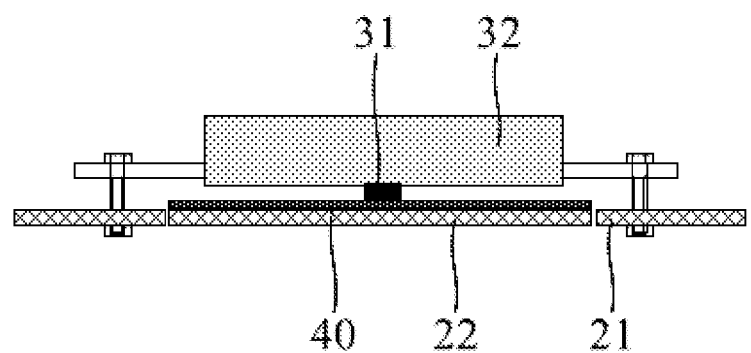

FIG. 1 shows a schematic structural diagram of a display apparatus according to some embodiments of the disclosure. FIG. 2 shows a schematic structural diagram of a display apparatus provided with a plurality of exciters according to some embodiments of the disclosure. FIG. 3 shows a schematic structural diagram of a display apparatus provided with both exciters and a speaker according to some embodiments of the disclosure. FIGS. 4-6 each show a schematic structural diagram of a backplane shown in FIG. 1. FIG. 7 shows a schematic structural diagram of a panel shown in FIG. 1. FIG. 8 shows a schematic structural diagram of structure of a structure shown in box A as indicated in FIG. 1. FIGS. 9-10 each show a schematic structural diagram for illustrating a connection between the backplane and the exciter in FIG. 6.

In embodiments of the disclosure, the display apparatus is provided with one or more exciters. The exciter is in connection with a backplane of the display apparatus, and the backplane of the display apparatus is in connection with a non-display area of a screen of the display apparatus. As such, the exciter can drive the non-display area to vibrate for sounding, and the sound of the display apparatus can have a large sound pressure level, and the position of the sound is closer to the image position.

Referring to FIGS. 1-10, the display apparatus 300 includes a screen 10 which includes a display area 11 and a non-display area 12, a backplane 20 and an exciter(s) 30. The exciter 30 includes a vibration element 31, the vibration element 31 is in connection with the backplane 20, and the vibration of the vibration element 31 can be transmitted to the backplane 20, so that the backplane 20 drives the non-display area 12 to vibrate for sounding.

In some embodiments, the display apparatus 300 includes a rear housing 60 and a display module 90. The display module 90 includes a reflection sheet (not shown in the figures), a light guide plate (not shown in the figures), an optical film (not shown in the figures), and a light source (not shown in the figures) at a side of the backplane 20.

The display apparatus includes a height side, a left side, a right side and bottom side, where the height side and the bottom side are opposite to each other, and the left side and the right side are opposite to each other. The height side is in connection with an end of the left side and an end of the right side respectively, and the bottom side is in connection with the other end of the left side and the other end of the right side respectively. The display apparatus further includes a front side and a rear side, the front side being located on a side where the screen 10 is located, and the rear side being located on a side where the rear housing 60 is located.

The display area 11 is used for image display, the non-display area 12 surrounds the display area 11, and the backplane 20 is in fixed connection with the non-display area 12. In some embodiments, the non-display area 12 is in fixed connection with an edge of the backplane 20 via a first adhesive element 50. The first adhesive element 50 may be foam, double-sided adhesive, etc.

The light source is used to emit light, and the light source is located on the bottom side of the display apparatus. The light source may be a light bar. The display apparatus further includes a circuit board 80 and a plurality of LEDs disposed on the circuit board 80, and the light emitted from the light source is configured to enter the screen from one side.

The reflector is used to reflect light toward a light-emitting direction, which helps to an evenly distribution of the light emitted from the light source. The reflector is attached to a surface of the backplane 20. The reflector has a white reflective surface, and the reflector is made of PET.

The light guide plate includes a light incident side and a light emitting side, and the light source is disposed on the light incident side of the light guide plate. The light entering into the light incident side can be emitted from the light emitting side of the light guide plate by refraction and total reflection of the light guide plate, thereby converting the line light source into a surface light source.

The reflector is located at a side opposite to the light emitting side of the light guide plate.

The light guide plate is made of materials such as glass, PMMA (Polymethylmethacrylate) or PC.

The optical film is located at the light emitting side of the light guide plate and is used to brighten the light.

The optical film includes one or more film sheets, and includes at least one of prismatic film or brightening film.

The exciter 30 is used to drive a sound generator to vibrate for sound output. In some embodiments, the exciter 30 is any of an electromagnetic exciter, a magnetostriction exciter or a piezoelectric exciter. The exciter 30 includes a vibration element 31, where when the exciter 30 is the electromagnetic exciter, the vibration element 31 may be a voice coil; and when the exciter 30 is the magnetostriction exciter, the vibration element 31 may be a magnetostrictive rod.

In some embodiments, the sound generator is the screen 10. The non-display area 12 is in connection with an edge of the backplane 20. In this way, the vibration element 31 and the backplane 20 are in connection. Vibration of the vibration element 31 can cause the backplane 20 to vibrate, and the vibration of the backplane 20 is transmitted to the non-display area 12, which can cause the non-display area 12 to vibrate for sound output.

In some embodiments, the vibration element 31 is in connection with an edge of the backplane 20, so that the vibration of the backplane 20 can be directly transmitted to the non-display area 12, the transmission path of the vibration of the backplane 20 is small, and the loss of the vibration energy is small.

In some embodiments, the backplane 20 may be made of materials such as aluminium alloy, steel, etc. When a size of the screen 10 is smaller, the backplane 20 may be made of aluminium alloy or steel with a relative small thickness. When the size of the screen 10 is larger, the backplane 20 may be made of steel, and the backplane 20 is relatively thick.

In some embodiments, the vibration element 31 may be indirectly connected with the backplane 20. In view of the fact that the damping of the backplane 20 is small, the vibration element 31 and the backplane 20 may be provided with a damper to increase the damping at the connection position of the vibration element 31 of the backplane 20. In this case, the damping of the non-display area 12 is improved, and a frequency range of the sound emitted from the non-display area 12 is amplified, so that obvious peaks and valleys and distortion of the sound emitted from the non-display area 12 affecting the auditory perception can be avoided.

In some embodiments, the damper can be a honeycomb sandwich board, foam sandwich board, wood sandwich board or acrylic board, which is low cost and easy to obtain. The damper can be foaming member made of polyurethane or other materials.

It is noted that the backplane 20 made of different materials and the backplane 20 with different thicknesses have different Young's modulus. In this case, the backplane 20 made of different materials and the backplane 20 with different thicknesses have different abilities to resist deformation. As such, by reducing the thickness of the backplane 20 or using a material that is easily deformable, such as aluminium alloy, etc., the Young's modulus of the backplane 20 can be reduced and the deformability of the edge of the backplane 20 is improved.

In order to easily drive the edge of the backplane 20 to deform, in some embodiments, the backplane 20 includes a backplane body 21 and a vibration portion 22. The backplane body 21 is in fixed connection with the non-display area 12. The vibration portion 22 is provided at a position of the backplane 20 corresponding to the non-display area 12, and the vibration portion 22 is in connection with the vibration element 31. The vibration portion 22 can be deformed under the vibration of the vibration element 31 and move back and forth relative to the backplane body 21.

In this case, the backplane includes the backplane body 21 and the vibration portion 22. The backplane body 21 is relatively fixed with the non-display area 12 via the first adhesive element 50, and a relative displacement between the backplane body 21 and the non-display area 12 is small. The vibration portion 22 and the non-display area 12 are not relatively fixed, the Young's modulus of the vibration portion 22 is small, and the relative displacement between the vibration portion 22 and the non-display area 12 has a large relative displacement. When the exciter 30 operates, the vibration portion 22 can move back and forth relative to the backplane body 21 along with the vibration element 31. In this case, the backplane body 21 is not deformed, and the backplane body 21 and the non-display region 12 can still have a relatively stable connection.

In some embodiments, the vibration portion 22 itself may be deformed to achieve relative movement of the vibration portion 22 to the backplane body 21. The backplane 20 is provided with a strength reduction part 23, and the strength reduction part 23 runs through the backplane 20 along a direction vertical to the backplane 20. A part of the backplane 20 located at both sides along the extension direction of the strength reduction part 23 forms the vibration portion 22.

Here, the number of the strength reduction part 23 may be one, and the strength reduction part 23 extends in different directions. Referring to FIG. 4, when the strength reduction part 23 extends along the edge of the backplane 20, an area enclosed by the dotted line in FIG. 4 indicates the vibration portion 22. Referring to FIG. 5, when the extension direction of the strength reduction part 23 is set perpendicular to the edge of the back plate 20, an area enclosed by the dotted portion in FIG. 5 indicates the part of the backplane 20 located at both sides of the extension direction, and the width of the area may be 2 to 3 times the width of the strength reduction part 23.

The number of the strength reduction parts 23 may be two, and an arrangement direction X of the two strength reduction parts 23 and an extension direction Y of the strength reduction parts 23 are perpendicular to each other. Here, a part of the backplane 20 located between the two strength reduction parts 23 serves as the vibration portion 22. As such, the vibration portion 22 as a whole can have a large amount of deformation, and when the vibration element 31 vibrates, the vibration portion 22 is deformed under the drive of the vibration element 31 and protrudes from a side surface of the backplane 20 to drive the non-display area 12 to vibrate for sound output.

Figure 11:
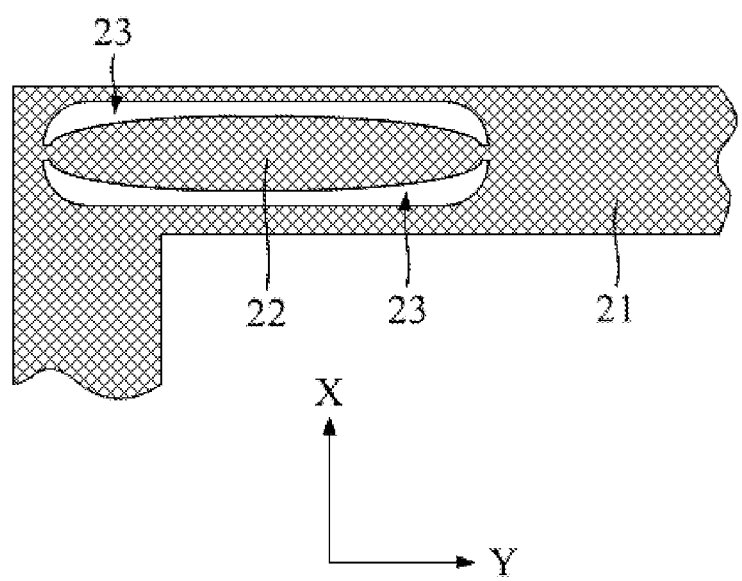
FIGS. 11-14 each show a schematic structural diagram of a vibration portion in FIG. 6.

The arrangement direction X and the extension direction Y may extend along the adjacent sides of the backplane 20, respectively, where the arrangement direction X and the extension direction Y are perpendicular to a vertical direction Z respectively. In some embodiments, FIGS. 11-14 each show a schematic diagram of the structure of the vibration portion shown in FIG. 6. With reference to FIGS. 6 and 11, the extension direction Y is an extension direction of an edge of the backplane 20.

It is noted that when the vibration portion 22 is located between the two strength reduction parts 23, the relative movement of the vibration portion 22 to the backplane body 21 is realized by the deformation of the vibration portion 22, and the closer to the end of the strength reduction part 23 is, the smaller the deformation of the vibration portion 22 is. Thus, the vibration element 31 may be disposed at a center of the vibrating portion 22 along the extension direction Y. In some embodiments, a distance between the vibration element 31 and one end of the strength reduction part 23 may be 0.2 to 0.8 times the length of the strength reduction part 23.

Here, the vibration portion 22 may be a plate-shaped element of uniform width. In order to assist the vibration portion 22 to deform under the drive of the vibration element 31, in some embodiments, when the vibration portion 22 is located between the two strength reduction parts 23, referring to FIGS. 6 and 11, the width of both ends of the vibration portion 22 along the arrangement direction X is smaller than the width of the other positions of the vibration portion 22 in the arrangement direction X. In this case, a size of the center of the vibration portion 22 is larger than a size of both ends of the vibration portion 22.

In some embodiments, for the vibration portion 22, referring to FIG. 9, the size of the vibration portion 22 along the arrangement direction may be changed gradually. As such, the strength of the vibration portion 22 is relative high to avoid cracking of the vibration portion 22 during the vibration.

In some embodiments, referring to FIG. 6, for the strength reduction part 23, along the extension direction Y of the strength reduction part 23, the strength reduction part 23 may be a strip-shaped hole of uniform width. Referring to FIG. 11, the width of both ends of the strength reduction part 23 may be larger than the width of the middle of the strength reduction part 23. Here, the disclosure does not intend to limit the shapes of the strength reduction part 23 and the vibration portion 22.

Figure 12:
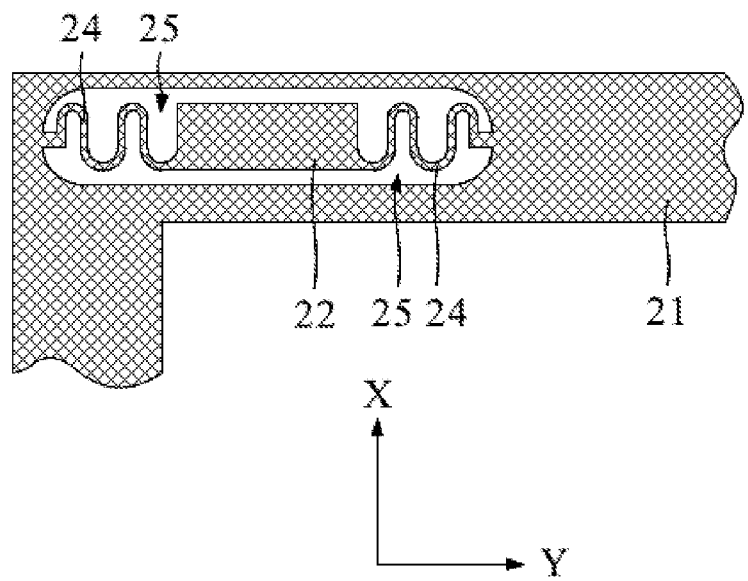
Figure 13:
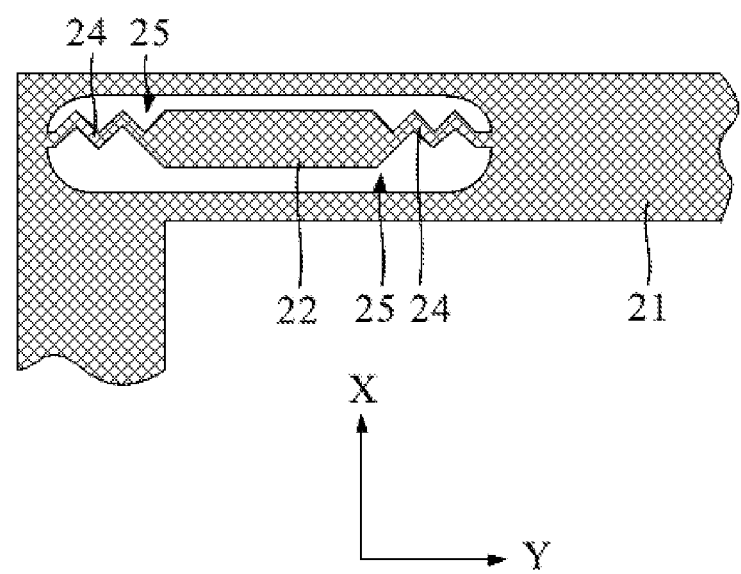
Figure 14:
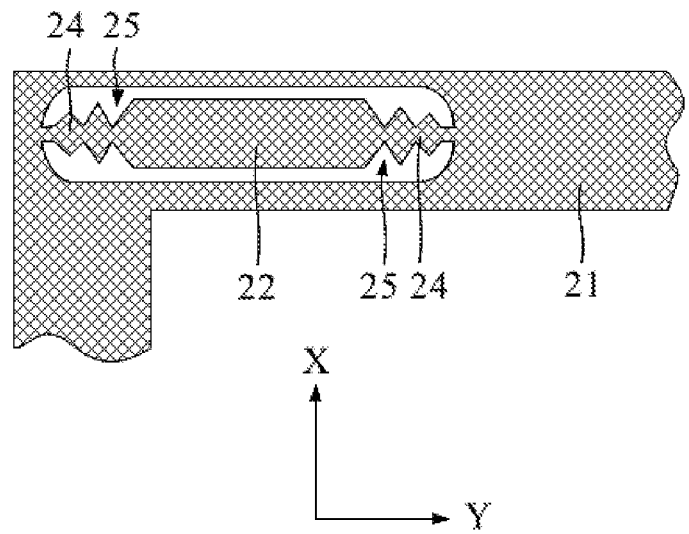

Referring to FIGS. 12 to 14, in some embodiments, an elastic connection structure may be provided between the vibration portion 22 and the backplane body 21, and the relative movement of the vibration portion 22 to the backplane body 21 may be realized by the expansion and contraction of the elastic connection structure. In some embodiments, the backplane 20 includes a plurality of connection parts 24, and the plurality of connection parts 24 are arranged at interval along the circumference of the vibration portion 22. A first end of each connection part 24 is in connection with the vibration portion 22, and a second end of each connection part 24 is in connection with the backplane body 21. The connection part 24 may rotate with the second end as a fulcrum under the drive of the vibration portion 22.

In some embodiments, the connection part 24 may have a different structure. For example, the connection part 24 may be a spring, etc. In this way, the vibration element 31 can drive the vibration portion 22 to move back and forth in the direction close to or far away from the screen via the expansion and deformation of the connection part 24.

In some embodiments, the connection part 24 may be a strip-shaped member. The relative movement of the vibration portion 22 to the backplane body 21 can be realized via the bending deformation of the connection part 24. In this case, referring to FIG. 6, an extension direction of the connection part 24 may be parallel to an extension direction of the vibration portion 22.

Referring to FIGS. 12 to 14, in some embodiments, the connection part 24 is set as a jagged line along its own length direction. In this way, the connection part 24 is prone to deformation, and the vibration of the vibration element 31 can be effectively transmitted to the vibration portion 22, reducing vibration energy loss of the vibration element 31.

Here, the vibration portion 22 and the backplane body 21 may be two parts independent from each other, and the vibration portion 22 is disposed on a side of the backplane body 21 facing the screen 10. In some embodiments, referring to FIGS. 12-14, the backplane body 21 is provided with a gap 25 for receiving the vibration portion 22 and the plurality of connection parts 24.

In this case, when the backplane body 21 and the non-display area 12 are fixed via the first adhesive element 50, a situation where the backplane body 21 and the non-display area 12 and the bonding therebetween is separated and not firm due to the vibration portion 22 or the connection part 24 protruding from the backplane body 21, should be avoided.

In some embodiments, the vibration portion 22 and the connection part 24 may be integrated with the backplane body 21. In some embodiments, referring to FIGS. 12-14, the vibration portion 22 and the connection part 24 may be formed by drilling holes on the backplane 20. In this case, side wall surfaces of the vibration portion 22 and the connection part 24 and a side wall surface of the backplane body 21 are located on the same plane.

The exciter 30 further comprises an exciter body 32, and the vibration element 31 is connected with the exciter body 32 and is capable of reciprocating movement relative to the exciter body 32. The exciter body 32 can be connected with the vibration portion 22 and can drive the vibration portion 22 to vibrate based on the weight of the exciter body 32. In this case, it is equivalent to increasing the equivalent weight and equivalent density of the vibration portion 22 so as to assist the vibration portion 22 to excite sound of low frequency to satisfy the requirements for low frequency sound of the display apparatus.

In some embodiments, the exciter body 32 is in fixed connection with the backplane body 21 by, e.g. bolted connection, rivet connection, boding, etc. Thus, the exciter body 32 is relatively fixed to the backplane body 21. When the exciter 30 operates, the vibration element 31 can be stretched and contracted relative to the exciter body 32 and drive the vibration portion 22 to move back and forth.

In some embodiments, the display apparatus further includes a buffer element 40 that is elastic, where the buffer element 40 is disposed between the vibration portion 22 and the non-display area 12.

The buffer element 40 may be in fixed connection with at least one of the vibration portion 22 and the non-display area 12. In some embodiments, the buffer element 40 may be in connection with both the vibration portion 22 and the non-display area 12 to avoid noise produced by collision between the vibration portion 22, the buffer element 40 and the non-display area 12 during the vibration of the vibration portion 22.

The buffer element 40 may be made of a rubber, silicone or other material. The buffer element 40 is in fixed connection with the vibration portion 22 and the non-display area 12 via a second adhesive element. Of course, the buffer element 40 may be a sticky element, such as foam, double-sided adhesive, etc., to reduce the influence on the non-display area 12.

In some embodiments, the buffer element 40 may have a large stiffness, and in some embodiments, the stiffness of the buffer element 40 is greater than the stiffness of the first adhesive element 50, so that the vibration amplitude of the vibrating portion 22 can be effectively transmitted to the non-display area 12, reducing the amount of vibration energy loss of the vibration portion 22 at the buffer element 40, so that the sound from the non-display area 12 has a preset sound pressure level. Meanwhile, the first adhesive element 50 has a small stiffness, during the vibration of the non-display area 12, relative movement between the non-display area 12 and the backplane body 21 is allowed, so that shear deformation between two parts of the non-display area 12 corresponding respectively to the buffer element 40 and the first adhesive element 50 is avoided.

In some embodiments, there are a plurality of exciters 30, and the plurality of exciters 30 are provided at interval along the circumference of the screen 10. In this case, the plurality of exciters 30 can form a stereo system, thereby enhancing the user experience.

It is noted that, people are less sensitive to the acoustic perception of sound produced by surface vibration. Thus, a plurality of exciters 30 can be disposed at any position around the circumference of the screen 10, and a centre of the sound image perceived by the user is approximately at a centre of the screen 10.

In some embodiments, when the width of the non-display area 12 is large, such as a width of 20 mm-30 mm, the non-display area 12 may have a larger vibration amplitude and the sound from the non-display area 12 is of better sound quality. When the width of the non-display area 12 is small, such as a width of 3 mm-5 mm, the vibration amplitude of the non-display area 12 is less, the sound from the non-display area 12 has a lower sound pressure level, and the bass effect is poor.

In some embodiments, the display apparatus further includes a speaker 70, where the speaker 70 and the exciter 30 are arranged alternatively along the circumference of the screen 10. In this way, the speaker 70 and the exciter 30 can cooperate to allow superposition of the sound from the speaker 70 and the sound from the non-display area 12, and the superimposed sound has a large sound pressure level in the low frequency band.

Figure 15:
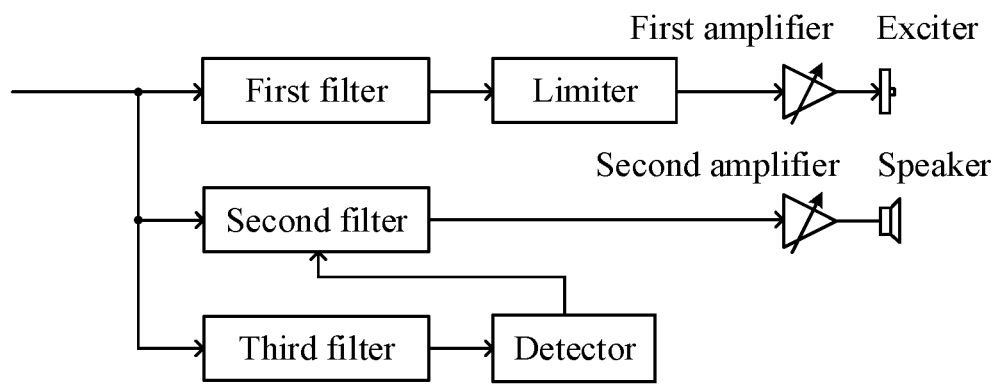
FIG. 15 shows a system architecture diagram of the display apparatus in FIG. 3.
Figure 16:
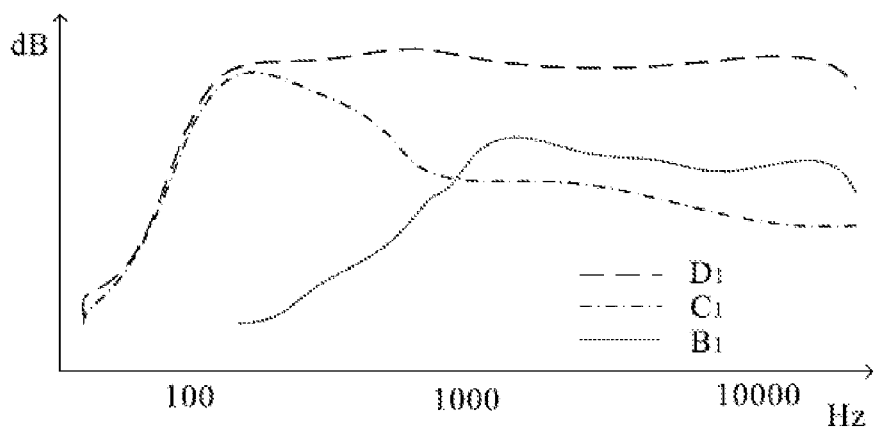
FIGS. 16-18 each show a schematic diagram of frequency response curves for the speaker, the exciter and a superposition of the loudspeaker and the exciter respectively.
Figure 17:
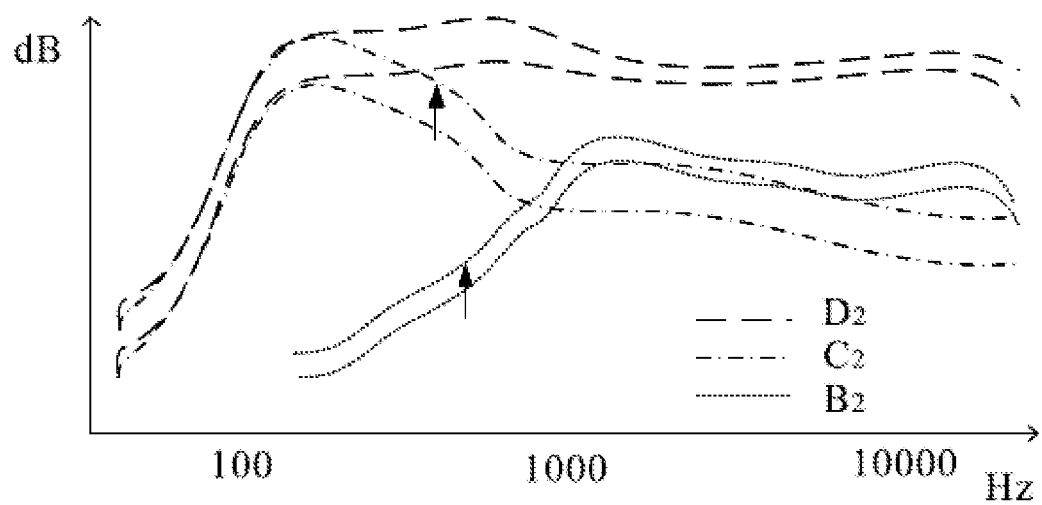
Figure 18:
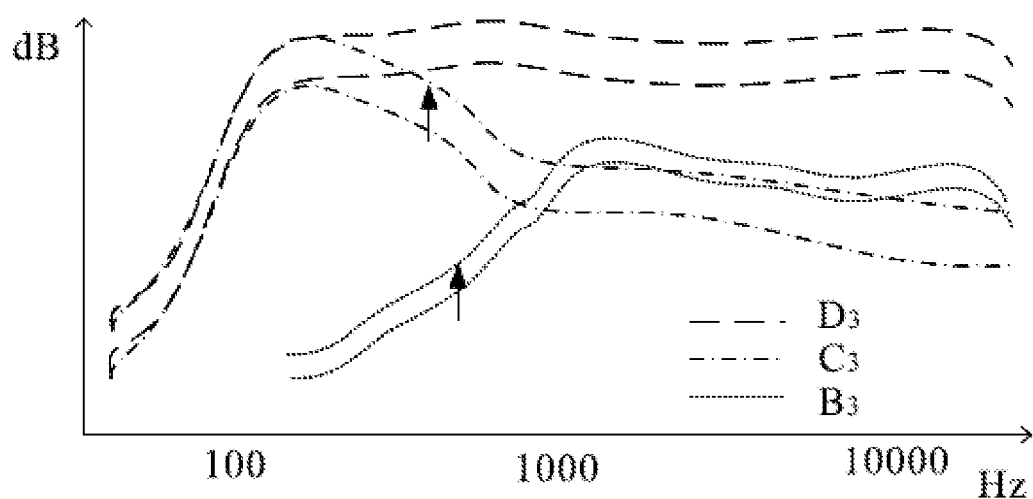

FIG. 15 shows a system architecture diagram of the display apparatus in FIG. 3. FIGS. 16-18 each show a schematic diagram of frequency response curves for the speaker, the exciter and a superposition of the loudspeaker and the exciter respectively.

Referring to FIGS. 15 to 18, the display apparatus further includes a processor, a first filter whose input is connected with the processor, a limiter with a first end being connected with an output of the first filter and a second end being connected with an input of the exciter 30, a second filter whose input is connected with the processor and whose output is connected with the speaker 70, and a third filter whose input is connected with the processor and whose output is connected with the input of the second filter in response to a strength of an input signal of the exciter 30 being greater than the preset value.

Here, curve B1 indicates the frequency response curve of the sound from the non-display area 12, and curve C1 indicates the frequency response curve of the sound from the speaker 70. The speaker 70 is capable of generating sound of full-frequency, and a volume of sound of high-frequency from the non-display area 12 is larger, such as the frequency band larger than 1000 Hz shown in FIG. 17, while a volume of sound of frequency smaller than 1000 Hz is lower. In some embodiments, in order to make the superimposed sound have a relatively flat frequency response curve, the frequency band greater than 1000 Hz of the sound from the speaker 70 may be attenuated by a second filter, and meanwhile the frequency band lower than 1000 Hz of sound from the non-display area 12 is attenuated by the first filter, so that the superposition of the sound from the speaker 70 and the sound from the non-display area 12 may have a flat frequency response curve as indicated by curve D1.

Considering that the exciter 30 drives the non-display area 12 to vibrate for sound output via the vibration portion 22, when the vibration amplitude of the vibration portion 22 is large, it may cause the non-display area 12 to break. Thus, the output of the first filter is connected with a limiter to limit a maximum output voltage of a control signal for the exciter 30.

In some embodiments, the control signal for the exciter 30 output from the limiter may be sent to the exciter 30 via a first amplifier. The control signal output from the second filter may also be output to the speaker 70 via a second amplifier.

Thus, in the band of superimposed sound greater than 1000 Hz, the sound from the non-display area 12 has a large proportion relative to the sound from the speaker 70. In the band of the superimposed sound less than 1000 Hz, the sound from the speaker 70 has a large proportion relative to the sound from the non-display area 12.

In some embodiments, dynamic volume ranges for the speaker 70 and the exciter 30 are different. In some embodiments, referring to FIGS. 17 and 18, when the input signal increases, curves B2 and B3 indicate a change of the frequency response curves for the sound from the non-display area 12, and curves C2 and C3 indicate a change of the frequency response curves for the sound from the speaker 70. In this case, when the input signal increases, the volume change of the sound from the speaker 70 is approximately twice the volume change of the sound from the non-display area 12.

In the low frequency band below 1000 Hz, the volume of the sound from speaker 70 is larger than that of the non-display area 12, and in the high frequency band above 1000 Hz, the volume of the sound from the non-display area 12 is larger than that of speaker 70. Based on this, after increase of the volume, the volume change of the sound in high-frequency band is relatively small and the volume change of the sound in the low-frequency band is relatively large. As shown in curve D2, the volume of the superimposed sound in the high-frequency band is lower than the volume of the sound in the low-frequency band, and the clarity of the superimposed sound is poor.

Therefore, when the display apparatus has a large volume, the high frequency band of the sound from speaker 70 can be compensated by a third filter so that the superimposed sound can still have a frequency response curve, which is relatively flat, as illustrated in curve D3.

In some embodiments, a detector may be provided at the input or output of the third filter, and the detector is used to detect a strength of the input signal of the exciter 30. When the strength of the input signal of the exciter 30 is greater than a preset value, the detector can connect with the output of the third filter and the input of the second filter to compensate the speaker 70. When the strength of the input signal detected by the detector is less than the preset value, the detector may be disconnected with the output of the third filter and the input of the second filter.

In some embodiments, a sound pressure level of the sound from the non-display area 12 has an upper limit value and is lower than a sound pressure level of the sound from the speaker 70. There may be a plurality of preset values, for example, a first preset value and a second preset value. When the strength of the input signal of the exciter 30 is a first preset value, the sound pressure level of the sound from the non-display area 12 reaches the upper limit. In this case, when the strength of the input signal of the exciter 30 is the first preset value, the speaker 70 is provided with a first compensation amount, and when the strength of the input signal of the exciter 30 is the second preset value, the speaker 70 is provided with a second compensation amount, and the first compensation amount is smaller than the second compensation amount.

In some embodiments, the above preset value varies dynamically, which is associated with the strength of the input signal of the exciter 30, etc., which is not limited in the disclosure.

From the above embodiments, in the low frequency band below 1000 Hz of the superimposed sound, the volume of sound from the speaker 70 is larger than that of the sound from the non-display area 12. People are less sensitive to the acoustic image perception of sound in the frequency band smaller than 1000 Hz. Therefore, the speaker 70 can be placed at any position along the circumference of the screen 10. In some embodiments, there may be a plurality of speakers 70 provided on the bottom side of the screen 10.

Since people are less sensitive to the acoustic image perception of sound produced by surface vibration, in some embodiments, the exciter 30 may also be placed at any position along the circumference of the screen 10.

In some embodiments, referring to FIG. 3, a centre of the height side of the screen 10 may be provided with an exciter 30 which may be used as a centre speaker 70 and may be decoded by the decoder to emit a white sound. The left and right sides of the screen 10 may each be provided with an exciter 30 to expand the range of the sound field of the superimposed sound and to enhance the stereoscopic sense of the sound.

In the above display apparatus, the exciter is connected with the backplane of the display apparatus, the backplane is connected with the non-display area of the screen, and the exciter drives the non-display area to vibrate for output sound, which solves the problem in the related art that the screen of the display apparatus cannot vibrate for output sound. However, the above display apparatus still faces some issues.

Display apparatuses with sound on display function, such as the display apparatus described above, have better sound quality than display apparatuses equipped with conventional speakers. Display apparatuses with the sound on display function include screen and exciter, where the exciter drives the screen to vibrate for output sound. However, in the related art, due to the large thickness of the exciter in the thickness direction of the display apparatus, which makes it difficult to have a thin display apparatus.

Figure 19:
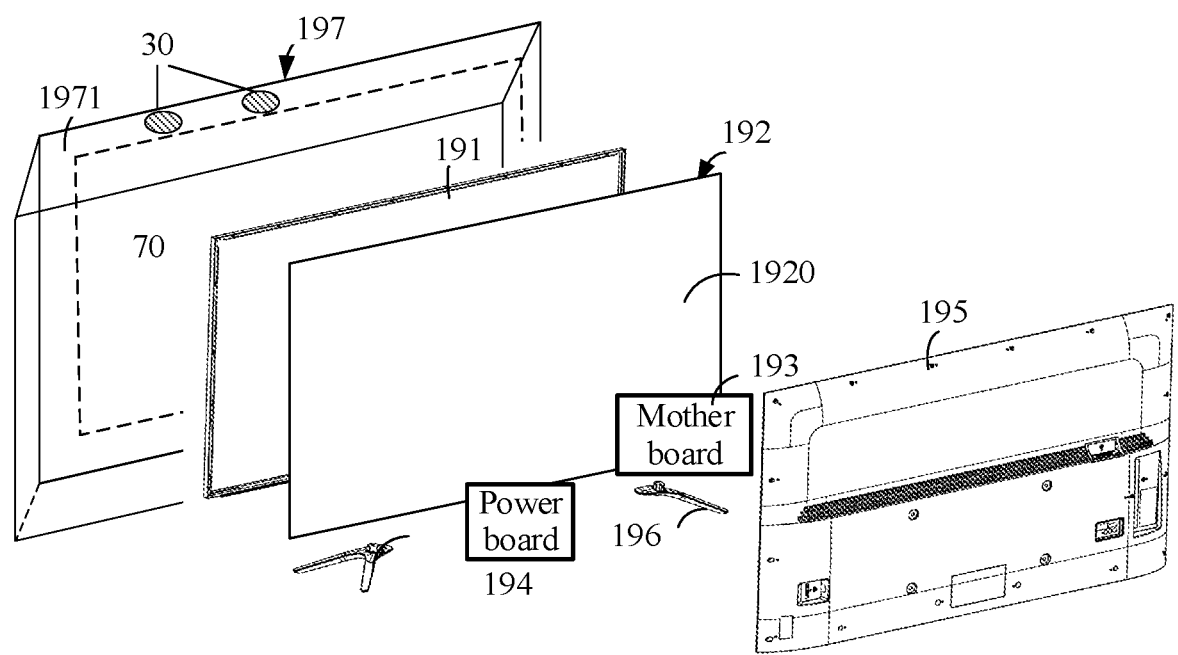
FIG. 19 shows a schematic diagram of a display apparatus with sound on display according to some embodiments of the disclosure.

As shown in FIG. 19, taking the LCD device as an example, the display apparatus generally includes a panel 191 (i.e., screen), a backlight module 192, a mother board 193, a power board 194, a rear cover 195 and a base 196. The panel 191 is used for image display for the user. The backlight module 192 is located below the panel 191, usually includes some optical elements, and is used to provide a light source of sufficient luminance and evenly distribution in such a way that the panel 191 can normally display images. The backlight module 192 further includes the back panel 1920, and the motherboard 193 and the power board 194 are disposed on the back panel 1920. Some convex structures are usually formed by stamping on the back panel 1920, and the mother board 193 and the power board 194 are attached to the convex structures by screws or hooks. The rear cover 195 is provided on the panel 191 to hide the parts of the display apparatus such as the backlight module 192, the mother board 193 and the power board 194, which is used for an aesthetic effect. The base 196 is used for support of the display apparatus.

In some embodiments, FIG. 19 shows a schematic diagram of a display apparatus capable of sound output on display according to some embodiments of the disclosure. The display apparatus further includes a front cover 197 and an exciter 30. The front cover 197 and the rear cover 195 together enclose an accommodation space, where the panel 191, the backlight module 192, the mother board 193 and the power board 194 are accommodated in the accommodation space. The front cover 197 is provided with a transparent area 70 corresponding to the panel 191, to ensure that the image from the panel 191 can be normally displayed through the front cover 197. The front cover 197 is also provided with a non-transparent area 1971, and a plurality of exciters 30 are provided on the non-transparent area 1971. In this case, the exciters 30 are not visible from the front of the display apparatus. The exciter 30 operates to cause the front cover 197 to vibrate for sound output. However, this structure causes thickness increase of the display apparatus, which is not helpful for making the product thinner.

In order to reduce the thickness of the display apparatus and to realize the flattening of the display apparatus, embodiments of the disclosure provide a display apparatus.

In some embodiments, the display apparatus includes a first vibration element, the exciter includes a second vibration element, and the second vibration element includes a first movement part and a second movement part. The first movement part is located at an end of the coil and can move back and forth under the action of the stretchable member and its own elastic force, and the second movement part is located at a side of the coil along its own radial direction and is connected with the first movement part. The second movement part can move back and forth under the action of the first movement part or its own elastic force, to drive the first vibration element to vibrate and output sound. Here, a direction of the reciprocating movement of the second movement part is inclined to the axial direction of the coil.

In this case, the second vibration element is provided, the exciter can be tilted relative to the first vibration portion. Taking the display panel device as an example of the display apparatus, the axis direction of the coil and the display panel are not perpendicular to each other, so that the exciter does not increase the thickness and size of the display apparatus, which is helpful to obtain a flattening product.

The display apparatus according to embodiments of the disclosure includes a body and the exciter 30. The exciter 30 is used to drive the exciter body to vibrate and output sound. For the sake of illustration, the part that generates sound on the exciter body is referred to as the first vibration element. Here, the display apparatus may be the above display panel device 300, etc.

The structure of the display apparatus is illustrated below by taking the display panel device 300 as an example.

Figure 20:
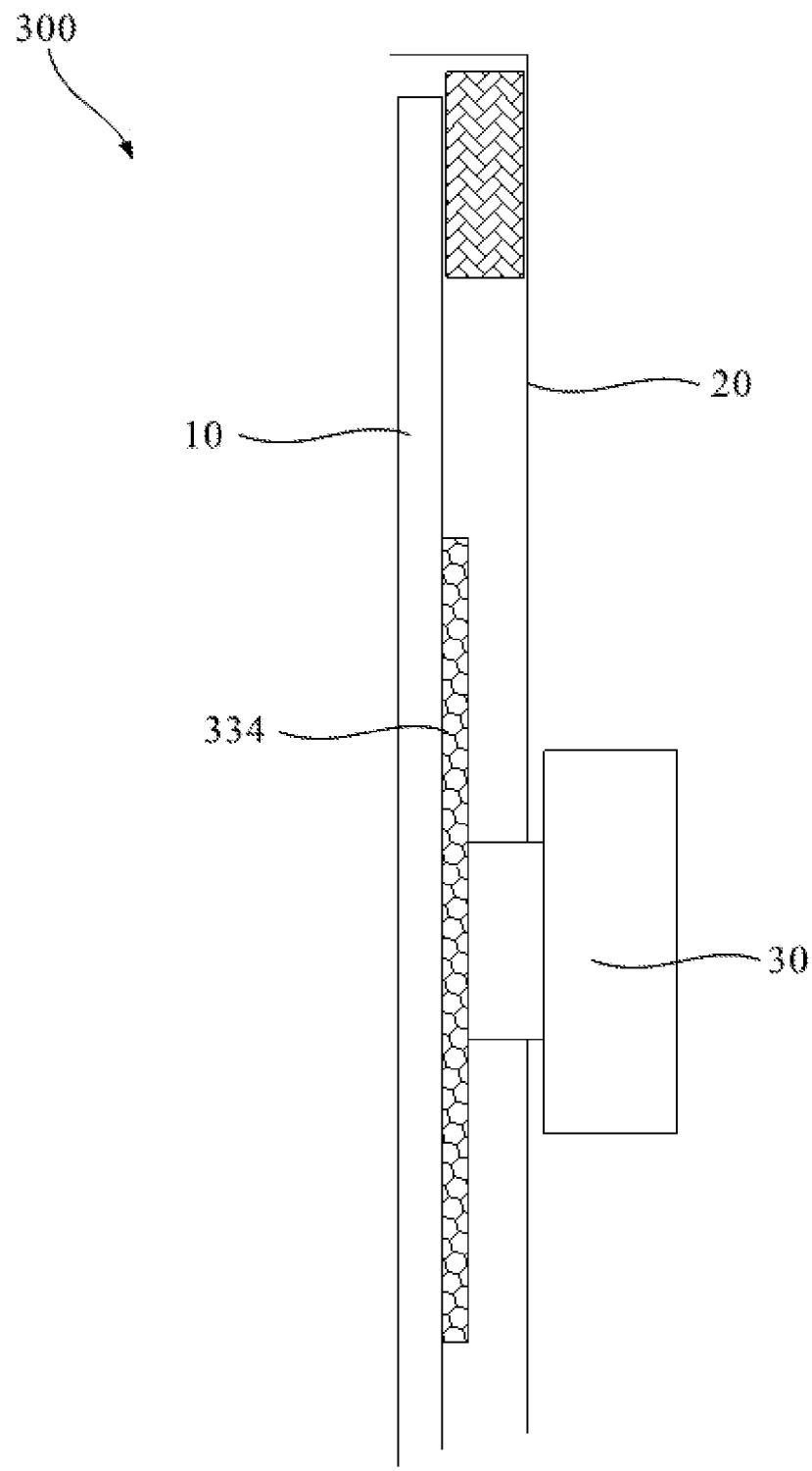
FIG. 20 shows a schematic diagram of a display panel device as the display apparatus according to some embodiments of the disclosure.
Figure 21:
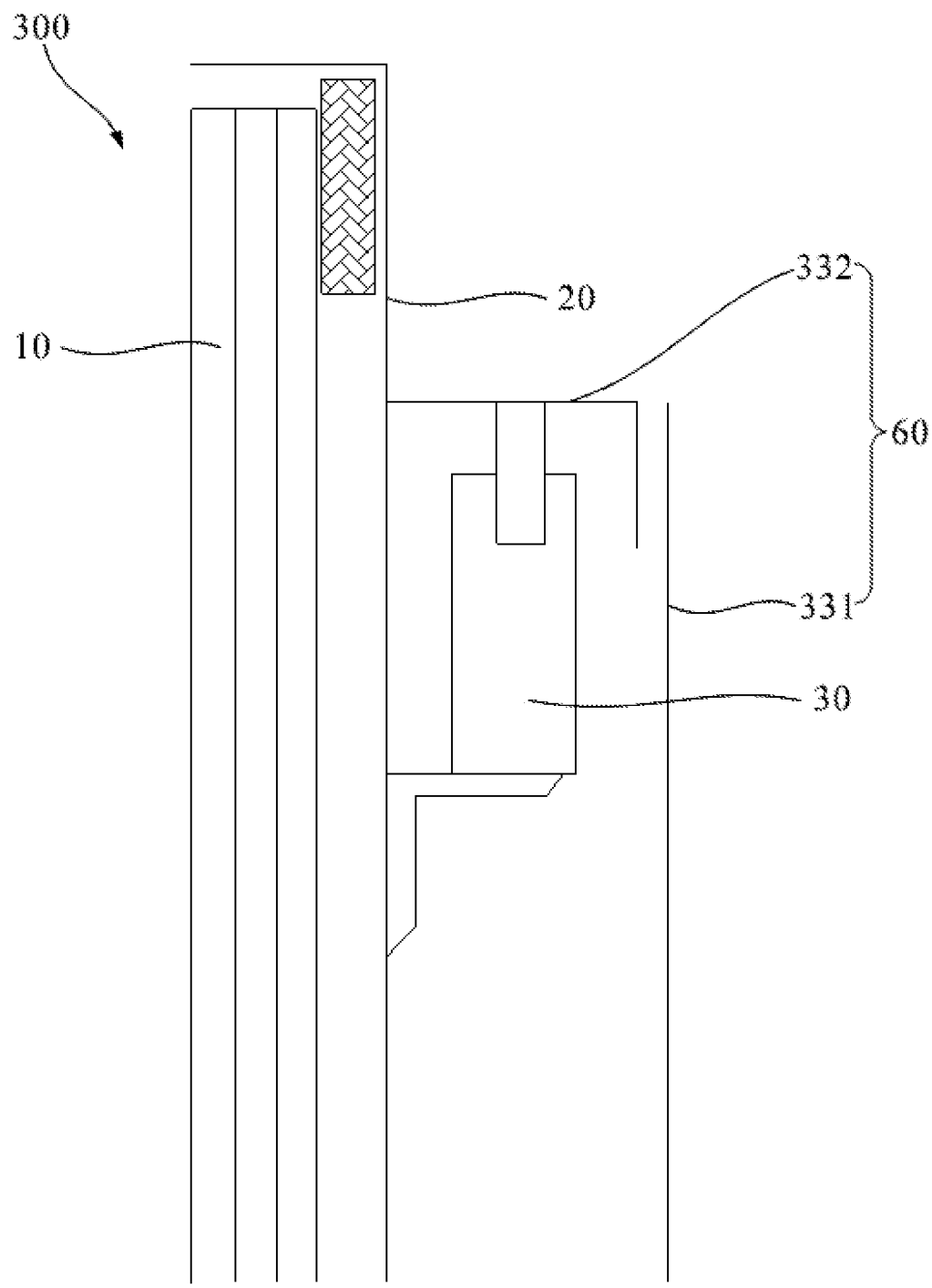
FIG. 21 shows a schematic diagram for illustrating a frame of the display panel device serving as a first vibration element.
Figure 22:
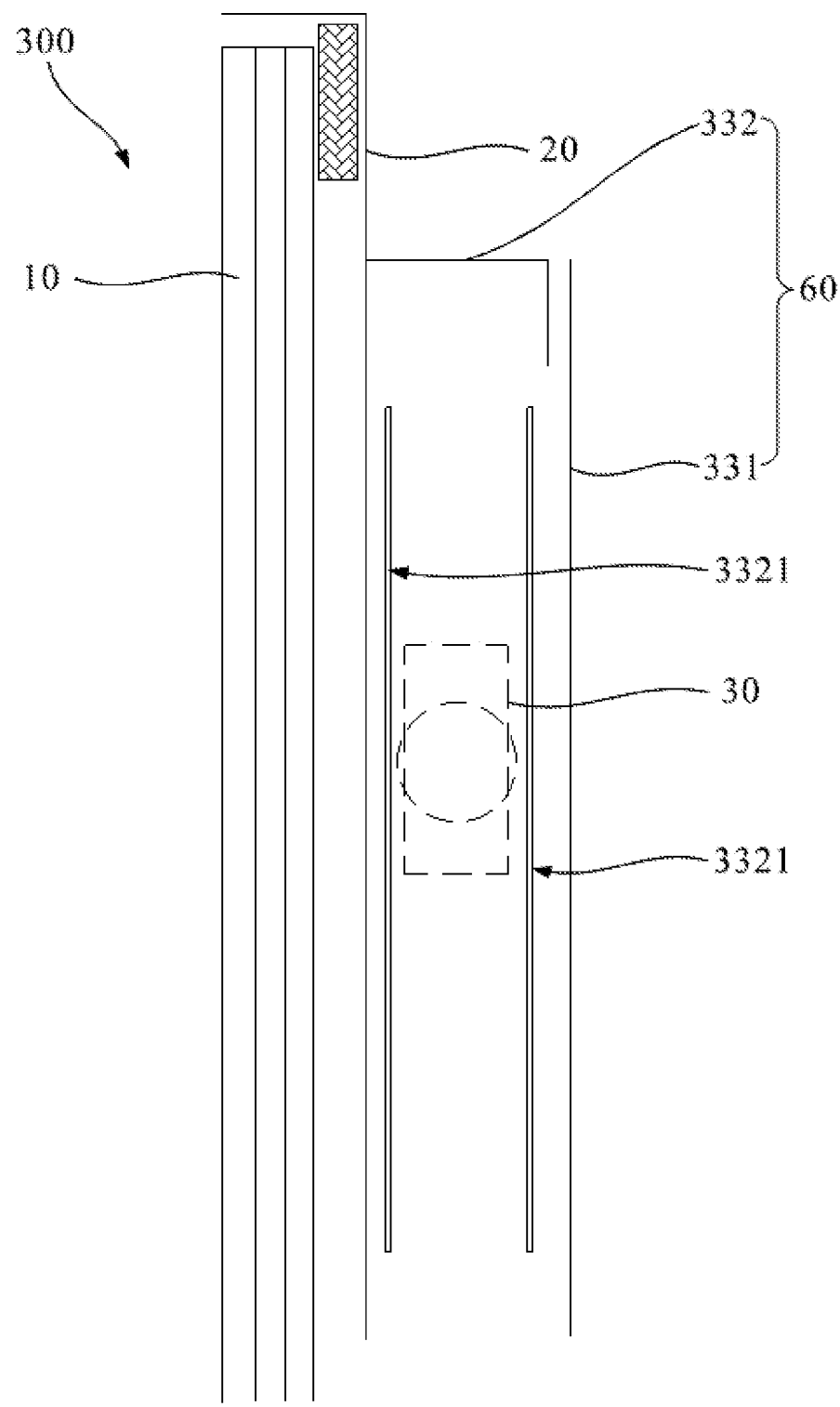
FIG. 22 shows another schematic diagram for illustrating a frame of the display panel device serving as a first vibration element.
Figure 23:
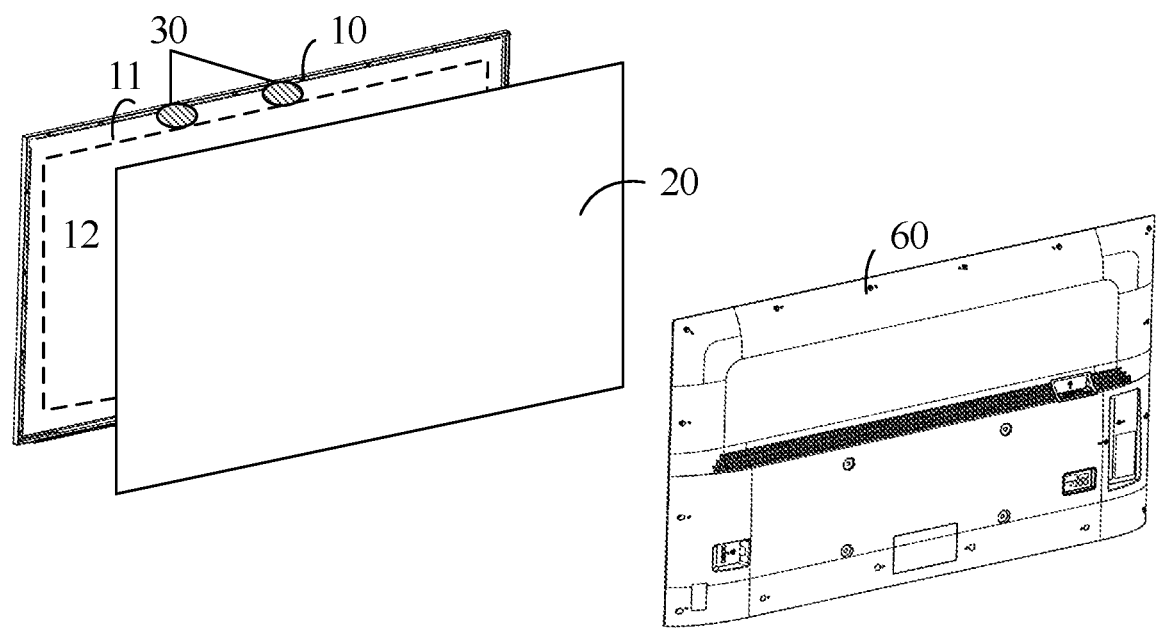
FIG. 23 shows a schematic diagram of a display panel device as the display apparatus according to some embodiments of the disclosure.

FIGS. 20 and 23 each show a schematic diagram of a display panel device according to some embodiments of the disclosure. FIG. 21 shows a schematic diagram for illustrating a frame of the display panel device serving as a first vibration portion. FIG. 22 shows another schematic diagram for illustrating a frame of the display panel device serving as a first vibration portion in FIG. 20.

Referring to FIGS. 20-26, the display panel device 300 may be a LCD device, smart robot, etc.

In some embodiments, the display apparatus may be a liquid crystal display (LCD) device or an organic light-emitting diode (OLED) display device.

In some embodiments, the display panel device includes a display panel (i.e. a screen) 10, a backplane 20 and a rear housing 60. The rear housing 60 includes a rear housing body and a frame, the frame protrudes from the rear housing body in a direction facing to the display panel and the frame is in fixed connection with the backplane 20.

Here, according to the type of the display panel device 300 and the space arrangement after assembly, one or more of the display panel 10, the backplane 20, the frame 332 and the rear housing body 331 may serve as a first vibration element.

Here, the display panel 10 includes a display area 310 and a non-display area BM (black matrix area) 311. The display area is used for image display. The BM area 311 surrounds the display area 310, and used for being in a fixed connection with the backplane 20, typically used for tracing. Where, the exciter 30 is placed in a position corresponding to the BM area 311, which can drive the display panel 10 to vibrate and output sound. The exciter 30 may be provided on either side of the circumference of the frame 332, and the number of exciters 30 is not limited.

Figure 24:
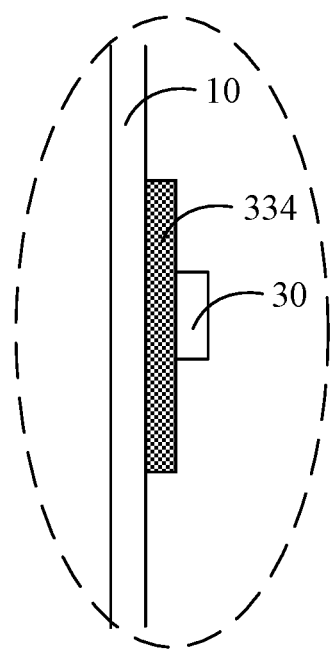
FIG. 24 shows a schematic diagram of a display apparatus provided with a reinforcement plate according to some embodiments of the disclosure.

In some embodiments, referring to FIGS. 20 and 24, when the display panel 10 serves as the first vibration element, the exciter 30 may be connected directly or indirectly with the display panel 10.

In some embodiments, considering that in the LCD device, there is always an air layer between the display panel and other members such as light guide plate, in a case where the display panel 10 serves as the first vibration element, the display panel device is an OLED display device.

In some embodiments, when the exciter 30 can be connected indirectly with the display panel 10, a reinforcement plate 334 can be provided between the display panel 10 and the exciter 30. The surface area of the reinforcement plate 334 is larger than an area of an end face of the exciter 30, and in some embodiments, is larger than an area of an end face of the second movement part 3042 of the exciter 30. The exciter 30 is connected with the display panel 10 via the reinforcement plate 334, a contact area between the display panel 10 and the exciter 30 becomes larger, which can reduce the pressure at the contact position of the display panel 10 and the exciter 30, increase the strength of the display panel 10, prevent the display panel 10 from being damaged when it is squeezed, and change the damping state of the display panel 10, thereby improving the reliability and the sound quality of the display panel 10.

Here, the reinforcement plate 334 can be a plate made of carbon fibre or aluminium, or a honeycomb core plate.

The specific structure of a display apparatus provided with a strength reduction part is described in detail below.

Figure 25:
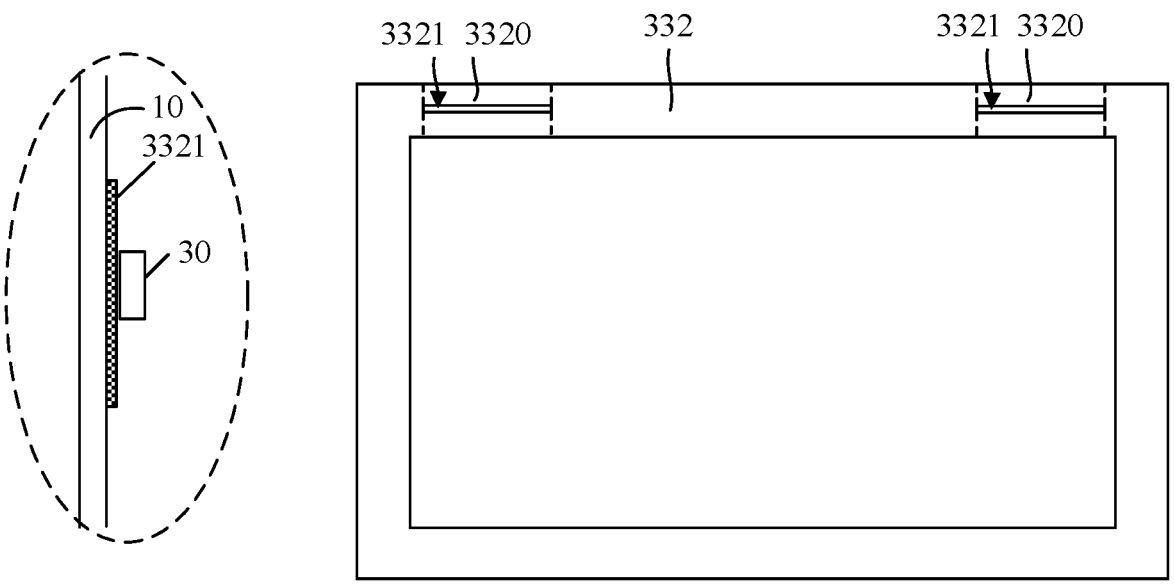
FIG. 25 shows a schematic diagram of a display apparatus provided with a strength reduction part according to some embodiments of the disclosure.

In some embodiments, FIG. 25 shows a schematic diagram of a display apparatus provided with a strength reduction part. Referring to FIG. 25, the display apparatus includes a frame 332, the exciter 30 is provided on the frame 332, and the corresponding vibration area 3320 is indicated.

Considering that a size of the frame 332 along the vertical direction of the display panel 10 is small, the frame 332 is not easily deformed. The frame 332 is provided with a third strength reduction part 3321, and the exciter 30 is provided on a position of the frame 332 near the position of the third strength reduction part 3321. The third strength reduction part 3321 extends along the length direction of the frame 332, and the depth of the third strength reduction part 3321 is less than or equal to a thickness of the frame 332.

The third strength reduction part 3321 may be a groove-shaped structure disposed on the frame 332, or a through-hole shaped structure penetrating through the frame 332. In this case, the strength of the frame 332 at the position of the third strength reduction part 3321 is reduced. When the exciter 30 is disposed on the frame 332 at a position close to the third strength reduction part 3321, the exciter 30 can easily drive the deformation of the frame 332 for output sound via vibration.

In some embodiments, the extension length of the third strength reduction part 3321 may be set according to the exciter 30 and the display apparatus. Meanwhile, a width of the third strength reduction part 3321 cannot be too large in a case that the exciter 30 is set in parallel with the third strength reduction part 3321. In some embodiments, the width of the third strength reduction part 3321 may be 0.1-0.2 times the width of the frame 332, and the width of the third strength reduction part 3321 may be 0.1 mm-1 mm.

In some embodiments, the closer to the middle area of the third strength reduction part 3321, the more likely the frame 332 deforms. The exciter 30 and the center of the third strength reduction part 3321 are placed at intervals along the length direction of the third strength reduction part 3321. In this case, the exciter 30 does not need to be disposed at the center area of the third strength reduction part 3321.

In some embodiments, a distance between the exciter 30 and one end of the third strength reduction part 3321 may be less than half of the length of the third strength reduction part 3321, and greater than one-fifth of the length of the third strength reduction part 3321. As such, the vibration generated by the frame 332 has more resonance modes and a wide resonance range, avoiding regular standing waves produced by the vibration of the frame 332. In this case, the sound from the frame 332 can obtain a large sound pressure level in a wide range.

Here, there may be a plurality of the third strength reduction parts 3321. The plurality of third strength reduction parts 3321 are provided at intervals along a direction vertical of the display panel 10, or along an extension direction of the frame 332.

Figure 26:
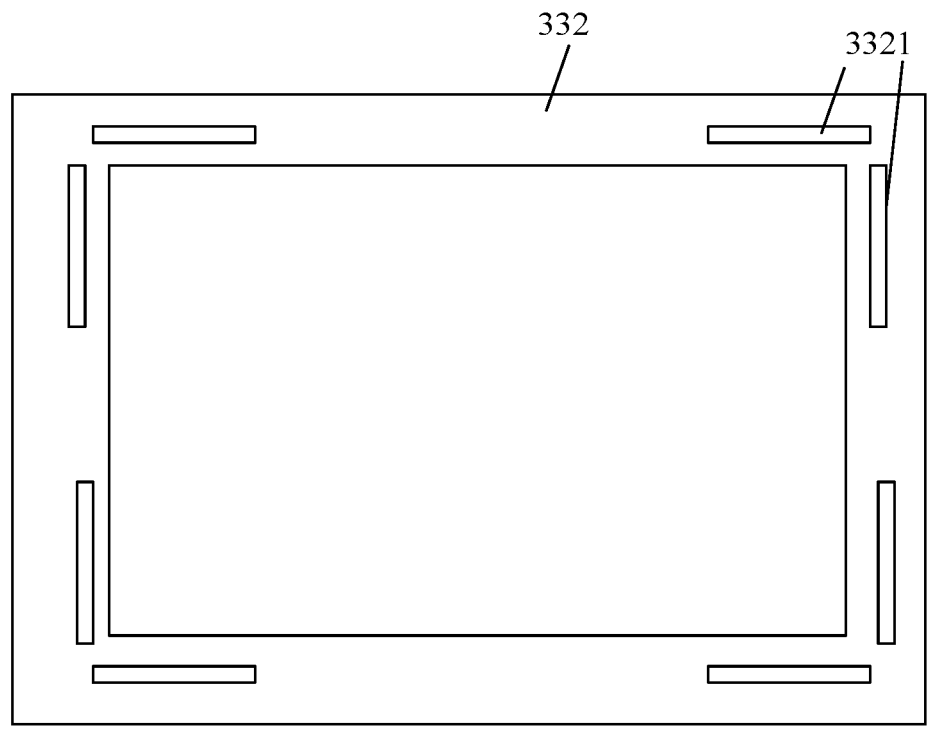
FIG. 26 shows a schematic diagram of a display apparatus provided with a plurality of strength reduction parts according to some embodiments of the disclosure.

FIG. 26 shows a schematic diagram of a display apparatus provided with a plurality of strength reduction parts according to some embodiments of the disclosure. Referring to FIG. 26, the third strength reduction parts 3321 arranges in pairs in both row and column directions. The pairs of third strength reduction parts are placed on the four corners of the frame, so that the frame 332 is easier to vibrate.

In some embodiments, the number of the third strength reduction parts 3321 is two, and the two third strength reduction parts 3321 are arranged in parallel, so that the portion of the frame 332 between the two third strength reduction parts 3321 is prone to deformation. Accordingly, the exciter 30 is located between the two third strength reduction parts 3321, so that the exciter 30 can drive the frame 332 to easily vibrate and output sound.

In some embodiments, the number of third strength reduction parts 3321 may be three. The three strength reduction parts are connected to form a U-shape. In this case, a part of the frame 332 may be a cantilever structure, and the exciter 30 is disposed on the cantilever structure, which is helpful to drive the frame 332 with the cantilever structure to vibrate and output sound.

The structure of the exciter in the display apparatus is described in detail below.

FIGS. 27-30 each show a schematic diagram of an exciter according to some embodiments of the disclosure.

In some embodiments, the exciter 30 may be an electromagnetic exciter, a piezoelectric exciter or a magnetostriction exciter, and are used in a lot of scenarios.

Referring to FIGS. 27-30, taking the magnetostriction exciter as an example, the magnetostriction exciter according to embodiments of the disclosure can drive the display panel to vibrate and output sound based on the magnetostriction effect. Here, the magnetostriction is a property of ferromagnetic materials which causes them to expand or contract in response to a magnetic field.

In some embodiments, magnetostrictive materials may be nickel-based alloys, iron-based alloys, ferrite magnetostrictive materials, piezoelectric ceramic materials, etc., which is not limited in the disclosure.

In some embodiments, the exciter 30 includes a coil 301, a stretchable member 303 and a second vibration element 304 which is elastic. The exciter 300 further includes a magnetic element 302. The coil 301 is used to generate an alternating magnetic field according to a control signal, and the stretchable member 303 may undergo an expansion deformation along an axial direction of the coil 301 in a magnetic field superimposed by the alternating magnetic field and the magnetic field generated by the magnetic element.

Here, the coil 301 is in the shape of a cylinder. In order to reduce a size of the exciter 30, the magnetic element 302 and the stretchable member 303 may be disposed in the coil 301. In this case, the magnetic element 302 and the stretchable member 303 are cylindrical, such as prismatic or cylindrical.

In some embodiments, the stretchable member 303 may be cylindrical, and an outer diameter of the cylindrical stretchable member 303 may be 3 mm-5 mm. And in order to facilitate relative movement between the stretchable member 303 and the coil 301, a mounting gap is provided between the coil 301 and the stretchable member 303.

In some embodiments, as required, there may be a plurality of magnetic elements 302 and a plurality of stretchable members 303, which are arranged sequentially along the axial direction of the coil 301. In some embodiments, one of the stretchable members 303 abuts against the second vibration element 304. In this case, a size of the exciter 30 along the axis direction of the coil 301 is much larger than a size of the actuator 30 along the radial direction of the coil 301. Here, the radial direction of the coil 301 can be considered as a direction along which the exciter 30 has a minimum size.

In some embodiments, the exciter 30 further includes a housing 309, and the coil 301 is received in the housing 309. The housing 309 serves as a protector for the coil 301, the magnetic element 302, and the stretchable member(s) 303. The housing 309 can be a magnetizer, which can be made of materials such as iron, steel, etc.

The coil 301 may be connected with an external power supply, amplifier and other elements and used for receiving control signals and generating alternating magnetic fields according to control signals. The magnetic element 302 may be a permanent magnet, etc., the magnetic field generated by magnetic element 302 can be referred to as static magnetic field. The stretchable member 303 may be made of materials such as ferromagnetic materials, soft magnetic materials, supermagnetostrictive materials, etc. The materials of the coil 301, magnetic element 302 and stretchable member 303 may be selected from materials known by those skilled in the art, which is not limited in the disclosure.

Here, the static magnetic field is used to provide a static operating point for the stretchable member 303, and the alternating magnetic field provides a dynamic operating point for the stretchable member 303. The stretchable member 303 is periodically elongated or shortened with a periodic change of strength of a magnetic field posed by the alternating magnetic field and the static magnetic field, thereby driving the second vibration element 304 to move back and forth, which further drives the first vibration element to vibrate.

In some embodiments, the second vibration element 304 includes a first movement part 3041 and a second movement part 3042. The first movement part 3041 is connected with the exciter body, and the first movement part 3041 is located at an end of the coil 301 along the axial direction of the coil. The second movement part 3042 is connected with the exciter body, and the second movement part 3042 is located at a side of the coil 301 along the radial direction of the coil. Here, the second movement part 3042 is connected with the first vibration element on the exciter body.

In this case, the first movement part 3041 and the second movement part 3042 are connected and form an L-shaped bending structure. Where, the first movement part 3041 may serve as one of the folded edges of the bending structure, and is disposed at the end of the coil 301, the second movement part 3042 is disposed on the other folded edge, and is disposed at a side of the coil 301 in the radial direction.

In some embodiments, when the stretchable member 303 is stretched, the first movement part 3041 may undergo reciprocating movement with respect to the end of the coil 301 under the elastic force of the stretchable member 303 or the second vibration element 304, and the second movement part 3042 may undergo reciprocating movement under the elastic force of the first movement part 3041 or the second vibration element 304, thereby driving the exciter body, and specifically driving the first vibration element, for outputting sound via vibration. Here, a direction of the reciprocating movement of the second movement part 3042 is set inclined to the axial direction of the coil 301.

When the stretchable member 303 is elongated, the stretchable member 303 abuts against the first movement part 3041 and causes the first movement part 3041 to move towards a side away from the coil 301. When the stretchable member 303 is shortened, the first movement part 3041 may move towards the coil 301 under its own elastic force. As such, when the stretchable member 303 is elongated or shortened under the superimposed magnetic field, the first movement part 3041 may undergo reciprocating movement relative to the coil 301. Likewise, the second movement part 3042 may undergo reciprocating movement under the drive of the first movement part 3041 or its own elastic force to drive the first vibration element for outputting sound via vibration.

Since the second movement part 3042 is located at the side of the coil 301 along the radial direction, the direction of the reciprocating movement of the second movement part 3042 is inclined to the axial direction of the coil 301. In this case, the direction of the reciprocating movement of the first vibration element is inclined to the axial direction of the coil 301. A size of the exciter 30 along the direction of the reciprocating movement of the first vibration element is approximately equal to a size of the exciter 30 along the radial direction of the coil 301, and the size of the exciter 30 along the radial direction of the coil 301 is much smaller than a size of the exciter 30 along the axial direction of the coil 301. As such, a size of the display panel device 300 along the direction of the reciprocating movement of the first vibration element is small, which is helpful to make the product thinner.

In some embodiments, when the display panel 10 of the display panel device 300 serves as a first vibration element, the axis direction of the coil 301 is inclined to the display panel 10, and the thickness of the display panel device 300 can tolerate the size of the exciter 30 in the direction vertical of the display panel 10. In this case, the exciter 30 will not increase the thickness size of the display device 300, which is helpful to make the product thinner.

When the frame 332 of the display panel device 300 serves as the first vibration element, the first movement part 3041 and the second movement part 3042 may be disposed along the two adjacent sides of the frame 332, respectively. As such, the axis direction of the coil 301 is not vertical to the display panel 10. In this case, the exciter 30 will not cause increase of the thickness the display panel device 300, which is helpful to make the product thinner.

In some embodiments, an end of the first movement part 3041 may be in slide connection with the exciter body. In this case, the first movement part 3041 as a whole may move back and forth along the axial direction of the coil 301 relative to the coil 301.

In some embodiments, a first end of the first movement part 3041 is in fixed connection with the exciter body, a second end of the first movement part 3041 is connected with the second movement part 3042. The first movement part 3041 can undergo a reciprocating rotational movement relative to the coil 301 with its first end as a supporting point, and the stretchable member 303 is located between the first end and the second end of the first movement part 3041.

Thus, when the stretchable member 303 is extended, the stretchable member 303 abuts against the first movement part 3041, the first movement part 3041 is flipped with the first end as the supporting point, and the second end of the first movement part 3041 moves towards the side away from the coil 301. When the stretchable member 303 is retracted, under the action of its own elastic force, the second end of the first movement part 3041 moves towards the coil 301. As such, the reciprocating movement of the first movement part 3041 is realized. Moreover, the connection between the first movement part 3041 and the exciter body is relatively simple, and the manufacturing cost is low.

Figure 33:
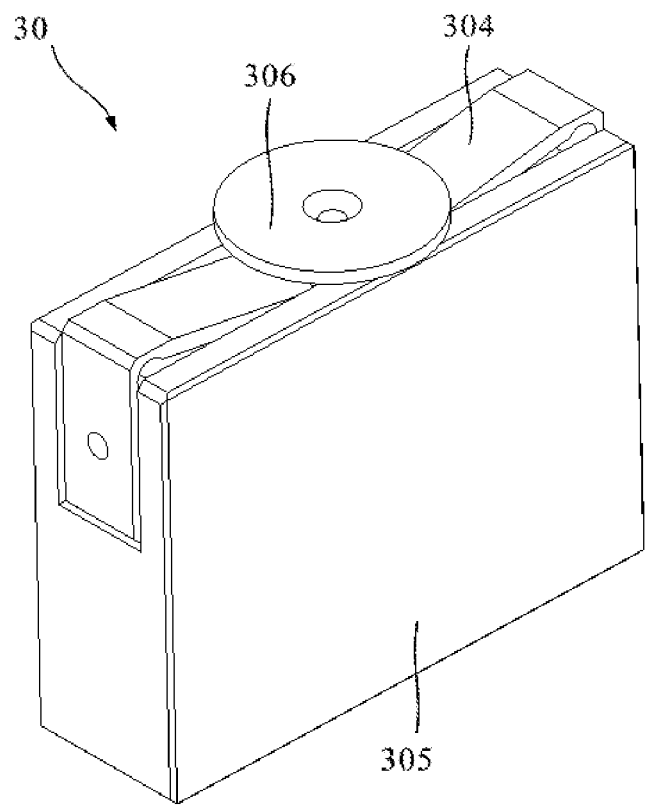
Figure 34:
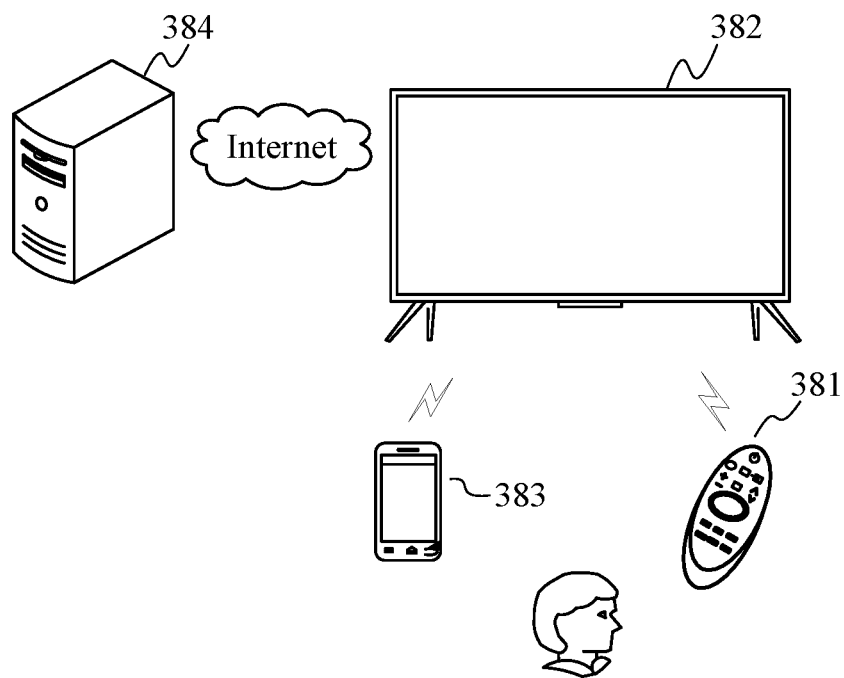
FIG. 34 shows a schematic diagram of an operation scenario of a display apparatus according to some embodiments of the disclosure.

Here, the stretchable member 303 may abut against the first movement part 3041 at different positions along the length direction of the first movement part 3041. In some embodiments, the stretchable member 303 abuts against the midpoint of the first movement part 3041. In some embodiments, the stretchable member 303 may be disposed at a side near the first end of the first movement part 3041. Referring to FIG. 33 and FIG. 34, there is a first spacing L1 between the first end of the first movement part 3041 and the stretchable member 303 along the extension direction of the first movement part 3041, and a second spacing L2 between the second end of the first movement part 3041 and the stretchable member 303 along the extension direction of the first movement part 3041, where the first spacing L1 is less than the second spacing L2. As such, the offset of the reciprocating movement of the second end of the first moving part 3041 can be effectively increased, and a vibration amplitude of the first vibration element can be increased, so that the sound from the first vibration element may have a large sound pressure level and a relatively low frequency.

In some embodiments, the second spacing L2 is 1.5 times the first spacing L1, so that a sum of the first spacing L1 and the second spacing L2 is 2.5 times the first spacing L1. In this case, the offset of the reciprocating movement of the second end of the first movement part 3041 is approximately 2.5 times a displacement of the stretchable member 303.

In some embodiments, the first end of the first movement part 3041 is configured with a first strength reduction part 3043. A size of the cross-section of the first movement part 3041 at the first strength reduction part 3043 is smaller than a size of the cross-section of the first movement part 3041 at other positions.

Here, the first strength reduction part 3043 may have a different structure. In some embodiments, the first strength reduction part 3043 extends along the length direction of the first movement part 3041, and there is a step surface between the first strength reduction part 3043 and the first movement part 3041. Alternatively, the first strength reduction part 3043 is a groove structure formed on the first movement part 3041, the groove structure is disposed on a side of the first movement part 3041 facing the coil 301 or the side facing away from the coil 301, which is helpful to the flipping of the first movement part 3041 relative to the coil 301.

In some embodiments, the closer the direction of the reciprocating movement of the second movement part 3042 to the radial direction of the coil 301, the closer the size of the exciter 30 along the direction of the reciprocating movement of the first vibration element to the size of the exciter 30 along the radial direction of the coil 301, and the smaller size of the exciter along the direction of the reciprocating movement of the first vibration element is. In some embodiments, an angle between the direction of the reciprocating movement of the second movement part 3042 and the axial direction of the coil 301 may be 60°-120°.

In some embodiments, the direction of reciprocating movement of the second movement part 3042 and the axial direction of the coil 301 are perpendicular to each other. In this way, there is no displacement for the first vibration element along the axial direction of the coil 301, and the size of the exciter 30 along the direction of the reciprocating movement of the first vibration element is the size of the exciter 30 along the radial direction of the coil 301, which effectively reduces the size of the exciter 30 along the direction of reciprocating movement of the first vibration element, which is helpful to make the display apparatus thinner.

In some embodiments, the exciter 30 further includes a connection part 3047, and the connection part 3047 is located at the side of the coil 301 along its own radial direction. One end of the connection part 3047 is connected with the first movement part 3041, and the other end of the connecting part 3047 is connected with the second movement part 3042. The length direction of the connecting part 3047 is inclined to the axial direction of the coil 301. In this case, the connection part 3047 serves as a folded edge of the L-shaped structure described above, and one end of the connection part 3047, which is far away from the first movement part 3041, is connected with the second movement part 3042.

In some embodiments, the end of the connection part 3047 away from the first movement part 3041 extends toward a side away from the coil 301. In this case, the angle between the first movement part 3041 and the connection part 3047 is an obtuse angle. When the stretchable member 303 expands, the first movement part 3041 may move towards the side away from the coil 301 under the drive of the stretchable member 303, and the connection part 3047 may move towards the coil 301 under the drive of the first movement part 3041. When the stretchable member 303 retracts, the first movement part 3041 moves towards the coil 301 under its own elastic force, meanwhile, the connection part 3047 may move toward the side away from the coil 301 under its own elastic force.

In some embodiments, one end of the connection part 3047 is connected with the first movement part 3041, and the other end of the connection part 3047 extends obliquely toward the coil 301. Meanwhile, in order to avoid interference between the second movement part 3042 and the housing 309, the side of the housing 309 facing the second movement part 3042 may be provided with a plane 3091 for avoiding interference. In this case, the thickness of the housing 309 towards the side of the second movement part 3042 is reduced, so that the size of the exciter 30 along the radial direction of the coil 301 may be reduced.

Meanwhile, in order to avoid interference between the first vibration element and the second moving part 3042, the second moving part 3042 may be provided with an output element 306 protruding away from the coil 301. The output member 306 is connected with the first vibration element, and a direction of the reciprocating movement of the output element 306 is same as the direction of the reciprocating movement of the second movement part 3042.

In some embodiments, the second movement part 3042 and the output element 306 are in detachable connection. The output element 306 is provided with an attachment surface fitted with the first vibration element, to increase the contact area between the output element 306 and the first vibration element.

In some embodiments, the second movement part 3042 may be disposed at a side of the coil 301 in the radial direction, and a grooved structure is provided between the connection part 3047 and the second movement part 3042 to reduce strength.

In some embodiments, the second vibration element 304 further includes a bending part 3044. Both ends of the bending part 3044 are connected with the first movement part 3041 and the second movement part 3042 respectively.

The first movement part 3041 and the second movement part 3042 may move toward each other under the elastic force of the bending part 3044. Here, when the second vibration element 304 is provided with a connection part 3047, the two ends of the bending part 3044 are connected with the first movement part 3041 and the connection part 3047, respectively.

Thus, when the stretchable member 303 retracts, the first movement part 3041 moves towards the coil 301, the second movement part 3042 can go back to the initial position under the elastic force of the bending part 3044. The structure of the second vibration element 304 is relatively simple.

In some embodiments, the bending part 3044 is provided with a second strength reduction part 3045. A size of the cross-section of the bending part 3044 at the second strength reduction part 3045 is smaller than a size of the cross-section of the bending part 3044 at other areas. The structure of the second strength reduction part 3045 may be the same as the structure of the first strength reduction part 3043. In some embodiments, the first strength reduction part 3043 and the second strength reduction part 3045 are grooved structures, so that the first movement part 3041 and the second movement part 3042 are prone to relative flipping.

In some embodiments, the number of the first movement part 3041 is two, and the two first movement parts 3041 are respectively disposed at both ends of the coil 301 along its own axial direction. Two ends of the second movement part 3042 are connected with the two first movement parts 3041. Meanwhile, the number of connection parts 3047 is also two, and the two connection parts 3047 are respectively connected with the two first movement parts 3041, and the two ends of the second movement parts 3042 are connected with the two connection parts 3047. In this case, the two first movement parts 3041, the second movement part 3042 and the two connection parts 3047 in connection may form a convex like structure or an approximate K-shaped structure.

In some embodiments, the second vibration element 304 is a metal element, with higher strength and better elasticity. In some embodiments, the material of the second vibration element 304 may be a magnetizer material such as steel and iron, or a non-magnetizer material such as aluminum.

In some embodiments, the magnetic element 302 and the stretchable member 303 are arranged along the axis direction of the coil 301 and crammed between the two first movement parts 3041. In order to avoid the magnetic element 302 and stretchable members 303 in arrangement to be separated from each other or separated from the first movement part 3041, embodiments of the disclosure are provided with an abutting bolt 307 on one of the first movement part 3041. The magnetic element 302 and the stretchable member 303 may abut against a first movement part 3041 by adjusting a relative position between the abutting bolt 307 and the other first movement part 3041. An extrusion force between the magnetic element 302, the stretchable member 303, and the abutting bolt 307 can be 3 MPa-6 MPa.

In some embodiments, the first movement part 3041 without the abutting bolt may be provided with a limit hole 30411. The exciter 30 further includes a limit element 308, the magnetic element 302 and the stretchable member 303 in arrangement along the axis direction of the coil 301 are crammed between the abutting bolt 307 and the limiting element 308, and part of the limit element 308 extends into the limit hole 30411.

In some embodiments, the limit element 308 may be a tapered rod. In this case, while the limit element 308 abuts against the first movement part 3041, the limit hole 30411 may move along the outer wall of the tapered rod.

In some embodiments, in order to avoid a separation between the magnetic element 302 and stretchable member 303, a separation between stretchable member 303 and the abutting bolt 307, and a separation between the stretchable member 303 and the limit element 308, any adjacent two of the magnetic element 302, the stretchable member 303, the abutting bolt 307, and the limit element 308 can be bonded by adhesive element.

Taking an approximate K-shaped structure with two first movement parts 3041, one second movement part 3042 and two connection parts 3047 in connection as an example, the vibration is described as follows.

When the stretchable member 303 expands, the limit element 308 and the abutting bolt 307 may abuts against the two first movement parts 3041, the second ends of the two first movement parts 3041 move away from each other, and stretching the two connection parts 3047. Meanwhile, the second movement part 3042 and the output element 306 move along the radial direction of the coil 301 and drive the first vibration element to move away from the coil 301, until the two connection parts 3047 are approximately located in the same straight line.

When the stretchable member 303 retracts, the second ends of the two first movement parts 3041 flips towards the side close to each other. Under the elastic force of the second vibration member 304, the second movement part 3042 and the output element 306 drive the first vibration element to move along the radial direction of the coil 301 toward the coil 301. In this case, the reciprocating movement of the second moving part 3042 and the output element 306 along the radial direction of the coil 301 is realized, and the first vibration element is driven for outputting sound via vibration.

Figure 31:
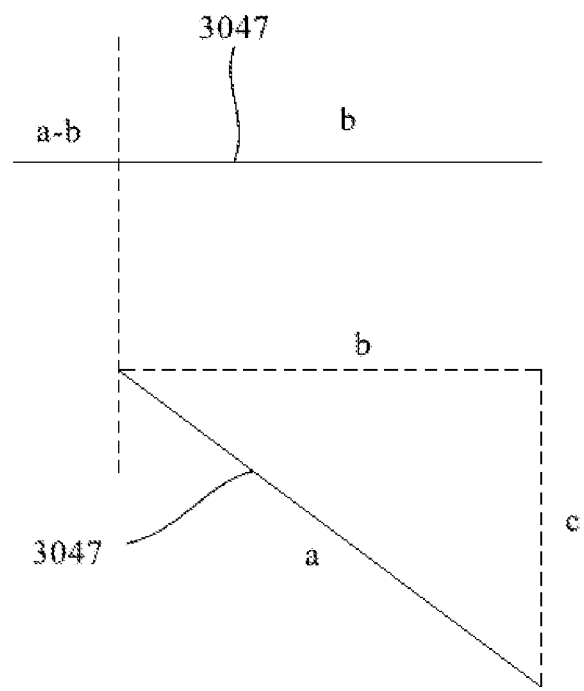
FIG. 31 shows a schematic diagram for illustrating a connection part forming a hypotenuse according to some embodiments of the disclosure.

FIG. 31 shows a schematic diagram for illustrating a connection part forming a hypotenuse according to some embodiments of the disclosure. Referring to FIG. 31, for a right triangle, a sum of the lengths of the two right sides is greater than the length of the hypotenuse, i.e. b+c>a, that is, a−b<c. Here, the second vibration element 304, in the process of driving the first vibration element, will not undergo expansion and deformation. In this case, the length of the connection part 3047 will not change.

Then, when the two first movement parts 3041, the second movement part 3042 and the two connection parts 3047 are connected to form the approximate K-shaped structure, the connection part 3047 can be considered as a hypotenuse of a right triangle. When the two connection parts 3047 are stretched by two first movement parts 3041 until they are located in the same line, the connection parts 3047 are approximately parallel to the original right angle side b. Meanwhile, a moving distance of the second end of the first movement part 3041 along the axial direction of the coil is approximately (a−b), and a moving distance of the second movement part 3042 is approximately c, in this case, the moving distance of the output device 306 is approximately c.

It can be seen from the above that a−b<c, then the moving distance of the second end of the first movement part 3041 along the axis direction of the coil is less than the moving distance of the output element 306. In this case, the output element 306 has a relatively large vibration amplitude based on the small moving distance of the second end of the first movement part 3041.

In some embodiments, the expansion and contraction quantity of the stretchable member 303 can be amplified twice by disposing the stretchable member 303 near the first end of the first movement part 3041 and tilting the connection part 3047, so that the output element 306 can have a relatively large vibration amplitude, which is helpful to drive the first vibration element to output a sound with a larger sound pressure level.

Figure 32:
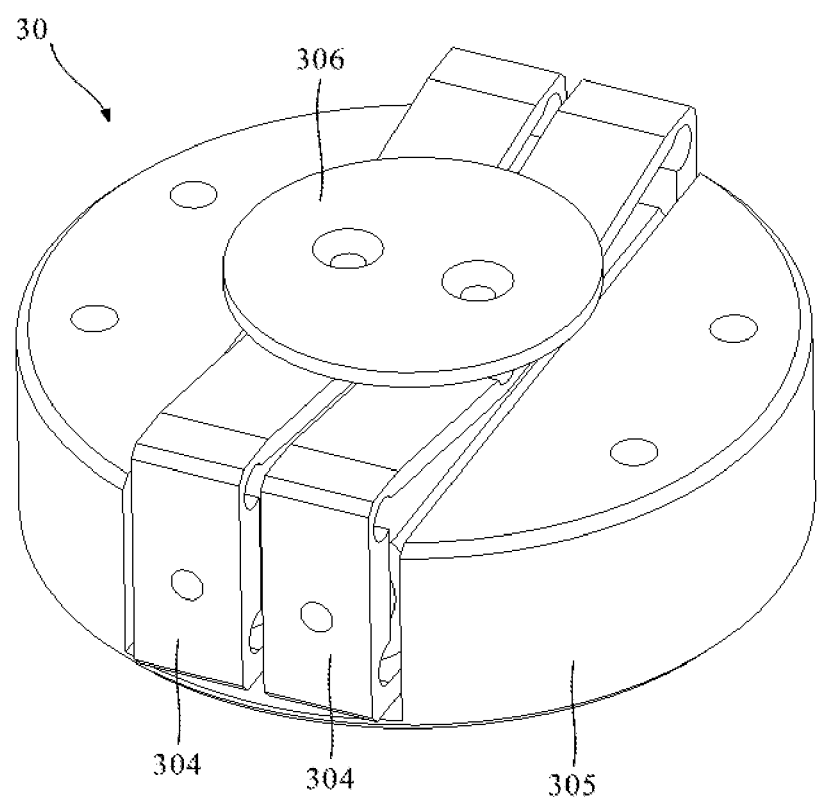
FIGS. 32-33 each show a schematic diagram of an exciter according to some embodiments of the disclosure.

When the thickness or weight of the first vibration element is large, referring to FIG. 32 which shows a schematic diagram of an exciter according to some embodiments of the disclosure, in some embodiments, the exciter 30 includes a plurality of second vibration elements 304, the plurality of second vibration elements 304 are arranged in parallel, and a plurality of second movement parts 3042 of the plurality of second vibration elements 304 are in fixed connection. As such, the plurality of second vibration elements 304 can simultaneously drive the first vibration element to vibrate and output sound, which can improve the driving force of the exciter 30, increase the vibration amplitude of the output element 306, and finally increase the sound pressure level of the sound from the first vibration element. Here, there may be two or more second vibration elements 304.

In some embodiments, there are a plurality of exciters 30, and the plurality of exciters 30 are placed at interval on the body of the screen. In this case, the plurality of exciter 30 can constitute a stereo system, thereby optimizing user's experience.

In some embodiments, the exciter 30 further includes a weight element 305 in fixed connection with the exciter body. The first movement part 3041 and the coil 301 are connected with the weight element 305, and a direction in which the weight element has the minimum size is parallel to the thickness direction of the exciter body.

Here, the display apparatus is the above display panel device 300, and the thickness direction of the exciter body is the direction vertical to the display panel 10. According to the fixed position of the exciter 30, the weight element 305 may be connected with the backplane 20 or the rear housing 60. In this way, the thickness of the exciter body can tolerate the thickness of the weight element 305, thereby avoiding a thickness increase of the exciter body due to the weight element 305.

In some embodiments, the weight of the weight element 305 is relatively large, and the second vibration element 304 and the coil 301 both are in fixed connection with the exciter body via the weight element 305. In this case, while the second vibration element 304 drives the first vibration element, a situation where the drive for the first vibration element for outputting sound via vibration by the exciter 30 at the output element 306 is insufficient due to a small weight of the exciter 30, can be avoided.

In some embodiments, the weight element 305 may be made of metal such as stainless steel, and the weight of the weight element 305 may be configured according to parameters such as the drive of the exciter 30.

In some embodiments, the first ends of the two first movement parts 3041 may be in direct and fixed connection with the weight element 305. Of course, the first vibration element 304 may further include a fixing part 3046, and the fixing part 3046 is connected with the weight element 305. The two ends of the fixing part 3046 are connected with two the first movement parts 3041, which facilitate the first movement part 3041 being easily flipped with its own first end as a supporting point.

Figure 27:
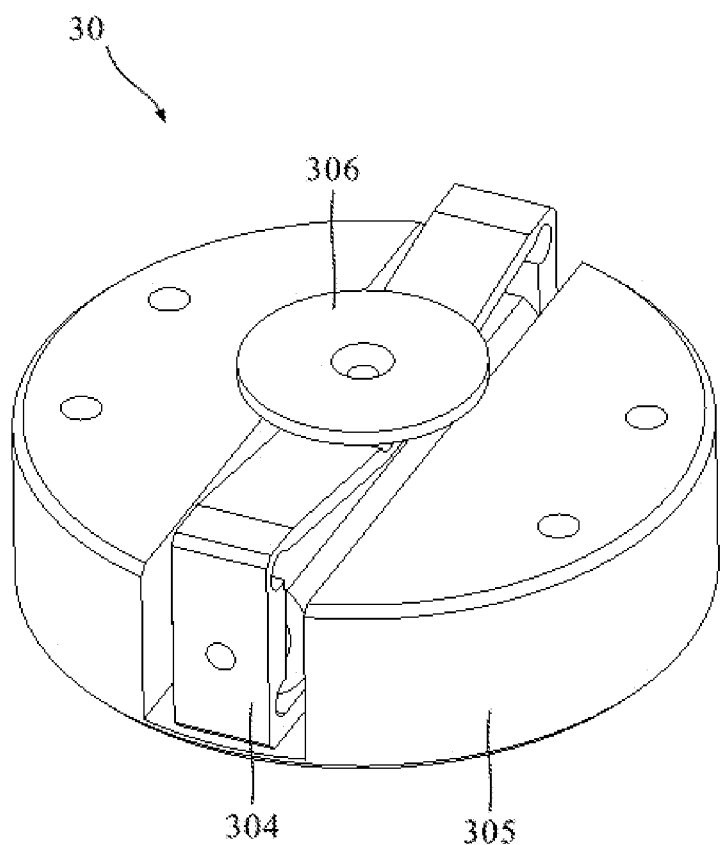
FIGS. 27-30 each show a schematic diagram of an exciter according to some embodiments of the disclosure.
Figure 28:
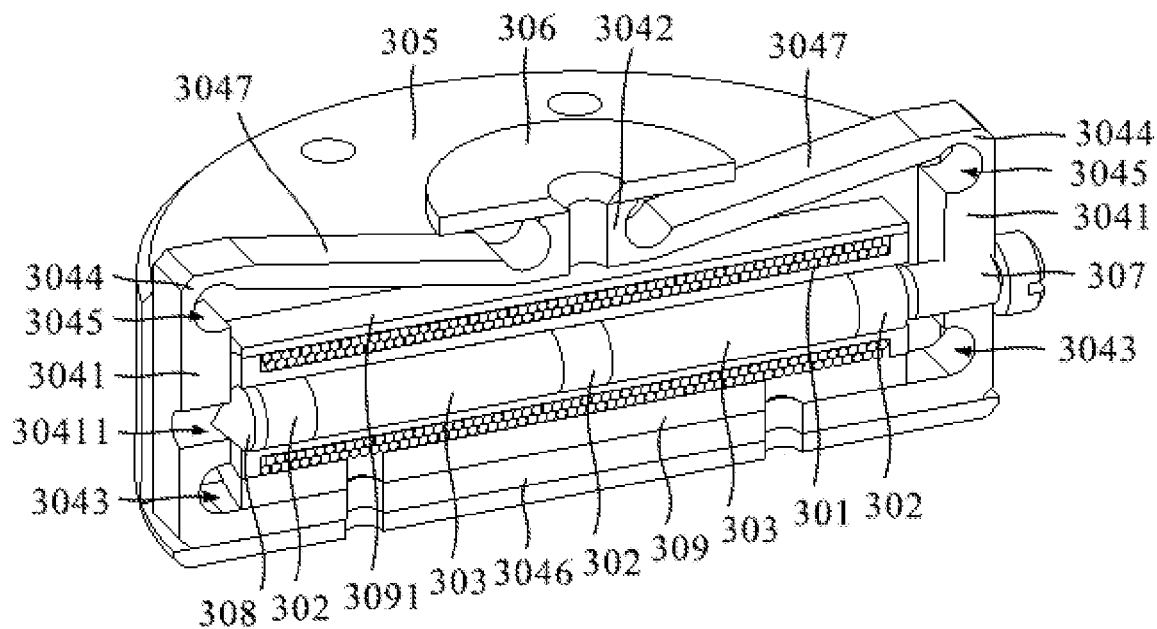
Figure 29:
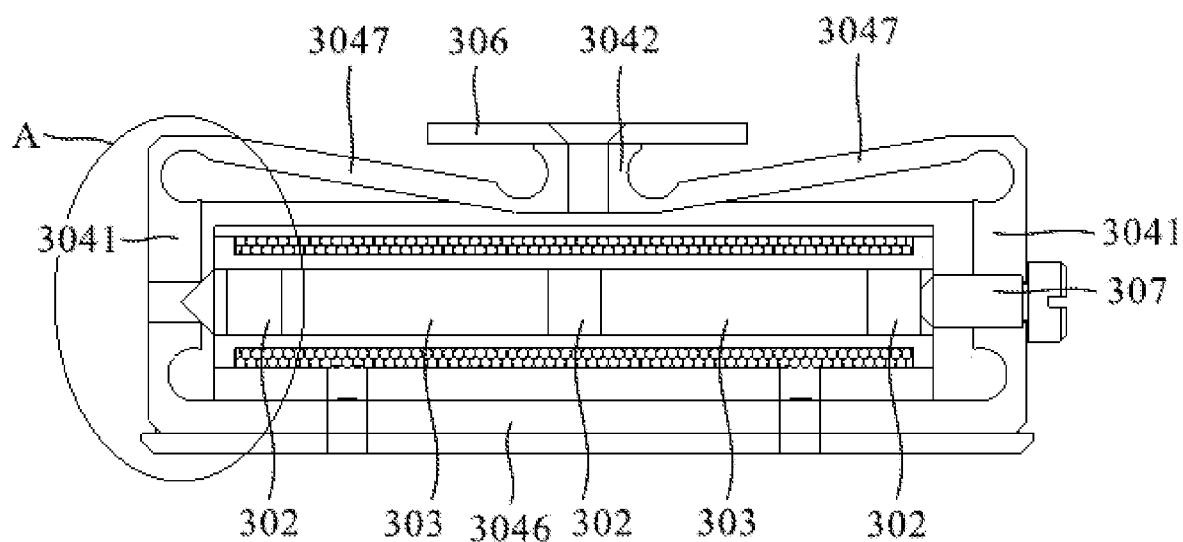
Figure 30:
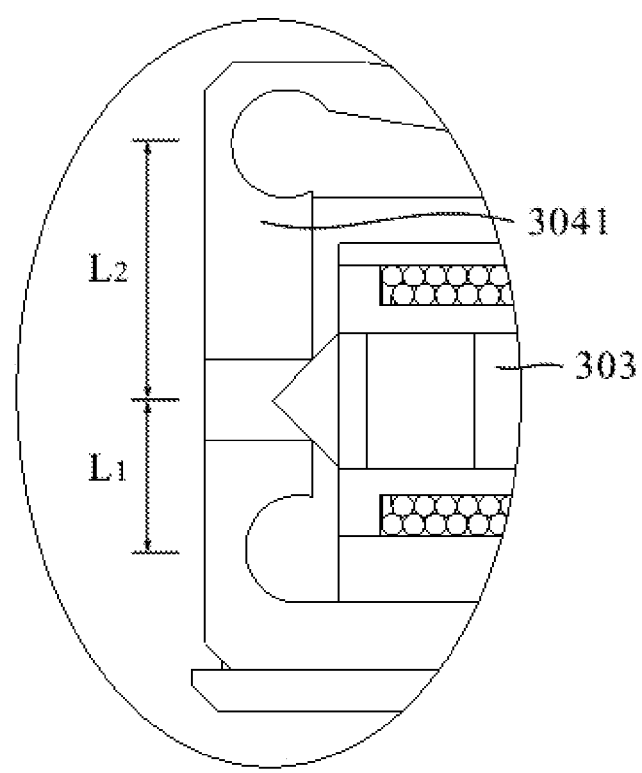

In some embodiments, the shape and size of the weight element 305 may be set as needed. Referring to FIG. 20 and FIG. 27, when the display panel 10 serves as a first vibration element, the axis of the coil 301 is set parallel to the display panel 10, and the direction in which the weight element 305 has the minimum size is set perpendicular to the display panel 10.

FIG. 33 shows a schematic diagram of an exciter according to some embodiments of the disclosure. When the frame 332 at the height side serves as the first vibration element, the axis of the coil 301 is set parallel to the display panel 10, the direction in which the weight element 305 has the maximum size is disposed in a vertical direction of the display panel, and the direction in which the weight element 305 has the minimum size is disposed along the direction vertical to the display panel 10. The exciter 30 is disposed between the backplane 20 and the rear housing 60, which does not increase the thickness of the display panel device 300.

When the frame 332 located at the left or right side serves as the first vibration element, the axis of the coil 301 is set parallel to the display panel 10, the direction in which the weight element 305 has the maximum size is disposed in a horizontal direction of the display panel, and the direction in which the weight element 305 has the minimum size is disposed along the direction vertical to the display panel 10. The exciter 30 is disposed between the backplane 20 and the rear housing 60, which does not increase the thickness of the display panel device 300.

In some embodiments, another exciter 30 is provided. The exciter 30 includes: a coil 301; a stretchable member 303 which may undergo a elongation or shorten deformation along the axial direction of coil 301; a second vibration element 304, which includes a first movement part 3041 and a second movement part 3042 in connection, where the first movement part 3041 is connected with a display apparatus and is located at an end of the coil 301 along its own axial direction, and the second movement part 3042 is connected with the display apparatus, and is located on a side of the coil 301 along its own radial direction. When the stretchable member 303 expands or retracts, the first movement part 3041 may undergo reciprocating movement relative to the end of the coil 301 under the elastic force of the stretchable member 303 or the second vibration element 304, and the second movement part 3042 may undergo reciprocating movement under the elastic force of the first movement part 3041 or the second vibration element 304, and drive the display apparatus to vibrate and output sound. Here, the direction of the reciprocating movement of the second movement part 3042 is set inclined to the axial direction of the coil 301. The structure, function and beneficial effect of the exciter 30 have been described in the above embodiments, which will not be repeated herein.

Based on the above display panel device, embodiments of the disclosure further provide another display apparatus, in order to deal with the following issues.

In order to enhance the presence while watching films on a display apparatus, more and more display apparatuses or audio equipment adopt a height speaker to reproduce sound with a sense of height, for example, the sound of aeroplanes flying overhead, thunder, etc. Such sound is always output from a loudspeaker or a ceiling speaker on the roof, however, the loudspeaker or the ceiling speaker may not be mounted for most family room during house renovation. As such, the display apparatus in the related art realizes the height sound play by a reflection method. In this case, the height speaker is mounted on a top of the display apparatus, and the sound waves emitted from the speaker are reflected by the ceiling and transmitted to human ears.

As the television set increasingly adopts an ultra-thin body design, and a size of the height speaker also becomes ultra-thin. However, in this case, a play effect for the low-frequency signal is weakened. The low-frequency signal of the channel for height sound, such as the sound of the aircraft engine, thunder, etc., cannot be played properly, resulting in a poor sound play effect of the television set.

The display apparatus provided in the disclosure is described in detail below.

FIG. 34 shows a schematic diagram of an operation scenario of a display apparatus according to some embodiments of the disclosure. As shown in FIG. 34, the display apparatus 382 is in data communication with a server 384. A user can operate the display apparatus 382 via a smart device 383 or a control device 381.

Figure 35:
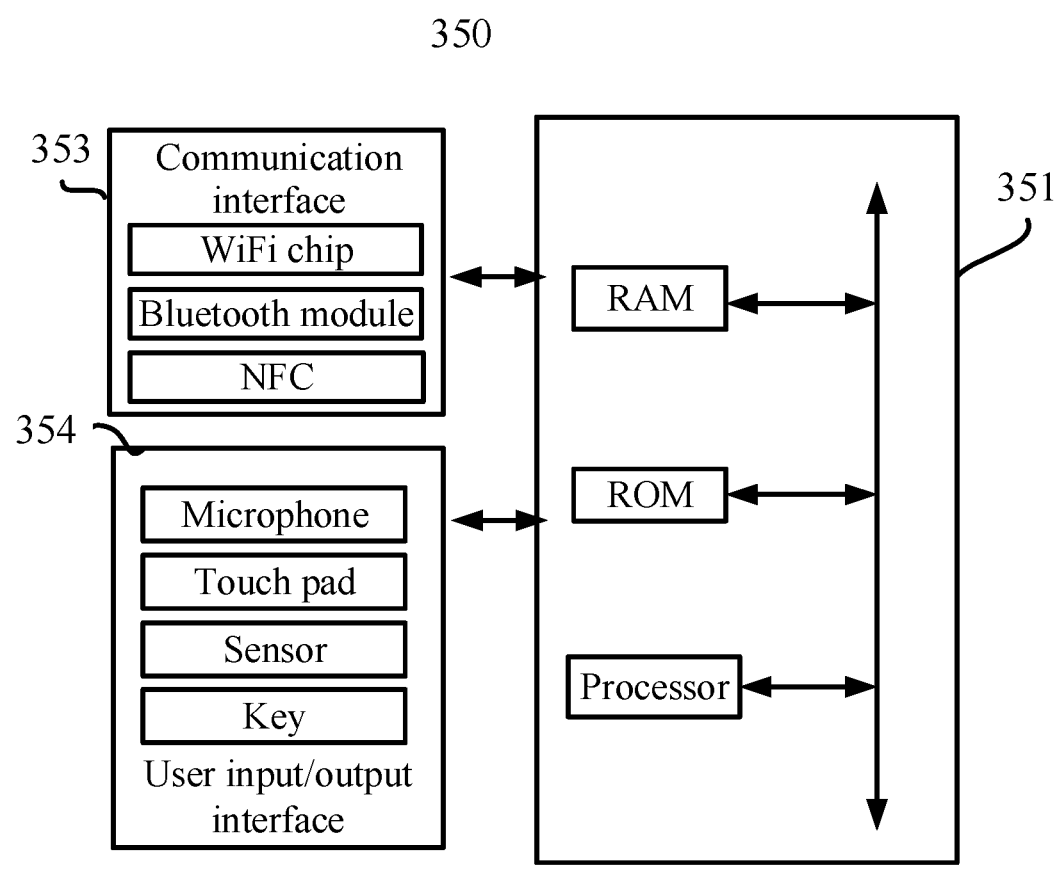
FIG. 35 shows a block diagram of a hardware configuration of the control device according to some embodiments of the disclosure.

FIG. 35 shows a block diagram of a hardware configuration of the control device 381 according to some embodiments of the disclosure. As shown in FIG. 35, the control device 381 includes at least one processor 351, a communication interface 353, a user input/output interface 353, a power supply, and a memory. The control device 381 can receive instructions from the user, and convert the instructions to commands which can be recognized and responded by the display apparatus 382. The communication interface 353 is configured for communication with an external device.

Figure 36:
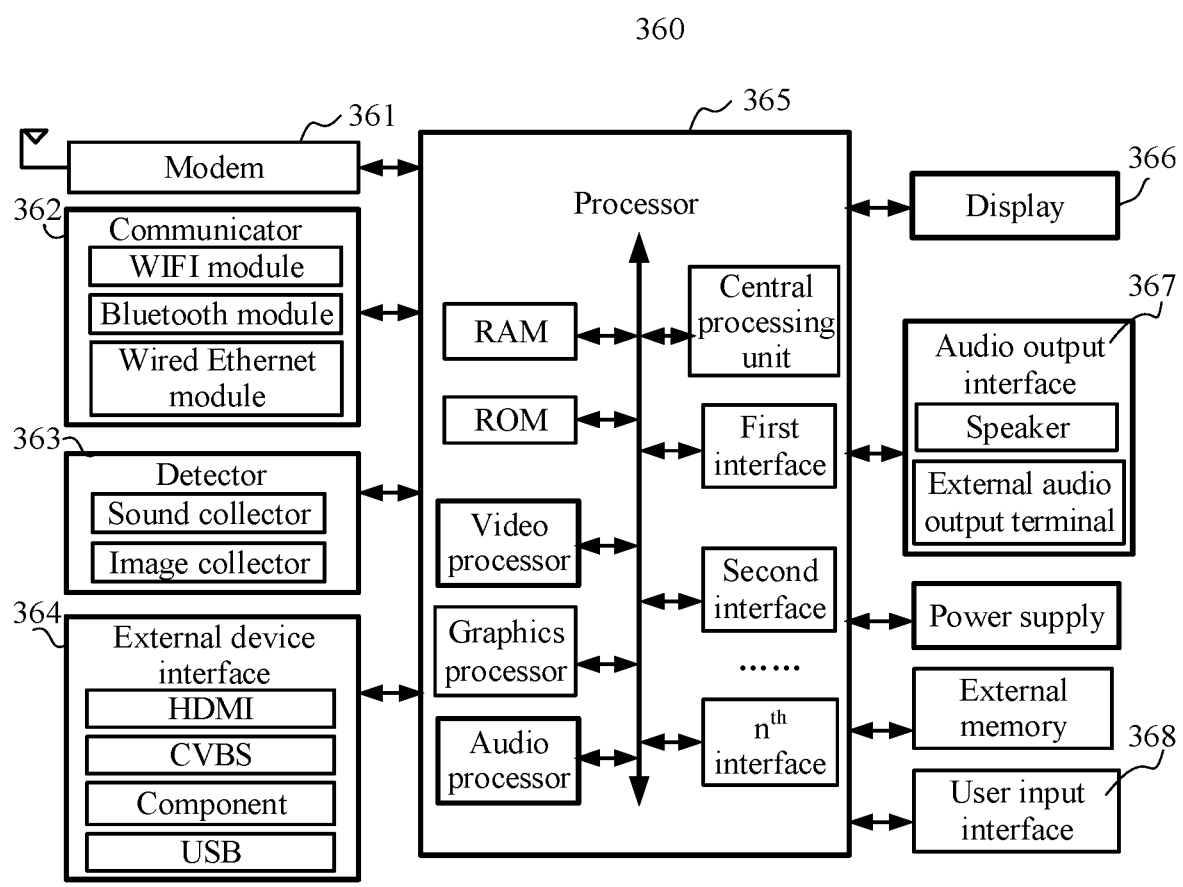
FIG. 36 shows a block diagram of a hardware configuration of the display apparatus according to some embodiments of the disclosure.

FIG. 36 shows a block diagram of a hardware configuration of the display apparatus 382 according to some embodiments of the disclosure.

In some embodiments, the display apparatus 382 includes at least one of modem 361, a communicator 362, a detector 363, an interface for external device 364, a processor 365, a display 366, an audio output interface 367, a memory, a power supply, and an user input interface.

Figure 37:
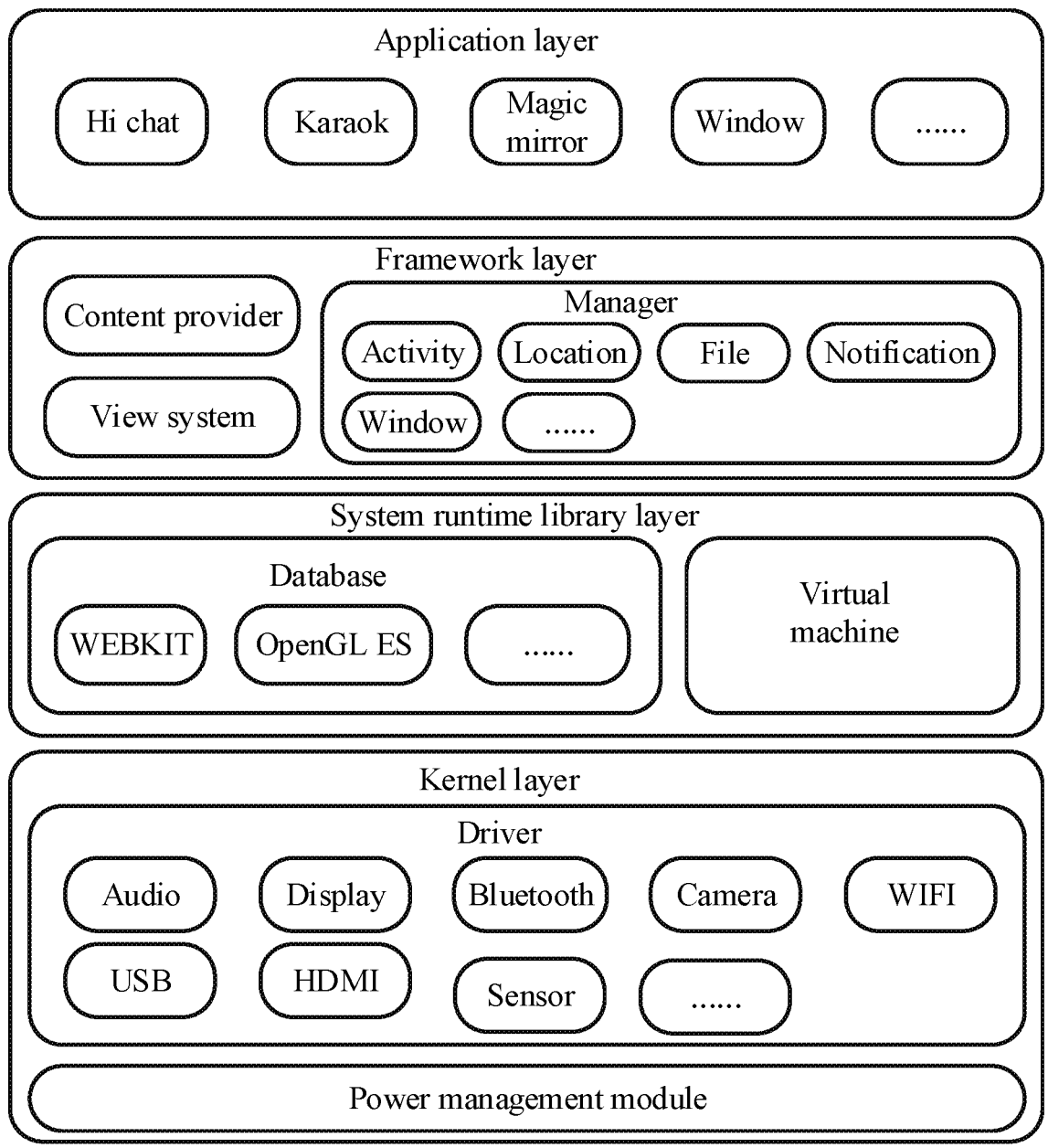
FIG. 37 shows a schematic diagram of a software configuration of the display apparatus according to some embodiments of the disclosure.

Referring to FIG. 37, in some embodiments, the system is divided into four layers, which are, from top to bottom, an applications layer (referred to as "application layer" for short), an application framework layer (referred to as "framework layer" for short), an Android runtime and system library layer (referred to as "system runtime library layer" for short), and a kernel layer.

An application scenario for the disclosure is described below.

Figure 38:
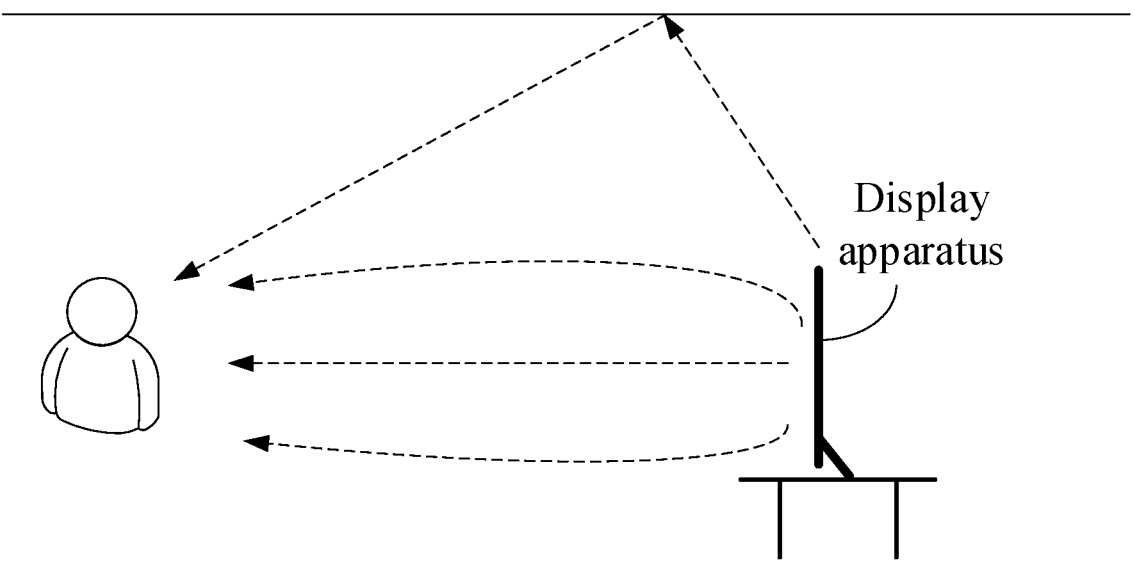
FIG. 38 shows a schematic diagram of an application scenario according to some embodiments of the disclosure.

FIG. 38 shows a schematic diagram of an application scenario according to some embodiments of the disclosure. As shown in FIG. 38, at present, the display apparatus or a speaker device always adopts a reflection method based on a height speaker for playing the sound with sense of height. In this case, the height speaker is mounted height ward on a top of the display apparatus, and the sound waves emitted from the speaker are reflected by the ceiling and transmitted to human ears. However, as the display apparatus increasingly adopts an ultra-thin body design and a size of the height speaker also becomes ultra-thin, the play effect for the low-frequency signal is weakened, resulting that the low-frequency signal of the channel for height sound cannot be played properly.

Figure 39:
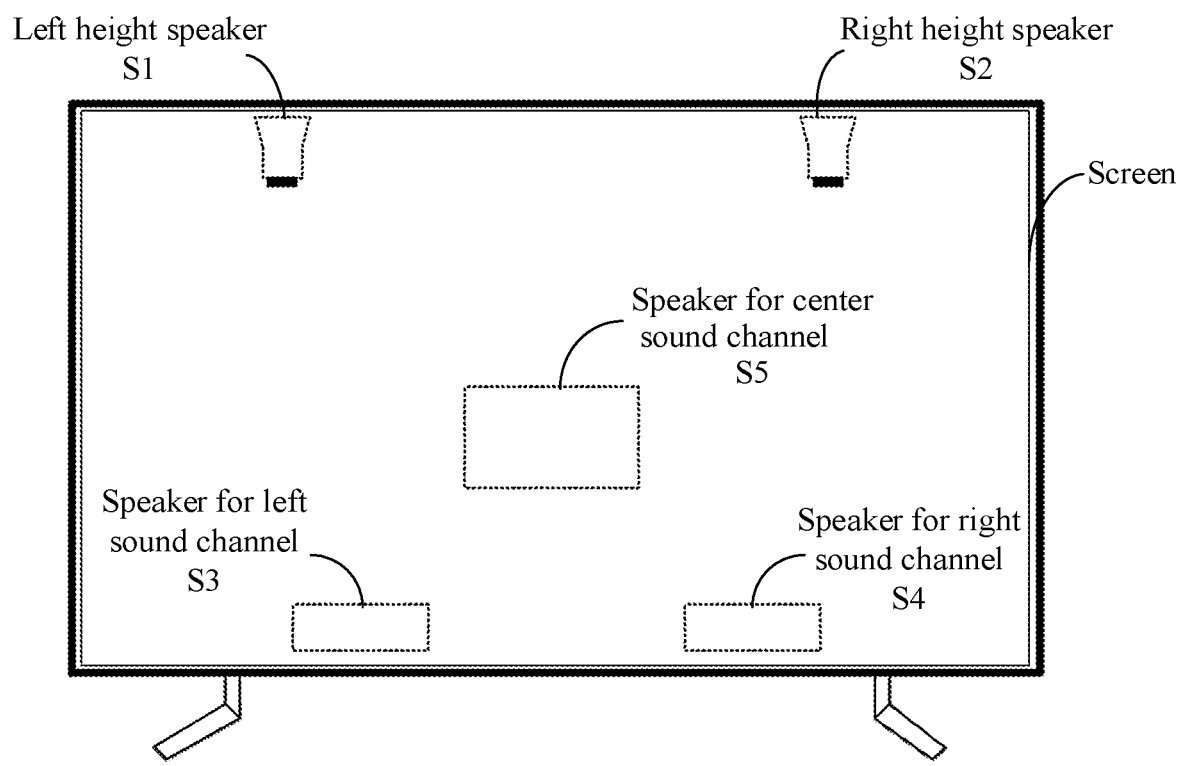
FIG. 39 shows a schematic diagram of a display apparatus provided with a height speaker according to some embodiments of the disclosure.

FIG. 39 shows a schematic diagram of a display apparatus with a height speaker according to some embodiments of the disclosure. As shown in FIG. 39, the display apparatus includes a display (screen) and an audio output interface. In some embodiments, the audio output interface is a speaker. The display apparatus according to embodiments of the disclosure will be described by taking the speaker as an example of the audio output interface. The display includes a screen configured for image display and a housing configured to support the screen. A hollow space is formed by the screen and the housing, and a speaker is disposed in the hollow space. The speaker includes a vibration element for outputting sound via vibration and a cavity with a bottom in sealing connection with the vibration element and facing an outside of the hollow space. The cavity includes first and second parts which are parallel to the screen and matched with each other. The bottom of the first part of the cavity is sealed connected with the vibration element and a section obtained by cutting the first part along the channel axis direction of the first part is rectangular, and the second part gradually expands outwardly and is in a shape of a horn.

Referring to FIG. 39, the speaker specifically includes a height speaker disposed on the top of the display, which includes a left height speaker S1 and a right height speaker S2. In addition, the speaker also includes a speaker for main sound channel, which includes a speaker for left sound channel S3 and a speaker for right sound channel S4. Further, the speaker includes a speaker for center sound channel S5.

Figure 40:
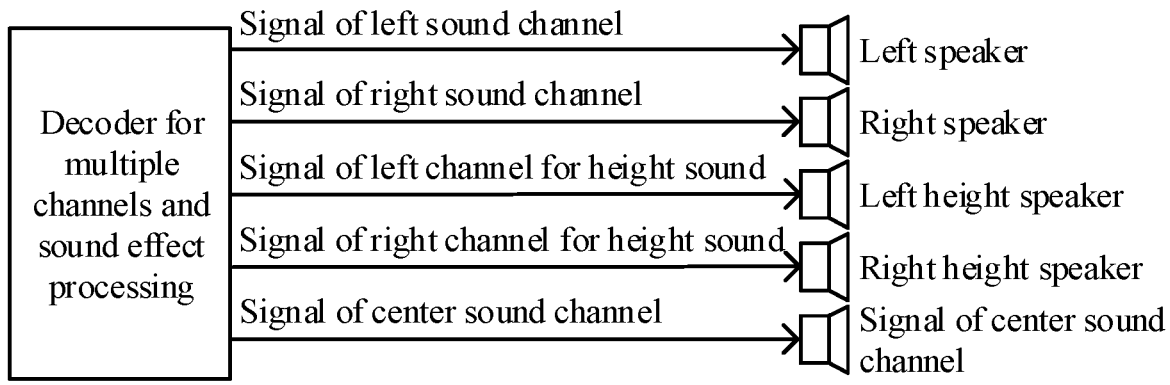
FIG. 40 shows a system architecture diagram of a display apparatus configured with multiple sound channels.

FIG. 40 shows a system architecture diagram of a display apparatus configured with multiple sound channels. As shown in FIG. 40, the system architecture includes a left sound channel, a right sound channel, a center sound channel, a left channel for height sound, and a right channel for height sound.

Referring to FIGS. 39 and 40, for the traditional multi-channel and sound processing architecture, the left height speaker S1 plays a signal for the left channel for height sound, the right height speaker S2 plays a signal for the right channel for height sound, the speaker for left sound channel S3 plays a signal for the left sound channel, the speaker for right sound channel S4 plays a signal for the right sound channel, and the speaker for center sound channel S5 plays a signal for the center sound channel.

Multi-channel display apparatus can significantly help to bring the immersive movie watching experience for a user. However, the multiple speakers will cause an increase of the thickness of the display apparatus, especially for those display apparatus with an ultra-thin top. As such, an appearance of the display apparatus with the speakers for height sound is not aesthetically pleasing. In order to deal with this issue, in related art, an ultra-thin design for the height speaker is used, while normal design for other speakers is used. In this case, the display apparatus in related art is presented in a thin top and a thick bottom.

The signals for each sound channel may contain sound of full-frequency (20-20 kHz), such as the signal of height sound contains both high-frequency signals such as bird song and low-frequency signals such as thunder and sounds from helicopter. In the case that the speaker adopts an ultra-thin design, the playback effect of low-frequency signals by the height speaker will be reduced.

Figure 41:
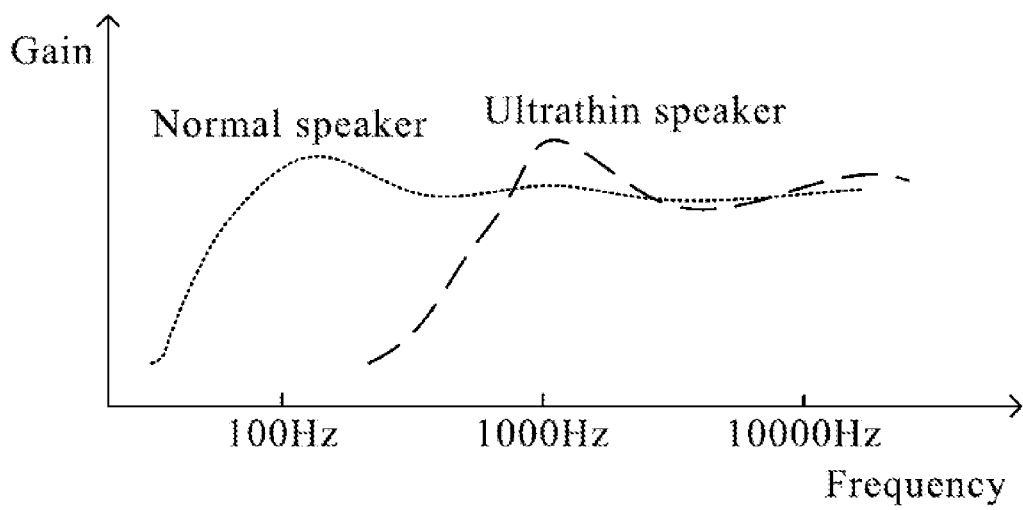
FIG. 41 shows a schematic diagram for illustrating different play effects for signals in different frequencies via different speakers according to some embodiments of the disclosure.

FIG. 41 shows a schematic diagram for illustrating different play effects for signals in different frequencies via different speakers according to some embodiments of the disclosure. The lower the loudness is, the worse the sound playback effect is. As shown in FIG. 41, the speaker with a conventional thickness can normally output the sound of full frequency band; while for the ultra-thin speaker, which is limited to the vibrating diaphragm, the frequency response for sound of low frequency is relatively poor, so that the low-frequency sound cannot be output. This will cause a situation where the sound of low-frequency which is originally contained in the height sound, such as sounds of aircraft engine, thunder, etc., cannot be output normally, resulting in a poor sound playback effect of the display apparatus, and a poor user experience.

For example, for the ultra-thin speaker shown in FIG. 41, a play effect for signals with frequencies above 1000 Hz is better than that for signals with frequencies below 1000 Hz.

The display apparatus and an audio signal playback method according to embodiments of the disclosure, aim to cope with the above technical problems in the related art. In embodiments of the disclosure, audio signals output from different speakers are processed in such a way that the audio signals distributed to each speaker can be output normally.

Figure 42:
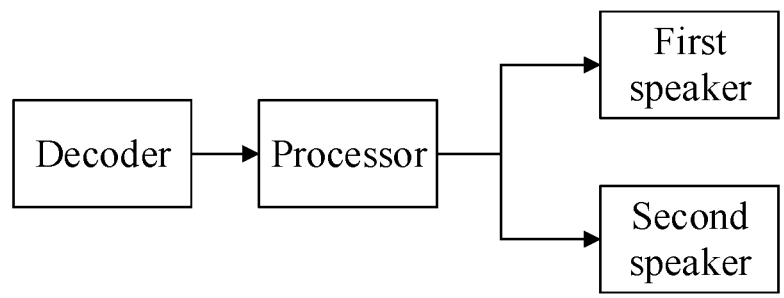
FIG. 42 shows a schematic diagram of a display apparatus according to some embodiments of the disclosure.

In some embodiments, a display apparatus is provided. FIG. 42 shows a schematic diagram of a display apparatus according to some embodiments of the disclosure. As shown in FIG. 42, the display apparatus includes: a first sound output interface, a second sound output interface, a decoder, and at least one processor in connection with the first sound output interface, the second sound output interface, and the decoder, respectively. Here, the first sound output interface is used to output an audio signal of a first sound channel, and the second sound output interface is used to output an audio signal of a second sound channel different from the first sound channel. In some embodiments, the first sound output interface may be implemented as a first speaker, and the second sound output interface may be implemented as a second speaker.

In some embodiments, the first sound channel may be a channel of height sound, the second sound channel may be a main sound channel, such as left sound channel and right sound channel, etc. Accordingly, the first speaker is a speaker for height sound channel, and the second speaker is a speaker for left/right channel.

Further, in some embodiments, the first sound channel and the second sound channel are used for a same left side or right side. In this case, when the first sound channel is the left height sound channel, the second channel is the left sound channel, and correspondingly, the first speaker is the speaker for left height sound channel, and the second speaker is the speaker for the left sound channel. When the first channel is the right height sound channel, the second channel is the right sound channel, and correspondingly, the first speaker is the speaker for the right height sound channel, and the second speaker is the speaker for the right sound channel. In this case, confusion of sounds between the left and right channels can be avoided.

The decoder is used to decode the signal from a signal source to obtain the decoded result. Here, the signal source is the signal source for the display apparatus, such as high definition multimedia interface (HDMI), digital television (DTV), network and removable storage media. The audio streams from these signal sources will be decoded by the decoder, and a format input to the decoder is the original format of each source, such as 7.1 channel system, 5.1 channel system, 2.0 channel system, etc., and these audio streams are then sent to the at least one processor of the display apparatus.

In some embodiments of the present disclosure, the at least one processor is configured to perform the following steps.

S110, the at least one processor obtains a decoded result from the decoder, and obtains audio signals for different sound channels according to the decoded result. The audio signals for different channels include a first audio signal for a first speaker, and a second audio signal for a second speaker. The first audio signal and the second audio signal are of different types of sound channels.

S120, the at least one processor divides the first audio signal into a first sub-signal and a second sub-signal, where a frequency of the first sub-signal is greater than a preset frequency, and a frequency of the second sub-signal is less than or equal to the preset frequency. In this case, the at least one processor separates the original first audio signal based on frequency to obtain sub-signals of different frequencies.

S130, the at least one processor sends the first sub-signal to the first speaker for output. The first speaker has a poor playback effect on the low-frequency signal, so the at least one processor sends the first sub-signal with a higher frequency to the first speaker for playback to ensure a good sound playback effect for the high-frequency signals.

S140, the second sub-signal is processed with delay, and the delayed second sub-signal and the second audio signal are combined to obtain a first combination signal, and the first combination signal is sent to the second speaker for output. Since effects of outputting the low-frequency signal and high-frequency signal via the second speaker are both good, for the second sub-signal with a lower frequency in the first audio signal, can be sent to the second speaker for output, to ensure a good sound playback effect of the low-frequency signal. Here, the first audio signal for the first speaker may be a signal of a height sound channel, and the second audio signal for the second speaker may be a signal for left/right channel.

In some embodiments, for the ultra-thin speaker for the height sound channel, which is the first speaker in embodiments of the disclosure, an effect for outputting the first audio signal in the low-frequency signal via the first speaker is poor. While, the low-frequency signal in the first audio signal is required to be output, thus, in embodiments of the disclosure, the part of the low-frequency signal in the first audio signal is sent to the second speaker that can output the low-frequency signal normally, to ensure that all sounds in the first audio signal can be output normally. Here, the preset frequency can be set to be 1000 Hz.

Figure 43:
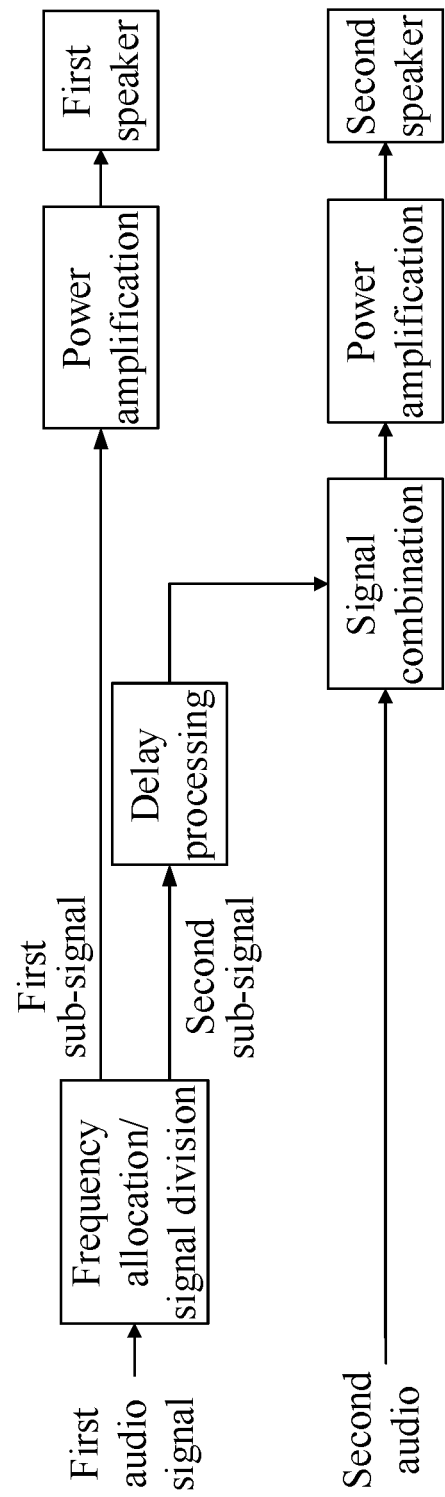
FIG. 43 shows a schematic diagram for illustrating a signal processing via a processor according to some embodiments of the disclosure.

FIG. 43 shows a schematic diagram for illustrating a signal processing via at least one processor according to some embodiments of the disclosure. As shown in FIG. 43, for the audio signal input into the at least one processor, the at least one processor first divides the first audio signal, based on frequency, into the first sub-signal and the second sub-signal, which may be realized by a frequency distribution module in the at least one processor. Here, the frequency of the first sub-signal is greater than the preset frequency, and in this case, the first sub-signal is a high-frequency signal, meaning that the first sub-signal can be output normally via the first speaker. The frequency of the second sub-signal is less than or equal to the preset frequency, and in this case, the second sub-signal is a low-frequency signal, meaning that the second sub-signal cannot be output normally via the first speaker, and the second sub-signal needs to be sent to the second speaker for output. After the first sub-signal and the second sub-signal are obtained, the first sub-signal is sent to the first speaker for output, and the second sub-signal is sent to the second speaker for output.

While sending the second sub-signal to the second speaker for output, the second sub-signal is first delayed via a delay module in the at least one processor to ensure signal synchronization, and then the second sub-signal after delay is combined with the second audio signal to obtain the first combination signal. The first combination signal is sent to the second speaker for output. Thus, the first combination signal includes the second sub-signal (i.e., low-frequency signal) in the first audio signal. In this way, all sounds in the first audio signal can be output normally.

In some embodiments, when a signal is sent to the speaker for output, the signal can be power amplified via a power amplifier, and then the amplified signal is sent to the corresponding speaker. For example, for the first sub-signal for the first speaker for output, the first sub-signal can be amplified by the first power amplifier, and then the amplified first sub-signal is sent to the first speaker.

Likewise, when the first combination signal is sent to the second speaker for output, the first combination signal can be amplified by the second power amplifier, and then the amplified first combination signal can be sent to the second speaker.

Figure 44:
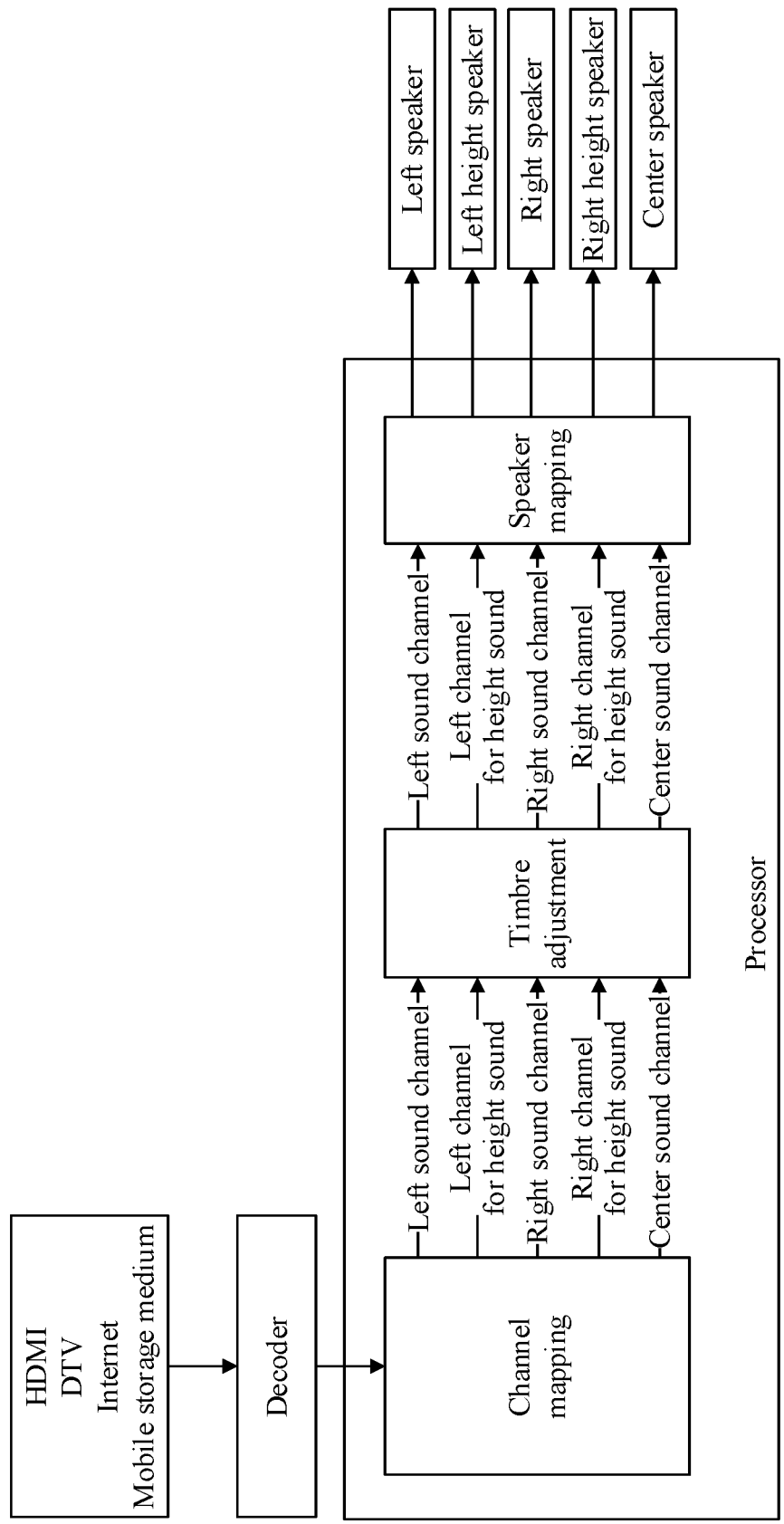
FIG. 44 shows a schematic architecture diagram for illustrating signal links of a display apparatus provided with multiple sound channels according to some embodiments of the disclosure.

FIG. 44 shows a schematic architecture diagram for illustrating signal paths of a display apparatus provided with multiple sound channels according to some embodiments of the disclosure. As shown in FIG. 44, HDMI, DTV, network, removable storage media are all signal sources for the display apparatus, audio streams in these signal sources will be decoded by the decoder, and the format of the signal input into the decoder is the original format of each signal source. These audio streams then enter a sound channel mapping module in the at least one processor of the display apparatus, and are converted to be in a fixed format with channel numbers, for example, the 3.0.2 format, through match via the sound channel mapping module. The signals then enter a timbre adjustment module in the at least one processor, where the timbre adjustment module is configured for algorithm adjustment on signals of the respective channels. Then the signal in the 3.0.2 format flow into a speaker mapping module in the at least one processor, where the speaker mapping module performs a mapping and allocation based on the characteristic of the speakers in a subsequent process. In this case, the signal processing is executed as shown in FIG. 44, where new signals in the 3.0.2 format are generated, and then are output to the speakers for playback.

In some embodiments, for speakers of different channels, when the first speaker cannot output a low-frequency signal with a frequency less than a preset frequency, the first audio signal corresponding to the first speaker can be divided into a first sub-signal of high-frequency and a second sub-signal of low-frequency. The sub-signal of high-frequency is allocated to the first speaker for output, and the sub-signal of low-frequency is allocated to the second speaker for output. Since the second speaker can output a low-frequency signal normally, it can ensure that all content in the first audio signal can be output normally, thereby improving the sound playback effect of the display apparatus.

In some embodiments, in the step of performing delay processing on the second sub-signal, the at least one processor is configured to perform the following steps.

S410, the at least one processor obtains a first distance the sound travels from the first speaker to an object, and a second distance the sound travels from the second speaker to the object. Here, the object may be a user, and the first distance and the second distance each is a distance of the sound transmission to the user's ears.

S420, the at least one processor determines the delay time according to the first distance and the second distance.

S430, the at least one processor performs delay processing on the second sub-signal according to the delay time to realize the synchronization of the second sub-signal and the second audio signal.

Figure 45:
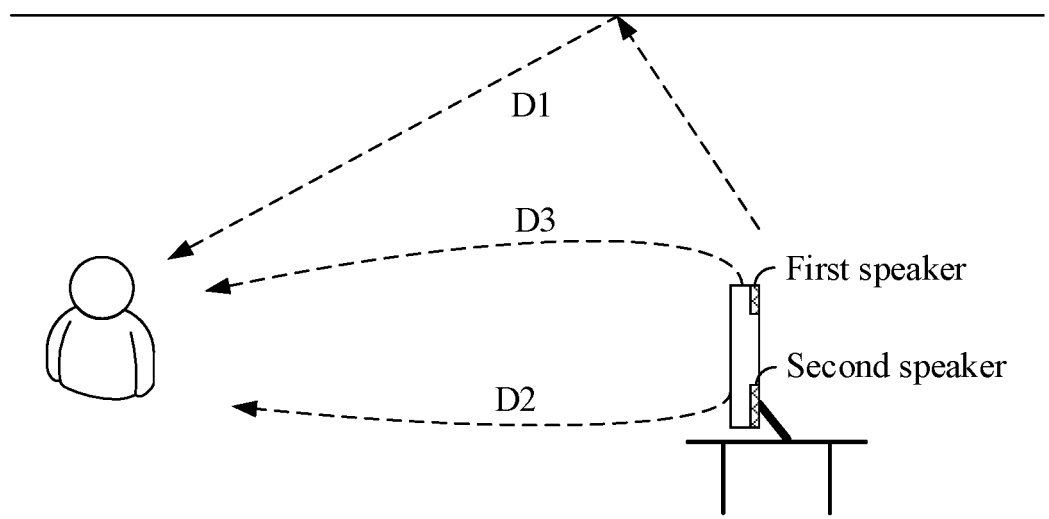
FIG. 45 shows another schematic diagram of an application scenario according to some embodiments of the disclosure.

In some embodiments, FIG. 45 shows another schematic diagram of a scenario according to some embodiments of the disclosure. As shown in FIG. 45, the sound from the first speaker is transmitted to the human ears after reflection via the ceiling, and the total transmission distance is the first distance D1. The sound from the second speaker is transmitted directly to the human ears, and a transmission distance is the second distance D2. Considering an environment of an ordinary family room, D1 is usually greater than D2. If the second sub-signal is not delayed, the second sub-signal allocated to the second speaker will enter the human ears first, and the first sub-signal will enter the human ears later. In this case, because the user determines the direction of the sound based on what is heard first, the earlier heard second sub-signal will cause user to recognize that the sound of the first audio signal is coming from the second speaker, thus affecting the effect of the height sound.

Therefore, when the at least one processor performs signal processing, it is necessary to perform delay processing on the second sub-signal in such a way that the sound from the first speaker reaches the human ears no later than the time when the sound from the second speaker reaches the human ears. In some embodiments, the delay processing is performed in such a way that the sound from the first speaker reaches the human ears earlier than the time when the sound from the second speaker reaches the human ears.

During the delay processing, the at least one processor first obtains the first distance D1 and the second distance D2, and then determines the delay time according to distances D1 and D2, so as to perform delay processing on the second sub-signal according to the delay time to ensure the playback effect of the height sound.

In some embodiments, in the step of determining the delay time according to the first distance and the second distance, the at least one processor is configured to perform the following steps.

S421, calculating a difference between the first distance and the second distance. Due to the difference, there will be a time interval between the time when the sound from the first speaker reaches the human ears and the time when the sound from the second speaker reaches the human ears, that is, there is a delay.

S422, calculating a ratio of the difference to sound speed, which is a time.

S423, Determining a sum of the ratio and a first preset time as a delay time.

In some embodiments, after obtaining the first distance D1 and the second distance D2, the at least one processor first calculates the difference d between the two distances D1 and D2, and then obtains the ratio of the two according to the difference d and the sound speed v.

For example, assuming that D1 is 4.54 m, D2 is 2.5 m, and the sound speed v is 340 m/s, it can be obtained that the distance difference d is D1-D2=2.04 m, and the ratio is t=d/v=0.006 s=6 ms.

According to the Haas effect, in a case where the difference in the time it takes for the sound waves from the two sound sources to reach the human ears is within 5-35 ms, people cannot distinguish between the two sound sources, and a perceived direction of origin will be dictated by the sound that arrives first, while the sound that arrives later seems to be absent. In a case where the time difference is 35-50 ms, the sound that arrives later begins to be perceived, but the perceived direction of origin is still dictated by the sound that arrives first. As the time difference increases, the sense of the perceived direction becomes stronger, and the perceived level of the sound that arrives later increases.

In some embodiments, the ratio t is 6 ms, considering the Haas effect, a first preset time may be added to 6 ms, and then the sum of the two can be used as the delay time. For example, the first preset time t1 can be set to 16 ms, so that the delay time T=t+t1=22 ms.

In general, for the setting of delay time, based on tests, when the delay time range is (22±8) ms, a better sound output effect can be obtained. Here, referring to FIG. 45, if the delay time is greater than an upper limit of 30 ms of the value range, due to the existence of the propagation path D3, for users with sharper sense of hearing, a larger time delay between the two paths D2 and D3 will be perceived, so that there will be an echo in the sound, which affects the sound quality. Therefore, to avoid echo, the upper limit of the delay time is set to 30 ms.

In embodiments of the disclosure, the characteristics of the electrical signal are described by testing the electrical signal of the sound from the first speaker and the second speaker. The spectral characteristics of the sound signals can be obtained by using a spectrum analyzer or other equipment with spectrum analysis capabilities.

Figure 46:
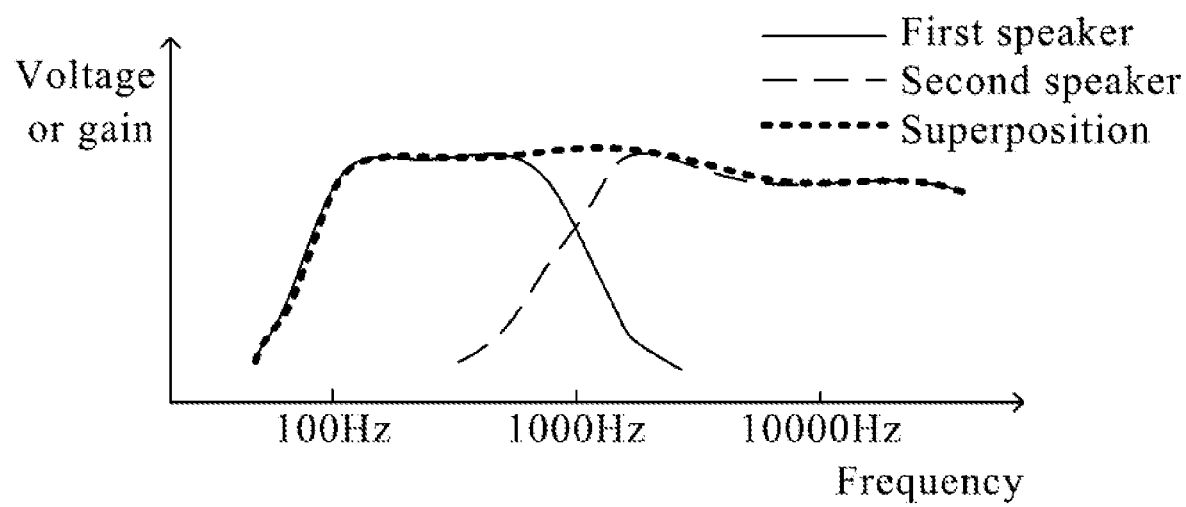
FIG. 46 shows a schematic diagram for illustrating spectral features of signals of a first speaker and a second speaker according to some embodiments of the disclosure.

FIG. 46 shows a schematic diagram for illustrating spectral features of signals of a first speaker and a second speaker according to some embodiments of the disclosure. As shown in FIG. 46, a pink noise signal or a scanning signal with a full frequency range is output through the height sound channel, and the signals from the first speaker and the second speaker do not overlap in frequency (within roll-off point of 3 dB). In addition, after the two signals are superimposed, a full wideband spectrum signal can be obtained.

In some embodiments, the audio signal may be used for testing, and a test location is a position where a person stands as shown in FIG. 38 or FIG. 45. If it is the electrical signal that tested, the signals from the first speaker and the second speaker still do not overlap each other in frequency (within roll-off point of 3 dB), and can be combined to be a full frequency band signal. Due to different electroacoustic conversion efficiencies for speakers of different types or structures, for the electrical signals, an average value corresponding to the first speaker may be obviously not equal to an average value corresponding to the second speaker, such as the voltage for the first speaker is twice that for the second speaker.

Figure 47:
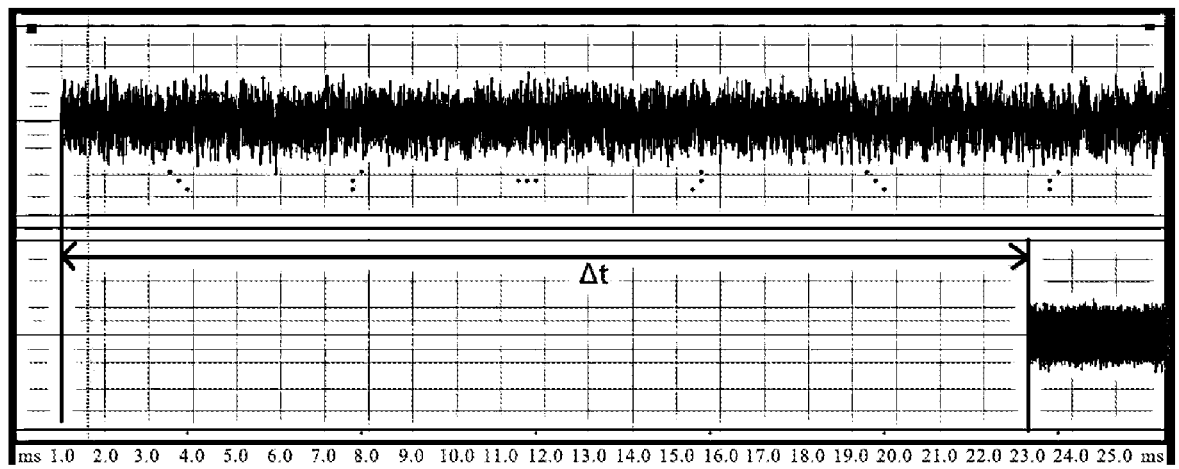
FIG. 47 shows a schematic diagram for illustrating a test result obtained at a moment when a pink noise of full frequency band begins to be output on a channel for a first audio signal according to some embodiments of the disclosure.

In addition, there is a delay between the outputs from the first and second speakers using an oscilloscope or other instrument for time domain analysis. FIG. 47 shows a schematic diagram for illustrating a test result obtained at a moment when a pink noise of full frequency band begins to be output on a channel for a first audio signal according to some embodiments of the disclosure. As shown in FIG. 47, a signal from the first speaker is earlier than a signal from the second speaker by a time of $\Delta t$ (in the figure, the upper signal indicates the signal from the first speaker, the lower signal indicates the signal from the second speaker). Here, a range of $\Delta t$ is 22 ms±8 ms. The test signals can be an electrical signal or an audio signal. If test signal is the audio signal, the test location should face directly to the vibrating diaphragm or sounding hole, and distances from the test equipment to the speakers should be same to avoid the delay caused by the test distance.

Figure 48:
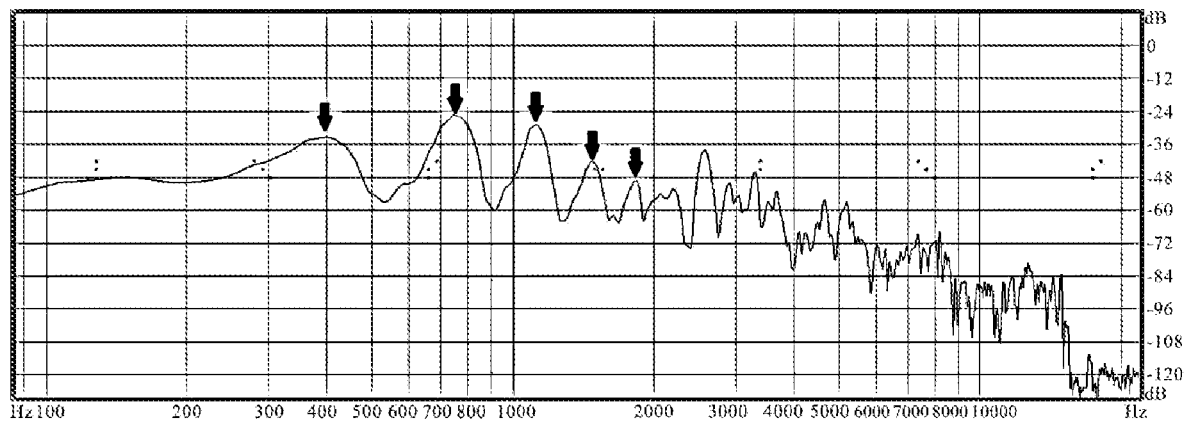
FIG. 48 shows schematic diagram for illustrating signals of human voice according to some embodiments of the disclosure.

FIG. 48 shows schematic diagram for illustrating signals of human voice according to some embodiments of the disclosure. As shown in FIG. 48, for the human voice, it includes a series of harmonics, and peaks of the wave indicate various frequency components of the harmonic. The fundamental frequency of the human voice is about 370 Hz, the second harmonic is 740 Hz, and the third harmonic is 1119 Hz. As can be seen, the second harmonic less than 1000 Hz, and the third harmonic is greater than 1000 Hz. In this case, if the signal above 1000 Hz is output first, a situation where the sound of harmonic first reaches the human ears, and the sound of fundamental frequency reaches the human ears later, may occur. If a listener hears the harmonics first, the sound may feel cracked.

In view of the above, in some embodiments, in the step of delaying the second sub-signal, the at least one processor is configured to perform the following steps.

S440, the at least one processor performs voice detection on the first audio signal, and obtains a detection result, where the detection result indicates whether the first audio signal includes human voice, and the voice detection process can be realized by the detection method in the related art.

S450, in response to the detection result indicates that the first audio signal includes human voice, the at least one processor determines the second preset time as the delay time, and delays the second sub-signal according to the second preset time.

In some embodiments, in order to prevent a situation where harmonics in the human voice reaches the human ears first and the fundamental frequency reaches the human ears later, the at least one processor may decrease the delay time when the human voice is included in the height sound. In some embodiments, the at least one processor may pre-set a second preset time which is relative small, in response to the human voice being detected by voice detection, the second preset time can be directly set as the delay time for delay processing.

The second preset time can be determined based on experience. For example, when the first audio signal includes the human voice, if the delay time is set to 14 ms, a better output effect can be obtained. Thus, the second preset time can be set to 14 ms.

It should be noted that the specific time values in embodiments of the disclosure, such as the first preset time of 16 ms, the delay time range of (22±8) ms, the second preset time of 14 ms, etc., are illustrations of embodiments of the disclosure. In a practical process, the values can also be adjusted according to needs and not limited to the above values.

In some embodiments, the at least one processor is configured to perform the following steps.

S460, in response to the detection result indicates that the first audio signal does not include the human voice, the at least one processor performs energy detection on the first audio signal to determine the energy distribution of the first audio signal.

If the energy of the first audio signal at a preset frequency is lower than a preset energy value, the at least one processor determines a third preset time as the delay time and delays the second sub-signal according to the third preset time for signal synchronization.

In some embodiments, for sound sources with certain features, if there is no human voice included, it indicates that there is no need to decrease the delay time. In this case, the energy distribution of the signal at different frequencies is determined via energy detection.

Figure 49:
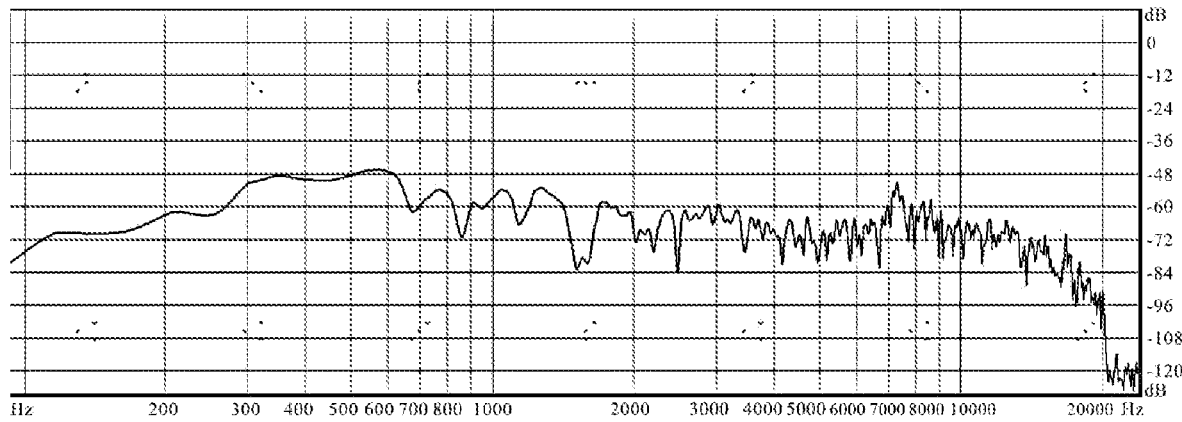
FIG. 49 shows schematic diagram for illustrating signals according to some embodiments of the disclosure.

FIG. 49 shows schematic diagram for illustrating signals according to some embodiments of the disclosure. As shown in FIG. 49, if the energy of the signal at a preset frequency (e.g., 1000 Hz) is detected to be lower than the preset energy value, this indicates that the signal has less energy around 1000 Hz. In this case, the signal includes less harmonic components around 1000 Hz, if the delay time for the signal above 1000 Hz is increased, the height sense of the sound can be effectively enhanced, therefore, the delay time can be increased.

In some embodiments, the at least one processor may pre-set a third preset time which is relative large. When no human voice is detected via the voice detection, if the energy of the first audio signal at the preset frequency is determined to be lower than the preset energy value, the third preset time may be directly determined as the delay time for delay processing. The third preset time can be determined based on experience, for example, the third preset time can be set to 30 ms, which can significantly improve the height sense of the sound.

In some embodiments, in the step of dividing the first audio signal into the first sub-signal and the second sub-signal, the at least one processor is configured to perform the following steps.

S210, the at least one processor determines a frequency corresponding to a signal valley of the first audio signal, and compares the frequency corresponding to the signal valley with a preset frequency.

S220, in response to the frequency corresponding to the signal valley being greater than the preset frequency, the at least one processor divides the first audio signal into a new first sub-signal and a new second sub-signal according to the frequency corresponding to the signal valley, where a frequency of the new first sub-signal is greater than the frequency corresponding to the signal valley, and a frequency of the new second sub-signal is less than or equal to the frequency corresponding to the signal valley.

In some embodiments, for certain sound signals, such as signals from helicopter which includes both low-frequency signals of engines and high-frequency signals of propellers, there may be a case where the harmonic frequency of low-frequency signal exceeds the preset frequency. As such, in order to avoid segmentation of a complete signal as much as possible, the frequency corresponding to the signal valley of the audio signal can be determined, and the frequency corresponding to the signal valley and the preset frequency can be compared.

Here, if the frequency corresponding to the signal valley is less than the preset frequency, in this case, the frequency corresponding to the signal valley is lower than 1000 Hz, since the first speaker cannot output the sound of frequency below 1000 Hz, the dividing line for sub-bands is not changed. In this case, the first sub-signal and the second sub-signal are obtained according to the preset frequency of 1000 Hz.

In addition, when the frequency corresponding to the signal valley is greater than the preset frequency, in this case, the frequency corresponding to the signal valley is greater than 1000 Hz, a strategy for signal division can be adjusted. In this case, the first sub-signal and the second sub-signal are obtained according to the frequency corresponding to the signal valley as the dividing line. For example, when the frequency corresponding to the signal valley is 1382 Hz, the first sub-signal with a frequency greater than 1382 Hz and the second sub-signal with a frequency less than or equal to 1382 Hz are obtained. As such, it can make division of a complete signal as less as possible by adjusting the frequency for signal division, thereby improving the sound output effect.

In some embodiments, in the step of sending the first sub-signal to the first speaker for playback, the at least one processor is configured to perform the following steps.

S310, the at least one processor performs high-pass filtering and signal gain adjustment processing on the second audio signal, and combines the processed second audio signal with the first sub-signal to obtain a second combination signal.

S320, the at least one processor sends the second combination signal to the first speaker for playback in such a way that the sound center and the image center are consistent.

The speaker for main channel of the display apparatus is usually disposed at the bottom of the display apparatus. In this case, the sound from the left and right main channels and the human voice are output from the bottom of the display apparatus. However, the image displayed on the display apparatus is on the screen of the display apparatus, which may cause inconsistency between the sound center and the image center.

In order to deal with the above issues, embodiments of the disclosure further combines the second audio signal with the first sub-signal to ensure that the sound center is consistent or matched with the image center.

Figure 50:
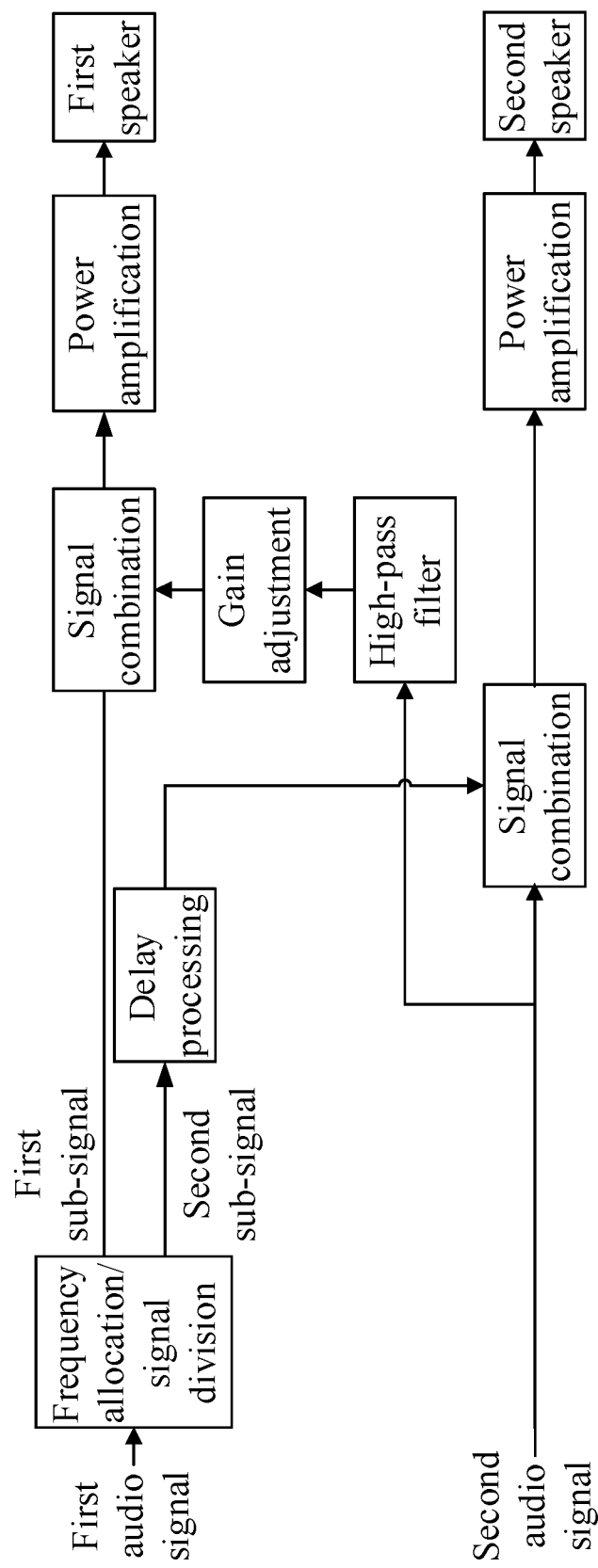

FIG. 50 shows a schematic diagram for illustrating a signal processing via a processor according to some embodiments of the disclosure. As shown in FIG. 50, the second audio signal first enters a high-pass filter for high-pass filtering, where the high-pass filter allows a signal with a frequency higher than a preset frequency to pass, such as 1000 Hz. In addition, in order to control an influence on the first sub-signal, the gain adjustment processing is further performed after high-pass filtering. Since the second audio signal is generally larger than the first audio signal, the gain adjustment processing can be negative gain adjustment.

In some embodiments, the at least one processor is configured to perform the following steps.

S510, the at least one processor obtains a third audio signal for the third speaker.

S520, the at least one processor delays the third audio signal in such a way that the delayed third audio signal is synchronized with the first combination signal, to ensure the sound output effect.

S530, the at least one processor sends the delayed third audio signal to the third speaker for output.

Here, the third audio signal can be a signal for the center channel, and accordingly the third speaker is the speaker for the center channel.

Figure 51:
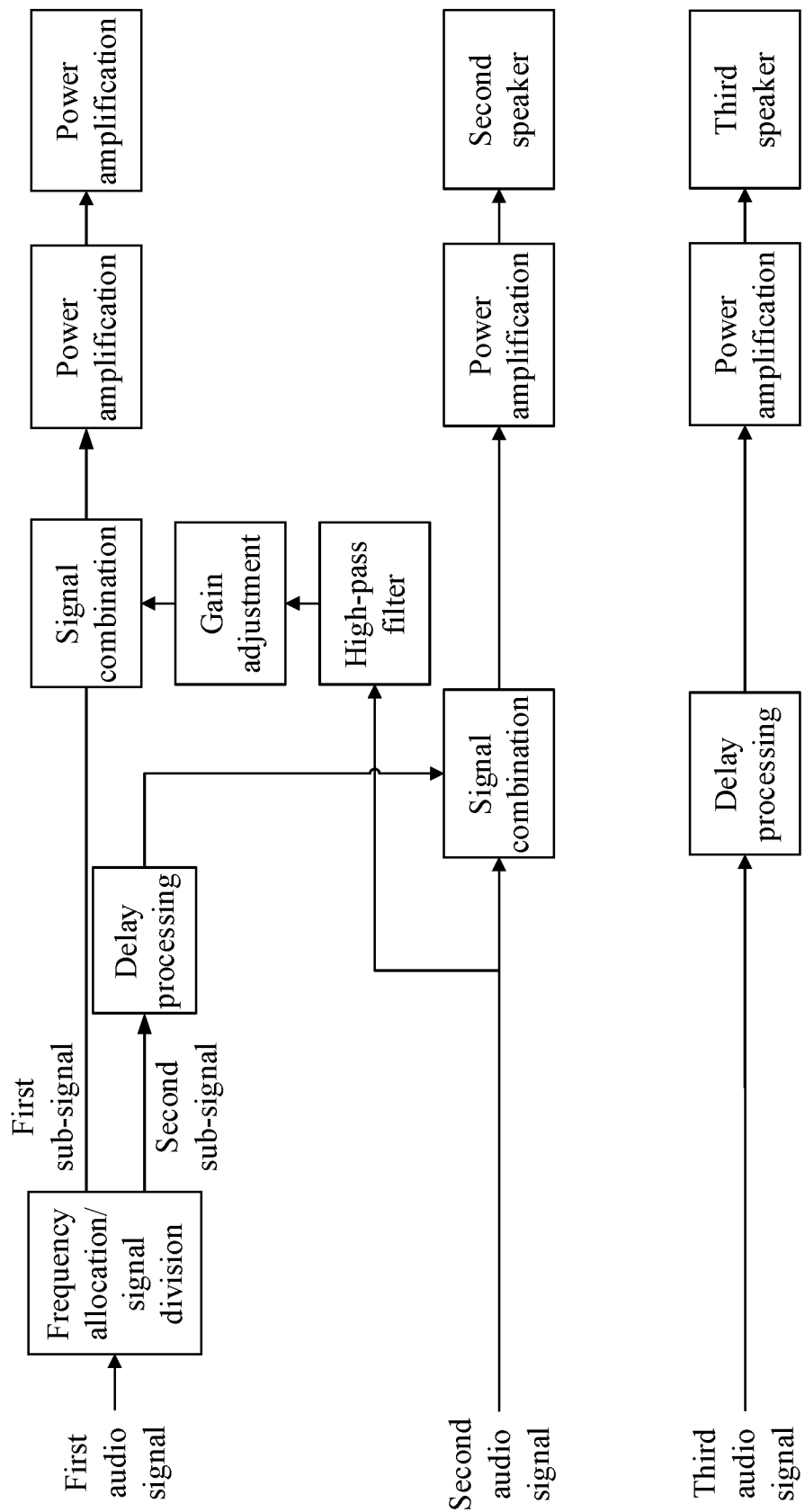

FIG. 51 shows a schematic diagram for illustrating a signal processing via a processor according to some embodiments of the disclosure. As shown in FIG. 51, for the third audio signal for the center channel, the at least one processor may perform delay processing on the third audio signal in such a way that the delayed third audio signal is synchronized with the first combination signal, and send the third audio signal after delay to the third speaker for output, thereby ensuring the synchronization of signals for all channels and improving the sound output effect.

In some embodiments, the at least one processor is configured to perform the following steps.

S540, the at least one processor performs high-pass filtering and signal gain adjustment processing on the third audio signal, and combines the processed third audio signal with the first sub-signal to obtain a third combination signal.

S550, the at least one processor sends the third combination signal to the first speaker for output.

In some embodiments, in order to increase the height sense of the signal for the center channel, the at least one processor may combine the third audio signal with the first sub-signal to improve the sound output effect.

Figure 52:
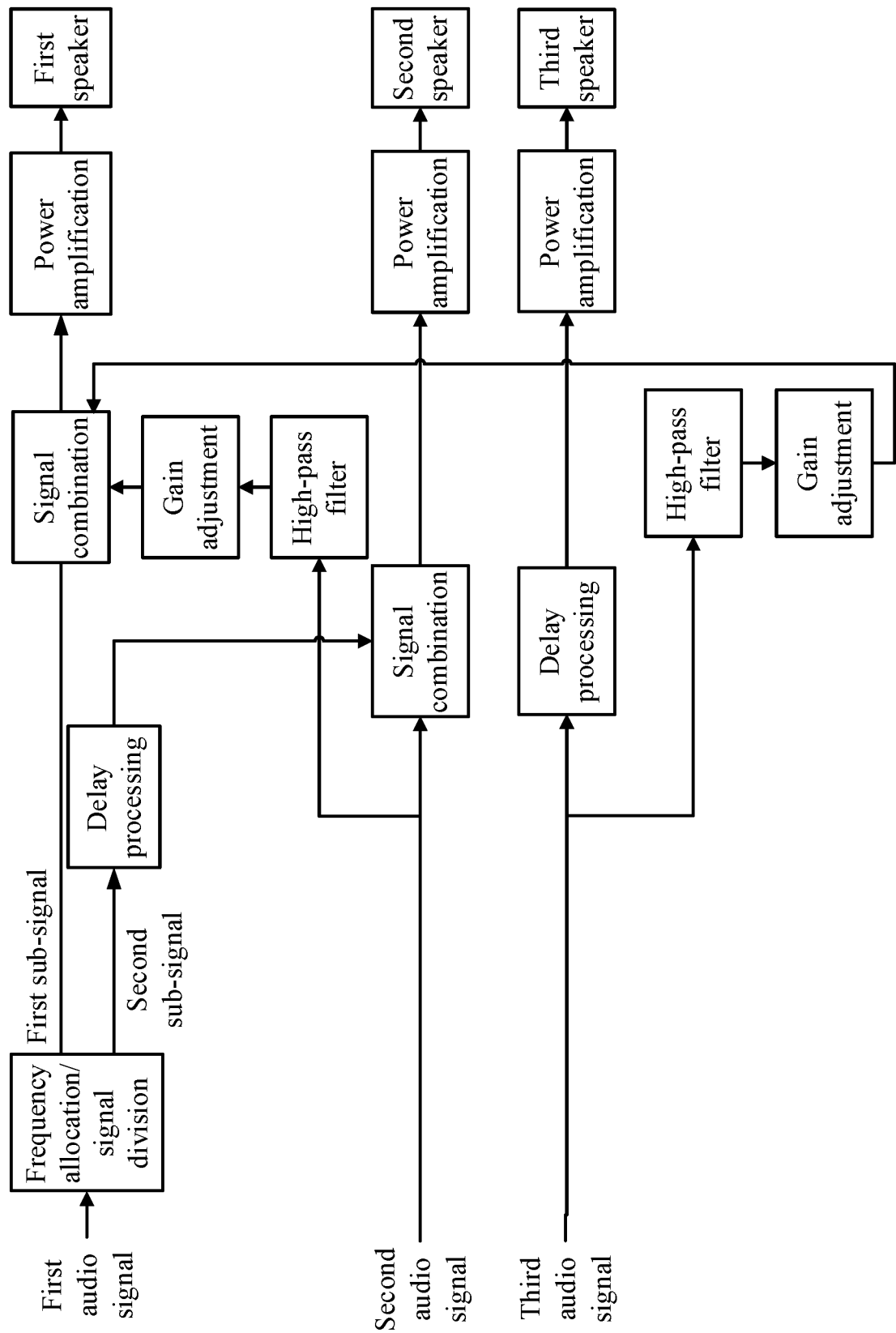

FIG. 52 shows a schematic diagram for illustrating a signal processing via a processor according to some embodiments of the disclosure. As shown in FIG. 52, the second audio signal or the third audio signal can be combined with the first sub-signal. In this case, any one or both of the two signals can be combined with the first sub-signal, thereby improving the sound output effect.

In some embodiments, in the step of dividing the first audio signal into the first sub-signal and the second sub-signal, the at least one processor is configured to perform the following steps.

The first audio signal is input to the high-pass filter and the low-pass filter respectively, a signal output from the high-pass filter is the first sub-signal, and the signal output from the low-pass filter is the second sub-signal.

Here, the high-pass filter allows a signal with a frequency greater than a preset frequency to pass, and the low-pass filter allows a signal with a frequency less than or equal to a preset frequency to pass.

In some embodiments, while dividing the first audio signal, besides a software based method, a hardware based method can be used. In this case, the first audio signal is input into the high-pass filter and the low-pass filter respectively, and the first sub-signal and the second sub-signal can be obtained.

FIG. 53 shows a schematic diagram for illustrating a signal processing via a processor according to some embodiments of the disclosure. As shown in FIG. 53, the first sub-signal can be obtained by inputting the first audio signal into a power amplifier with a high-pass filtering function, thereby reducing the use of high-pass filters and lowering costs.

Further, in some embodiments, in the case that the signal is divided according to the hardware based method, the requirements for computing power of a chip, such as digital signal processing (DSP) or advanced RISC machine (ARM), may also be reduced, which allows the embodiments of the disclosure to be applied to low-performance display apparatus.

In some embodiments, a method for outputting audio signal via a display apparatus is provided. FIG. 54 shows a schematic flow chart of a method for outputting audio signal according to some embodiments of the disclosure. As shown in FIG. 54, the method includes the following steps.

S100, obtaining audio signals of different channels, where the audio signals of different channels include a first audio signal for a first sound output interface and a second audio signal for the second sound output interface, and channels of audio signals output from the first sound output interface and the second sound output interface are different.

S200, dividing the first audio signal into a first sub-signal and a second sub-signal, where a frequency of the first sub-signal is greater than a preset frequency, and a frequency of the second sub-signal is less than or equal to the preset frequency.

S300, sending the first sub-signal to the first sound output interface for output.

S400, performing delay processing on the second sub-signal, obtaining a first combination signal by combining the delayed second sub-signal with the second audio signal, and sending the first combination signal to the second sound output interface for output.

In some embodiments, performing delay processing on the second sub-signal includes the: obtaining a first distance a sound travels from the first sound output interface to the object, and a second distance the sound travels from the second sound output interface to the object; determining the delay time according to the first distance and the second distance; performing the delay processing on the second sub-band according to the delay time.

In some embodiments, performing the delay processing on the second sub-band, includes: determining a difference between the first distance and the second distance; determining a ratio of the difference to a speed of sound propagation; and determining a sum of the ratio and the first preset time as the delay time.

In some embodiments, performing the delay processing on the second sub-band, includes: performing voice detection on the first audio signal and obtaining a detection result; in response to the detection result indicating that the first audio signal includes a human voice, determining the second preset time as the delay time, and performing the delay processing on the second sub-signal according to the second preset time.

In some embodiments, the above method further includes: in response to the detection result indicating that the first audio signal does not include human voices, performing energy detection on the first audio signal; in response to the energy of the first audio signal at a preset frequency being lower than a preset energy value, determining a third preset time as the delay time, and performing delay processing on the second sub-signal according to the third preset time.

In some embodiments, dividing the first audio signal into a first sub-signal and a second sub-signal, includes: determining a frequency corresponding to a signal valley of the first audio signal; in response to the frequency corresponding to the signal valley being greater than a preset frequency, dividing the first audio signal into a new first sub-signal and a new second sub-signal according to the frequency corresponding to the signal valley, where the frequency of the new first sub-signal is greater than the frequency corresponding to the signal valley, and the frequency of the new second sub-signal is less than or equal to the frequency corresponding to signal valley.

In some embodiments, sending the first sub-signal to the first sound output interface for output, includes: performing high-pass filtering and signal gain adjustment processing on the second audio signal, obtaining a second combination signal by combining the processed second audio signal with the first sub-signal, and sending the second combination signal to the first sound output interface for output.

In some embodiments, the above method further includes: obtaining a third audio signal for a third sound output interface; performing delay processing on the third audio signal in such a way that the delayed third audio signal is synchronized with the first combination signal; and sending the delayed third audio signal to the third sound output interface for output.

In some embodiments, the above method further includes: performing high-pass filtering and signal gain adjustment processing on the third audio signal, obtaining a third combination signal by combining the processed third audio signal with the first sub-signal, and sending the third combination signal to the first sound output interface for output.

According to the method for outputting the audio signal in some embodiments of the disclosure, with respect to speakers for different channels, when the first speaker cannot output a low-frequency signal with a frequency less than a preset frequency, the first audio signal for the first speaker can be divided to obtain the first sub-signal of high frequency and the second sub-signal of low frequency. The sub-signal of high-frequency is sent to the first speaker for output, and the sub-signal of low-frequency is sent to the second speaker for output. Since the second speaker can output a low-frequency signal normally, it can ensure that all content in the first audio signal can be output normally, thereby improving the sound output effect of the display apparatus.

It should be noted that there is no strict restriction on an order for executing the steps in the flowchart in the embodiments of the disclosure, and the steps can be performed in other orders. Moreover, at least some of the steps in the flowchart may include multiple sub-steps or multiple stages, and these sub-steps or stages are not necessarily executed at the same time, and is not necessarily in that sequence.

It should be understood that the disclosure is not limited to the specific structures described above and shown in the drawings, and may be modified and changed without departing from the spirit and scope of the embodiments of the present disclosure. The scope of this disclosure is limited only by the appended claims.

What is claimed is:

1. A display apparatus, comprising:
a screen, comprising a display area and a non-display area;
a backplane, in connection with the screen; and
an exciter, in connection with the backplane and is configured to drive the screen to vibrate and output sound via the backplane;
wherein the backplane comprises a backplane body and a vibration portion;
wherein the backplane body is in fixed connection with the non-display area, and the vibration portion is disposed in an area of the backplane corresponding to the non-display area;
wherein the backplane is provided with one or more strength reduction parts;
wherein the one or more strength reduction parts run through the backplane along a direction vertical to the backplane, and a part of the backplane at two sides of an extension direction of the one or more strength reduction parts serves as the vibration portion.

2. The display apparatus according to claim 1, wherein the display area is configured for image display, and the non-display area surrounds the display area;
the exciter comprises a vibration element in connection with the backplane, wherein vibration of the vibration element is configured to be transmitted to the backplane and drive the non-display area to vibrate and output sound via the backplane.

3. The display apparatus according to claim 1, wherein the exciter comprises a vibration element in connection with the vibration portion of the backplane, wherein the vibration portion is configured to deform along with vibration of the vibration element and undergo a reciprocating movement with respect to the backplane body.

4. The display apparatus according to claim 1, further comprising a damper disposed between the backplane and the exciter to increase damping of the vibration portion.

5. The display apparatus according to claim 4, wherein the damper is made of one or more materials selected from a honeycomb sandwich panel, foam sandwich panel, wood sandwich panel or acrylic panel.

6. The display apparatus according to claim 1, wherein a width of an area where the vibration portion locates is 2 to 3 times a width of a strength reduction part among the one or more strength reduction parts.

7. The display apparatus according to claim 1, wherein the one or more strength reduction parts comprise a plurality of strength reduction parts arranged in parallel, and a direction of the arrangement of the plurality of strength reduction parts is perpendicular to the extension direction of the plurality of strength reduction parts.

8. The display apparatus according to claim 7, wherein a part of the backplane between two strength reduction parts among the plurality of strength reduction parts serves as the vibration portion.

9. The display apparatus according to claim 8, wherein a distance between the vibration portion and an end of a first strength reduction part among the two strength reduction parts is 0.2 to 0.8 times a length of the first strength reduction part.

10. The display apparatus according to claim 1, wherein the vibration portion is a plate-shaped element of uniform width.

11. The display apparatus according to claim 1, further comprising a buffer element, wherein the buffer element is disposed between the vibration portion and the non-display area and is capable of deforming under the drive of the vibration portion.

12. The display apparatus according to claim 1, wherein the backplane comprises a plurality of connection parts;
wherein the plurality of connection parts are arranged at interval along the circumference of the vibration portion, a first end of a first connection part among the plurality of connection parts is connected with the vibration portion, and a second end of the first connection part is connected with the backplane body.

13. The display apparatus according to claim 12, wherein the first connection part is configured to rotate with the second end as a supporting point under the drive of the vibration portion.

14. The display apparatus according to claim 2, wherein the exciter comprises an exciter body;
wherein the vibration element is in connection with the exciter body and is capable of undergoing a reciprocating movement with respect to the exciter body;
wherein the exciter body is connected with the backplane body.

15. The display apparatus according to claim 1, wherein a plurality of exciters are provided, and the plurality of exciters are arranged at interval along the circumference of the screen.

16. The display apparatus according to claim 1, wherein the exciter comprises a magnetostriction exciter, and is disposed at an area of a screen corresponding to the non-display area;
wherein the magnetostriction exciter comprises a stretchable member, a first movement part, and a second movement part; in a static state, the first movement part is perpendicular to the stretchable member, and the second movement part is inclined to the stretchable member.

17. The display apparatus according to claim 1, wherein the exciter comprises a coil, a stretchable member, and a second vibration element that is elastic, wherein the stretchable member is configured to undergo a deformation along an axial direction of the coil; and
the second vibration element comprises a first movement part and a second movement part in connection, wherein the first movement part is in connection with an exciter body and is disposed at an end of the coil along the axial direction of the coil, and the second movement part is in connection the exciter body and is disposed at a side of the coil in a radial direction of the coil.

* * * * *